United States Patent
Matsusaka et al.

(10) Patent No.: US 8,531,578 B2
(45) Date of Patent: Sep. 10, 2013

(54) WIDE ANGLE OPTICAL SYSTEM, IMAGING LENS DEVICE, MONITOR CAMERA, AND DIGITAL APPARATUS

(75) Inventors: Keiji Matsusaka, Osaka (JP); Toru Nakatani, Uda (JP)

(73) Assignee: Konica Minolta Opto, Inc., Tokyo (JP)

( * ) Notice: Subject to any disclaimer, the term of this patent is extended or adjusted under 35 U.S.C. 154(b) by 712 days.

(21) Appl. No.: 12/743,329

(22) PCT Filed: Oct. 22, 2008

(86) PCT No.: PCT/JP2008/069105
§ 371 (c)(1),
(2), (4) Date: May 17, 2010

(87) PCT Pub. No.: WO2009/066532
PCT Pub. Date: May 28, 2009

(65) Prior Publication Data
US 2010/0259632 A1    Oct. 14, 2010

(30) Foreign Application Priority Data
Nov. 22, 2007   (JP) ................................. 2007-303644

(51) Int. Cl.
*H04N 5/228* (2006.01)
*H04N 5/225* (2006.01)
*H04N 5/262* (2006.01)
*G02B 13/04* (2006.01)
*G02B 13/18* (2006.01)
*G02B 9/00* (2006.01)
*G02B 9/34* (2006.01)

(52) U.S. Cl.
USPC ........ 348/335; 348/340; 348/240.3; 359/753; 359/715; 359/740; 359/771

(58) Field of Classification Search
None
See application file for complete search history.

(56) References Cited

U.S. PATENT DOCUMENTS 5,621,575 A * 4/1997 Toyama ......................... 359/753
6,735,019 B2 * 5/2004 Kanai ........................... 359/644

(Continued)

FOREIGN PATENT DOCUMENTS

| CN | 1825155 | 8/2006 |
| JP | 2005-227426 A | 8/2005 |

(Continued)

OTHER PUBLICATIONS

People's Republic of China First Office Action dated Jul. 25, 2011, for counterpart Chinese Patent Application No. 200880116628.0, together with an English translation thereof.
Extended European Search Report dated Jan. 24, 2011, for counterpart European Application No. 08852642.1.

*Primary Examiner* — Luong T Nguyen
(74) *Attorney, Agent, or Firm* — Cozen O'Connor

(57) ABSTRACT

Provided are a wide angle optical system having better optical performance, low in cost, and compact in size, an imaging lens device having the wide angle optical system, a monitor camera, and a digital apparatus. The wide angle optical system (1) has, in order from the object side to the image side, a first lens (11) having a negative optical power, a second lens (12) having a negative optical power, a third lens (13) having a positive optical power, an aperture (15), and a fourth lens (14) having a positive optical power. The wide angle optical system satisfies the conditional expression of $3<f34/f<10$, where f34 is the composite focal length of the third and fourth lenses (13, 14) and f is the focal length of the entire system.

22 Claims, 57 Drawing Sheets

(56) References Cited

U.S. PATENT DOCUMENTS

| | | | |
|---|---|---|---|
| 2005/0088755 A1* | 4/2005 | Enomoto | 359/686 |
| 2006/0187557 A1 | 8/2006 | Yamakawa | 359/771 |
| 2006/0277666 A1* | 12/2006 | Gertsch et al. | 2/424 |
| 2007/0146901 A1 | 6/2007 | Noda | 359/784 |
| 2007/0183062 A1 | 8/2007 | Nakamura | 359/781 |
| 2009/0087115 A1* | 4/2009 | Wong et al. | 382/255 |

FOREIGN PATENT DOCUMENTS

| | | |
|---|---|---|
| JP | 2005-345577 A | 12/2005 |
| JP | 2009-8867 A | 1/2009 |
| WO | WO 2009/066532 A1 | 5/2009 |

* cited by examiner

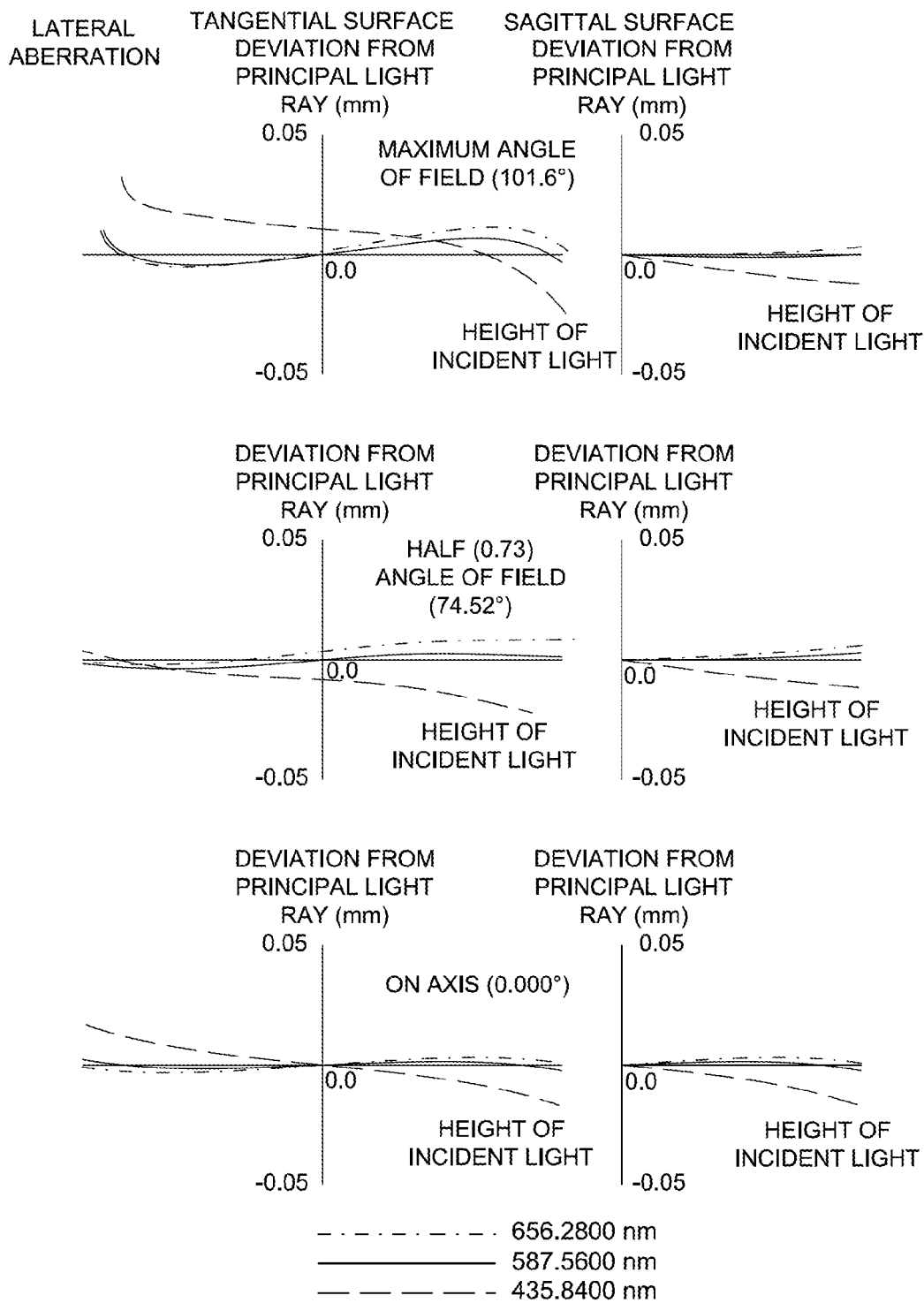

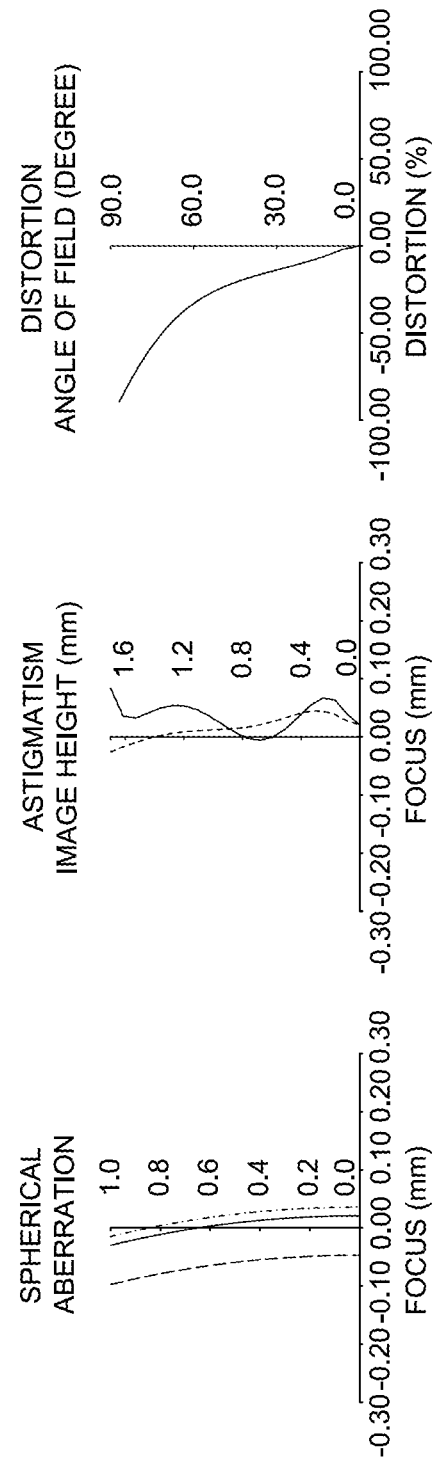

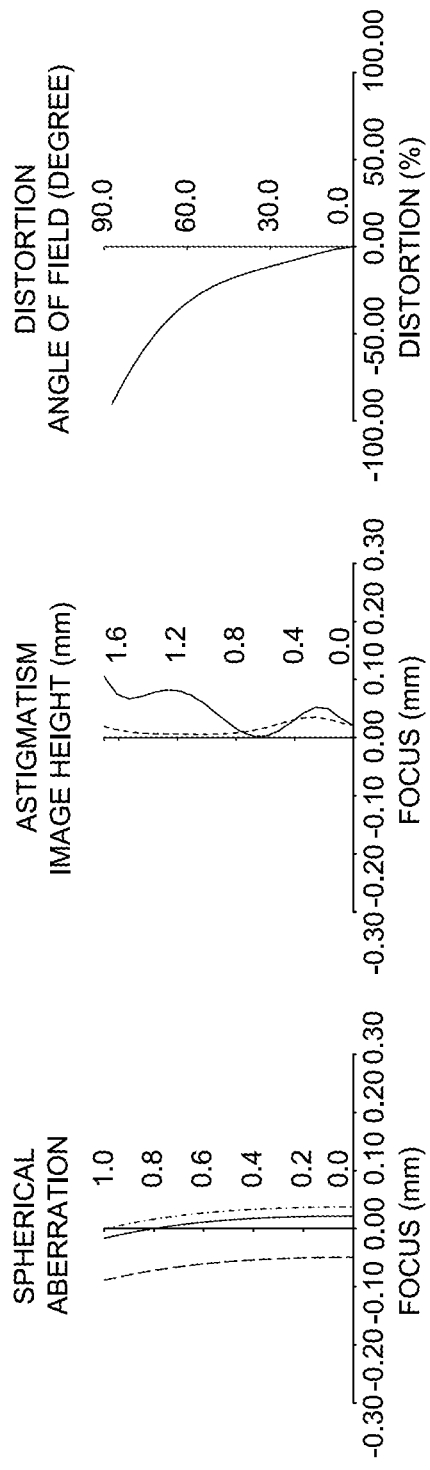
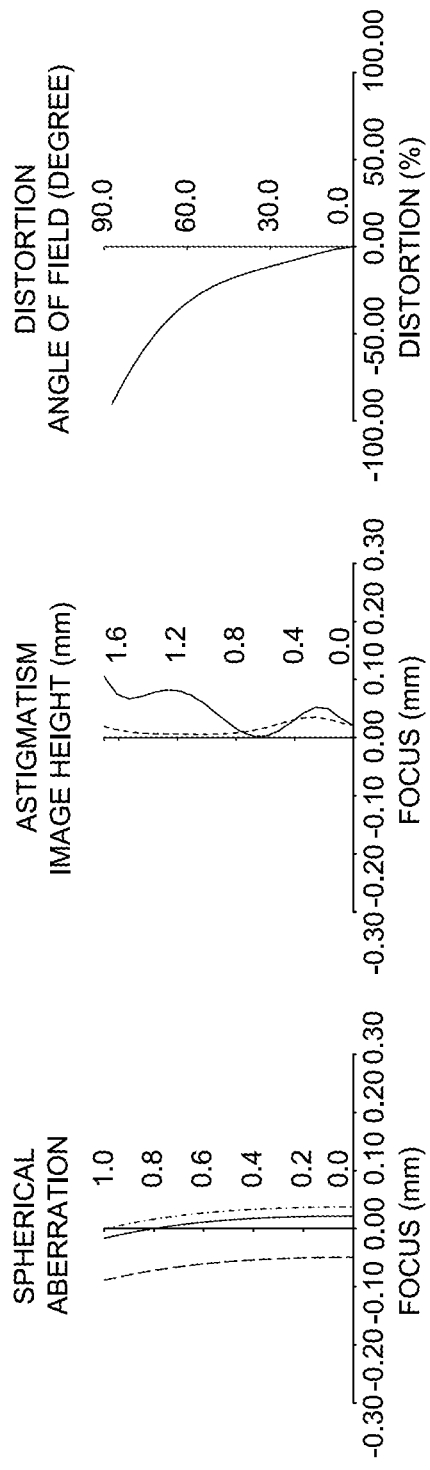
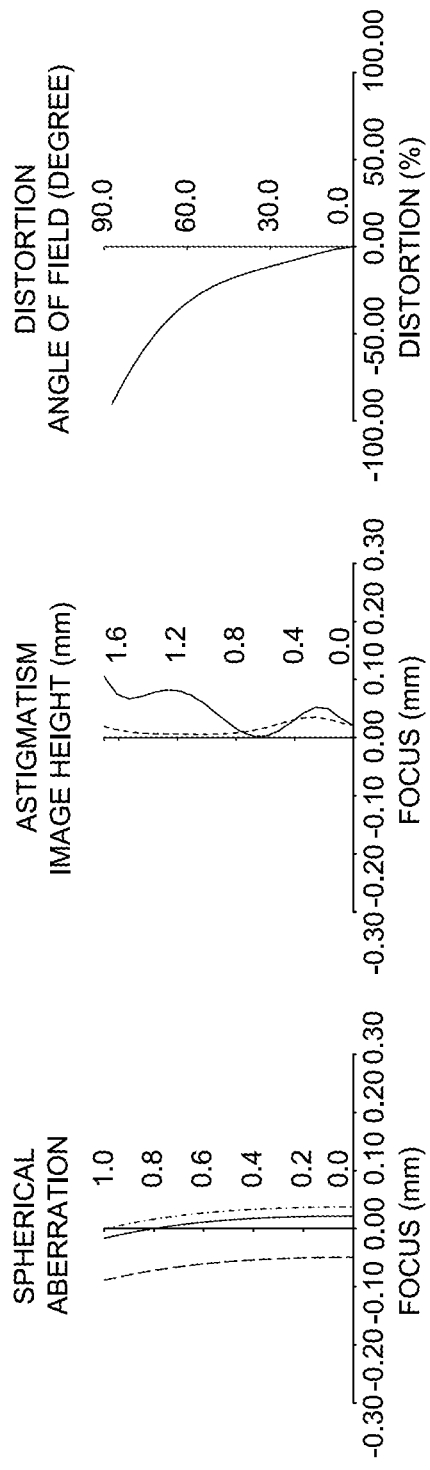

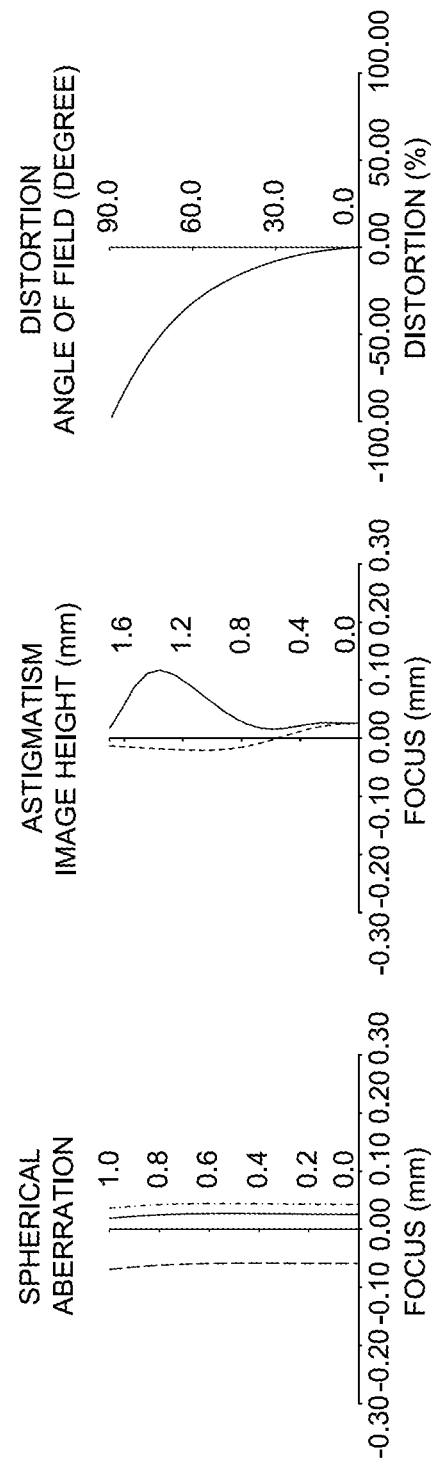
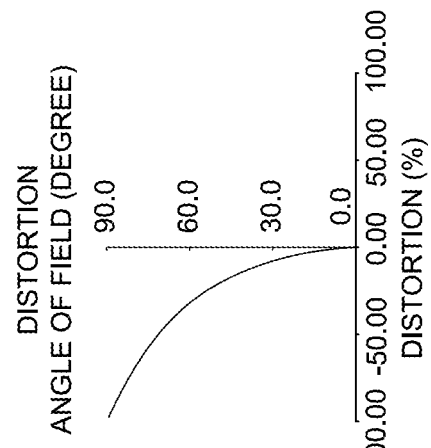

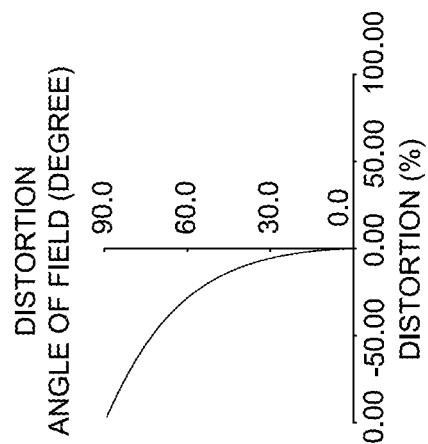
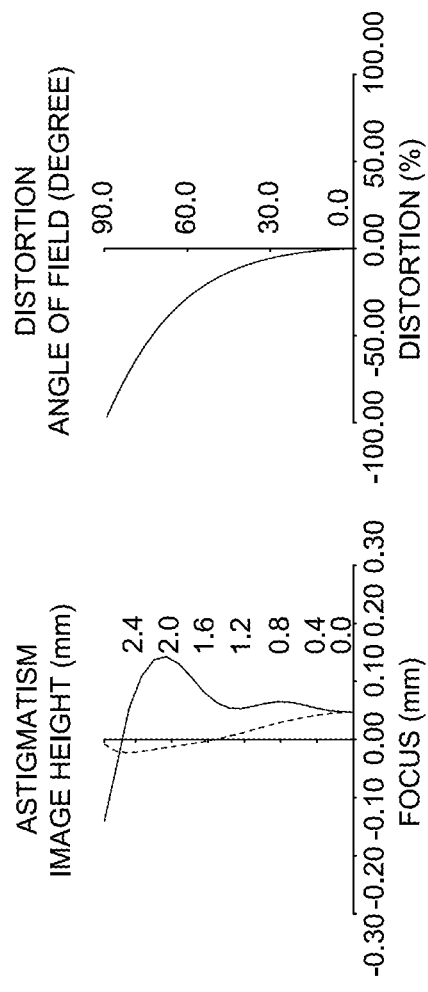
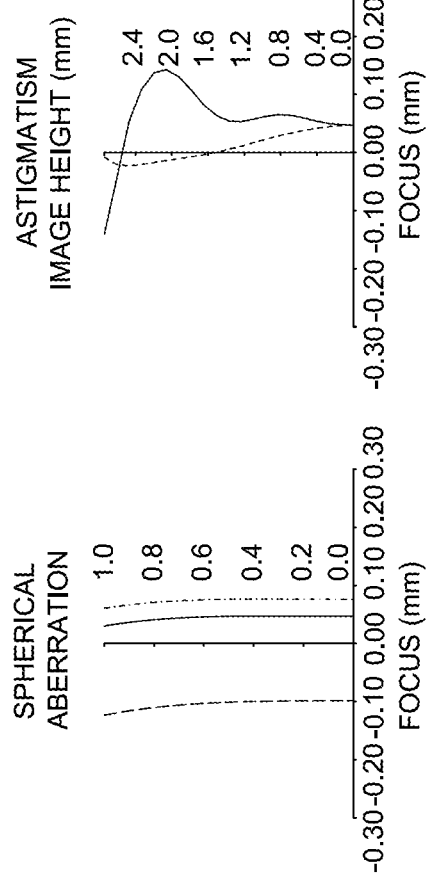

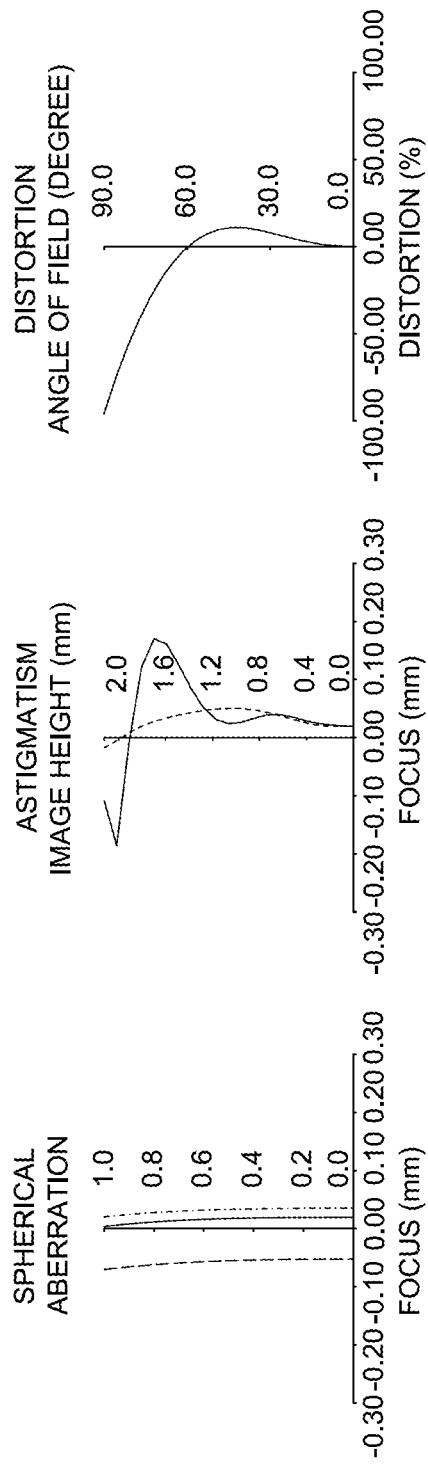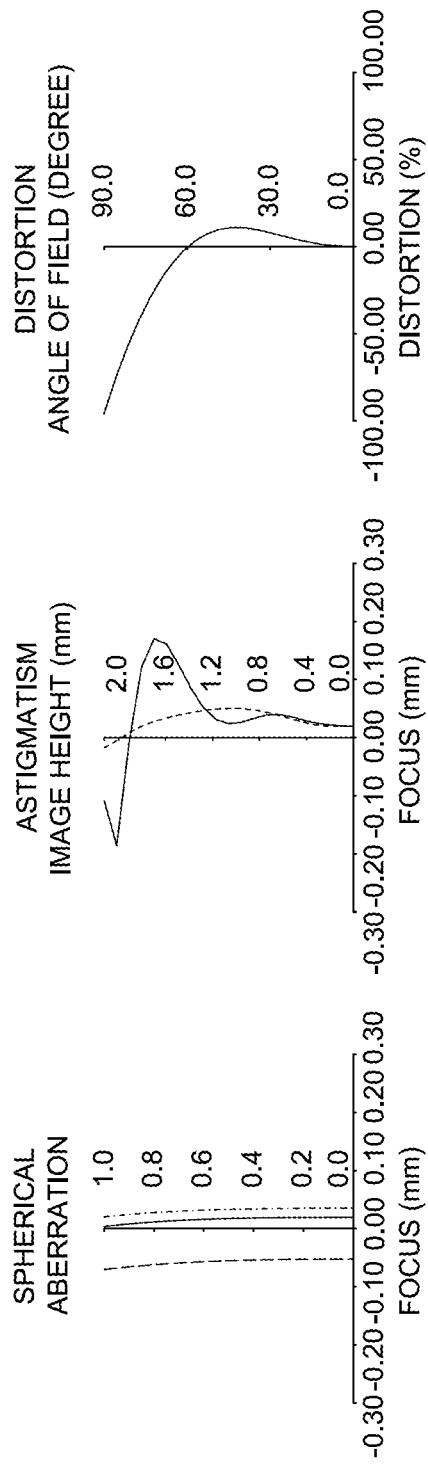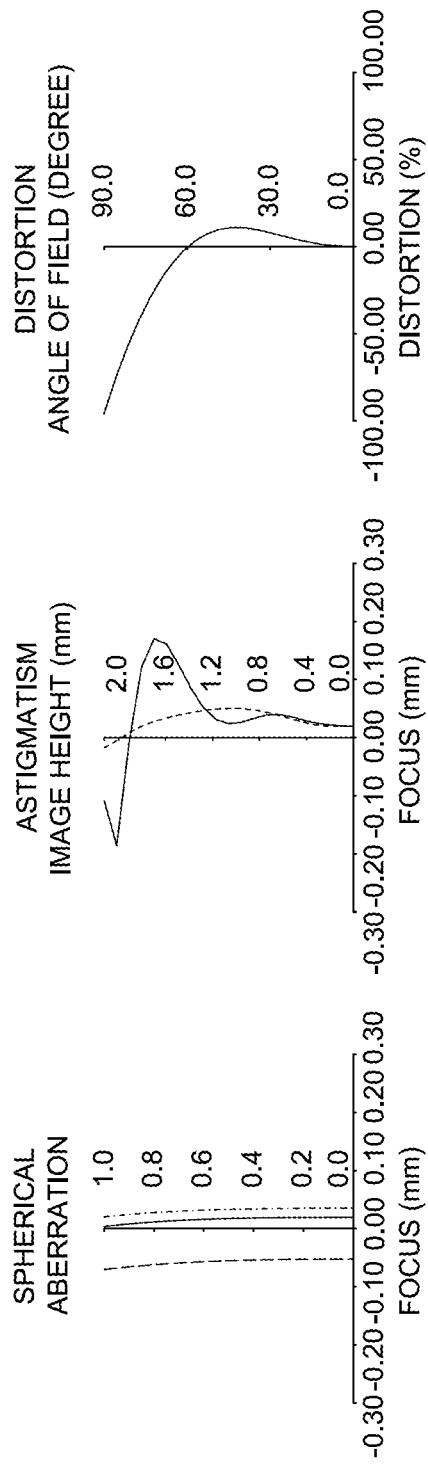

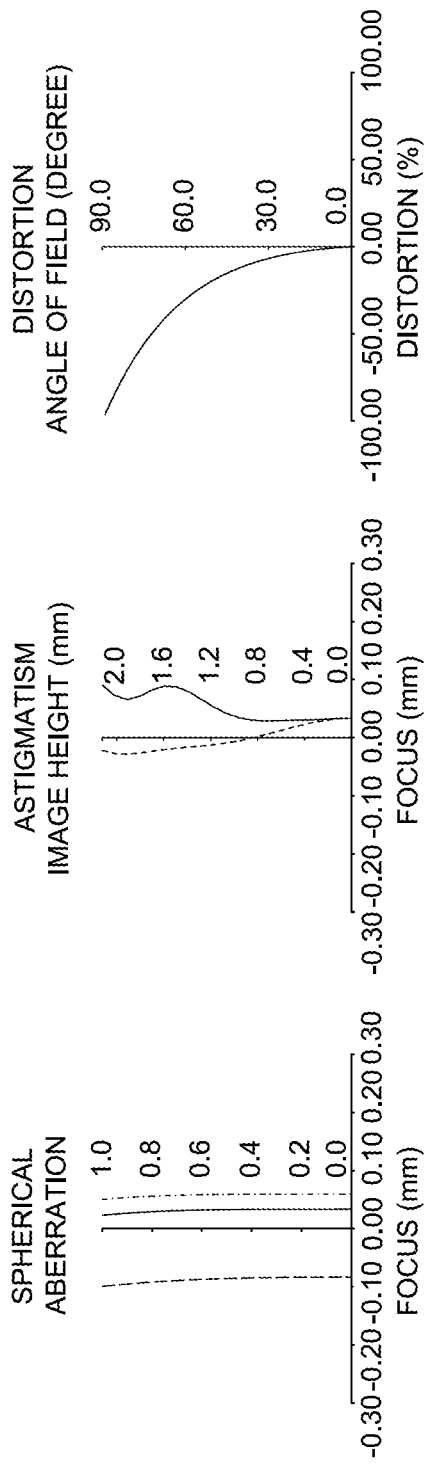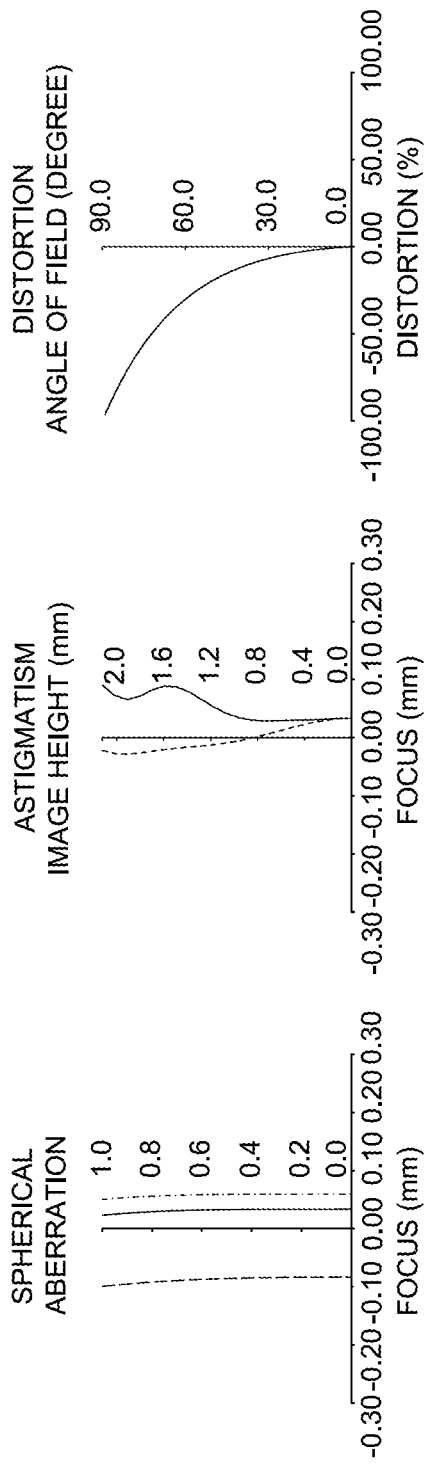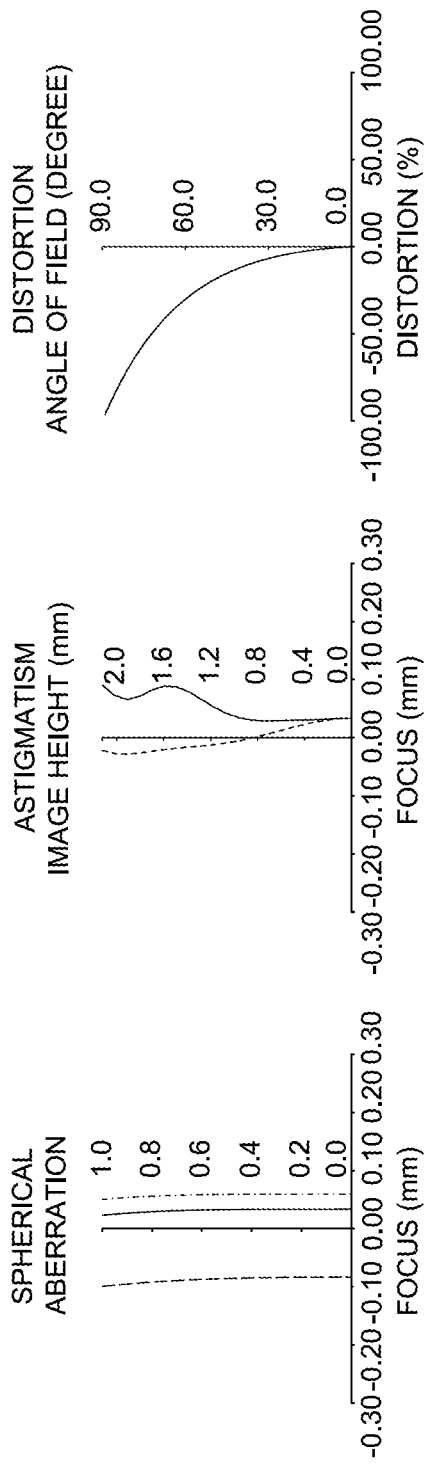

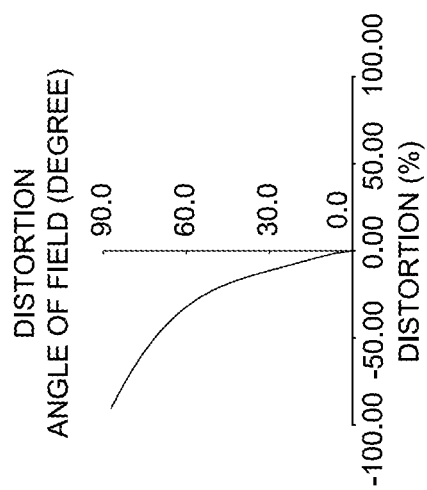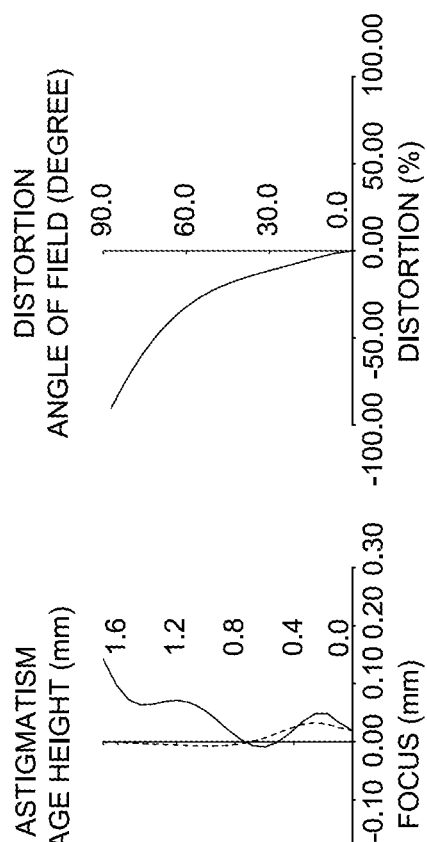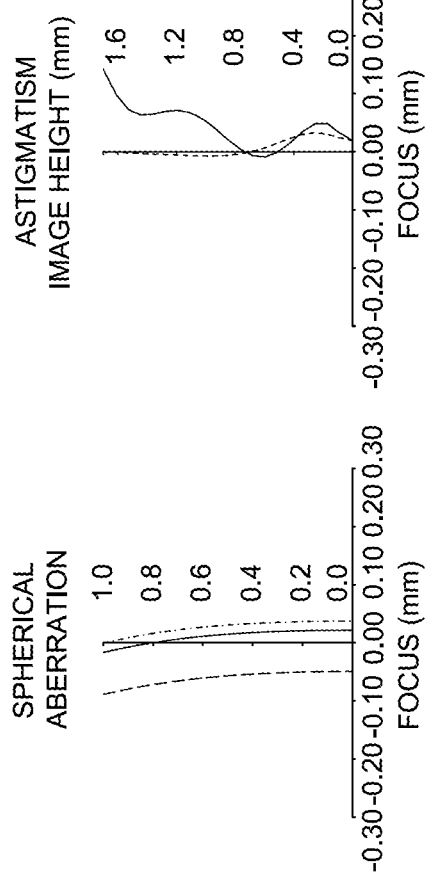

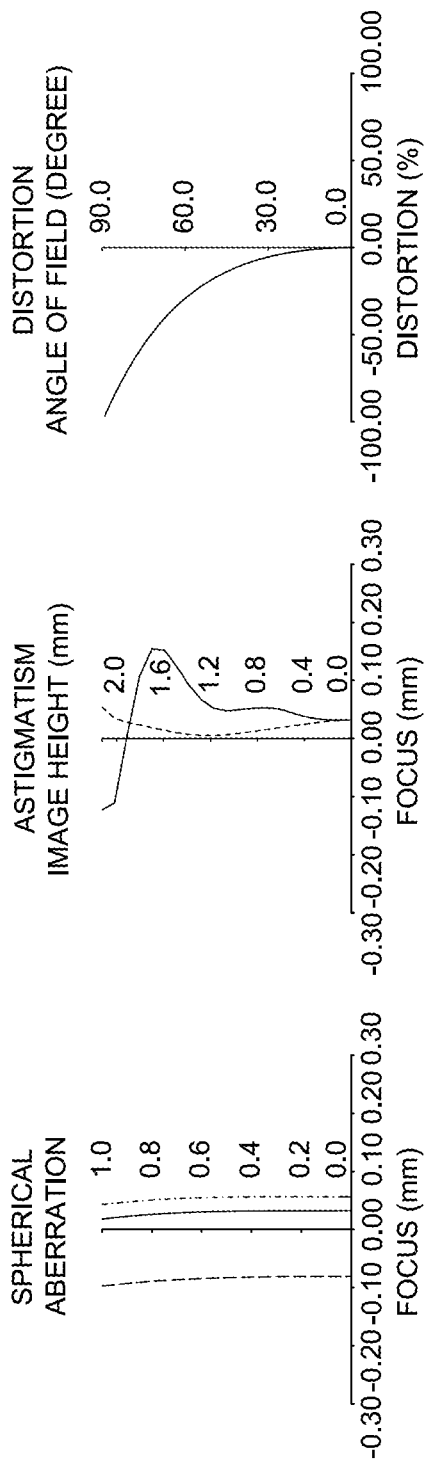
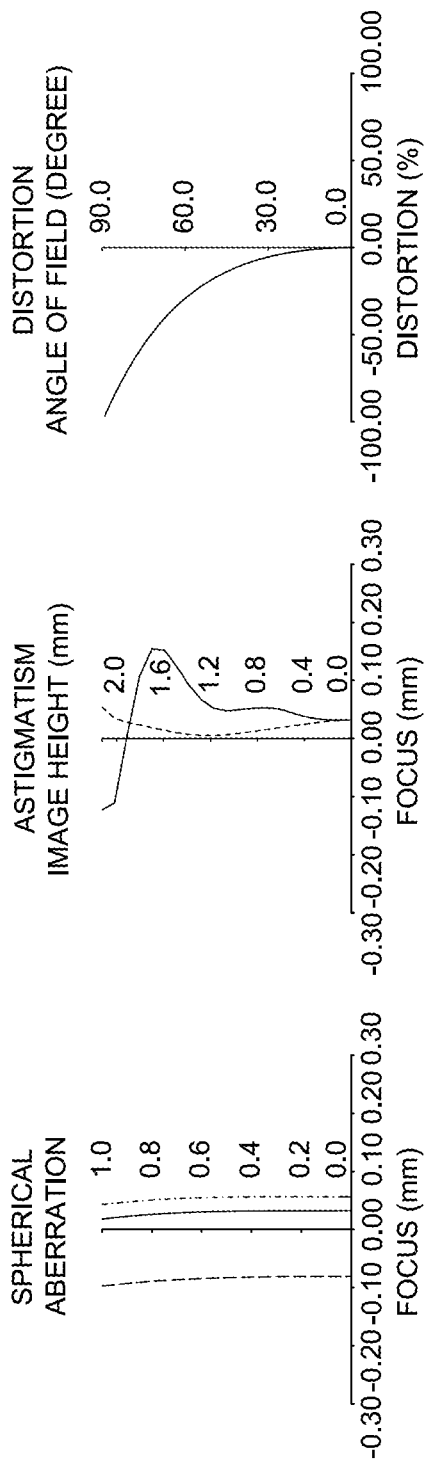
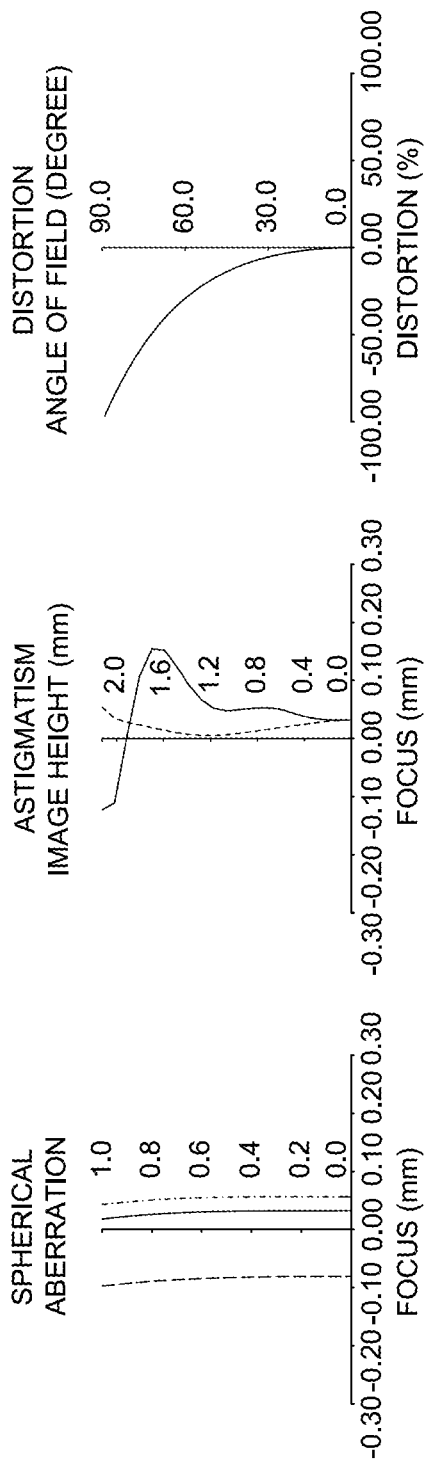

WIDE ANGLE OPTICAL SYSTEM, IMAGING LENS DEVICE, MONITOR CAMERA, AND DIGITAL APPARATUS

RELATED APPLICATIONS

This is a U.S. National Phase under 35 U.S.C. §371 of International Application No. PCT/JP2008/069105, filed in the Japanese Patent Office on Oct. 22, 2008, and claims priority to on Japanese Patent Application No. 2007-303644, filed on Nov. 22, 2007.

TECHNICAL FIELD

The present invention relates to wide angle optical systems which are wide angle and compact, in particular to wide angle optical systems preferable for ultra wide-field-angle and ultra wide angle optical systems with overall angles of field of 90 degrees or more. In addition, the present invention also relates to imaging lens devices provided with such wide angle optical systems, as well as to monitor cameras and digital apparatuses in which such imaging lens devices are installed.

BACKGROUND ART

When imaging the surrounding image information over a wide range using a small number of cameras, in general, a wide angle optical system having a large imaging angle of field (wide angle of field) is used. For example, such wide angle optical systems are used in monitoring or automobile applications.

Further, for example, in the case of a rear view monitor for automobiles, etc., in addition to being wide angle, it is required that, from the point of view of practical applicability, it does not block the field of view of the driver, and is compact from the point of view of beauty of the automobile.

Such wide angle optical systems have been disclosed, for example, in Patent Document 1. In the wide angle optical system disclosed in this Patent Document 1, shading that becomes a problem in the case of ultra wide angle has been prevented by using a small number of lenses such as 4 to 5 lens elements.

Patent Document 1: Unexamined Japanese Patent Application Publication No. 2005-227426.

DISCLOSURE OF THE INVENTION

Object of the Invention

In the wide angle optical system disclosed in the Patent Document 1, although prevention of shading and suppression of change in the image position under a wide range of temperature environments, due to making the optical system compact in size the optical powers of the different lenses become high, and particularly the optical power of the positive lens becomes high. Because of this, since the manufacturing error sensitivity becomes high for both centered and de-centered optical systems, it will lead to a cost increase and deterioration in the productivity.

The present invention has been made considering the above problems, and an object of the present invention is to provide a compact and low cost wide angle optical system with better optical performance, an imaging lens device equipped with such a wide angle optical system, as well as a monitor camera and a digital device in which the image pickup device is installed.

Means for Solving the Object

In order to solve the above problem, the present invention provides a wide angle optical system, an imaging lens device, a monitor camera, and a digital device having the following configuration. Further, the technical terms used in the following descriptions are defined, in the present patent specification, as follows.

(a) The refractive index is the refractive index at the wavelength of d line (587.56 nm).

(b) When the refractive indices for d line, F line (486.13 nm), and C line (656.28 nm) are denoted respectively by nd, nF, and nC, the Abbe's number denoted by vd is obtained by the following defining equation:

$$vd=(nd-1)/(nF-nC)$$

(c) The expressions related to surface shapes are the expressions based on paraxial curvature.

(d) Regarding the lenses, when the expressions "concave", "convex", or "meniscus" are used, these are taken to express the lens shape (expression based on the paraxial curvature) in the vicinity of the optical axis (in the vicinity of the center of the lens).

(e) Since the resin materials used in composite type aspherical lenses merely have functions supplemental to the substrate glass material, they are not assumed as independent optical members, but are assumed as the same as the case when the substrate glass material has an aspherical surface, and even the number of lenses is assumed as one lens. Further, the refractive index of the glass material of the substrate is taken to be as the refractive index of that lens. A composite type aspherical lens is a lens which is made of a glass substrate and a resin thin film applied thereto to form an aspherical surface.

A wide angle optical system according to one form of the present invention is characterized in that it comprises, in order from the object side towards the image side, a first lens having a negative optical power, a second lens having a negative optical power, a third lens having a positive optical power, an aperture, and a fourth lens having a positive optical power, and the following conditional relationship (1) is satisfied:

$$3<f34/f<10 \qquad (1)$$

where f34 is the combined focal length of the third lens and the fourth lens, and f is the overall focal length of this entire wide angle optical system.

In this configuration, the first lens to the fourth lens are arranged in the sequence of negative-negative-positive-positive, to achieve a wide angle of field, thus, the optical power of each of the lenses can be low, with the result that the productivity of the wide angle optical system is improved. More particularly, by arranging two negative lenses in a row from the most object side toward the image side, the optical power of the negative lenses is appropriately shared, and the off-axis light beam incidence angle at the imaging plane is reduced. Further, by arranging two positive lenses on the image side of these negative lenses with an aperture diaphragm in between, it also becomes possible to correct off-axis aberration. Next, if the upper limit of the conditional relationship (1) is exceeded, the overall optical length increases. Thus it is not possible to achieve size reduction of the wide angle optical system, and hence it is not desirable. Further, if the lower limit of the conditional relationship (1) is not satisfied, the manufacturing error sensitivity of the third lens and the fourth lens increases. Thus it invites deterioration in the productivity and increase in the cost, and hence is not desirable. Therefore, in a wide angle optical system in this kind of configuration, it becomes possible to provide a low cost and compact wide angle optical system that has better optical performance.

Further, in the above wide angle optical system, it is desirable that the following conditional relationship (2) is satisfied:

$$2.9 < f3/f < 3.6 \qquad (2)$$

where f3 is the focal length of the third lens, and f is the overall focal length of this entire wide angle optical system.

In this configuration, if the upper limit of the conditional relationship (2) is exceeded, either the overall optical length increases, or the optical power of the fourth lens becomes high. Thus the manufacturing error sensitivity becomes high, which situation is unfavorable. Further, if the lower limit of the conditional relationship (2) is not satisfied, the manufacturing error sensitivity of the third lens increases by a relatively large amount. Thus the productivity becomes low, and the cost increases, which situation is unfavorable.

Further, in the above wide angle optical system, it is desirable that the following conditional relationship (3) is satisfied:

$$2.1 < D12/f < 5 \qquad (3)$$

where D12 is the spacing along the optical axis between the first lens and the second lens, and f is the overall focal length of this entire wide angle optical system.

In this configuration, if the upper limit of the conditional relationship (3) is exceeded, the external diameter of the first lens becomes too large. Thus size reduction of the present wide angle optical system becomes difficult, which situation is unfavorable. Further, if the lower limit of the conditional relationship (3) is not satisfied, it is not possible to increase the optical power of the image side surface of the first lens and the object side surface of the second lens, and therefore, the curvature of the object side surface of the second lens need to be extremely large. This is not a favorable configuration. In addition, since the combined optical power of the first lens and the second lens becomes very strong, correction of distortion becomes difficult, which situation is unfavorable.

Further, in the above wide angle optical system, it is desirable that the following conditional relationship (4) is satisfied:

$$2.2 < |f2/f| < 3 \qquad (4)$$

where f2 is the focal length of the second lens, and f is the overall focal length of this entire wide angle optical system.

In this configuration, if the upper limit of the conditional relationship (4) is exceeded, the correction of distortion becomes difficult, which situation is unfavorable. Further, if the lower limit of the conditional relationship (4) is not satisfied, the curvature of the image side surface of the second lens and the angle of field become very large. Thus manufacturing becomes difficult, which situation is unfavorable.

Further, in the above wide angle optical system, it is desirable that the following conditional relationship (5) is satisfied:

$$7.5 < |f1/f| < 10 \qquad (5)$$

where f1 is the focal length of the first lens, and f is the overall focal length of this entire wide angle optical system.

In this configuration, if the upper limit of the conditional relationship (5) is exceeded, the angle of incidence of off-axis light beam on the image plane becomes very large. Thus the brightness decreases on the periphery of the screen, which situation is unfavorable. Further, if the lower limit of the conditional relationship (5) is not satisfied, the curvature of the image side surface of the first lens and the angle of field become very large. Thus manufacturing is difficult, which situation is unfavorable.

Further, in the above wide angle optical system, it is desirable that the following conditional relationship (6) is satisfied:

$$2.8 < f1/f2 < 4 \qquad (6)$$

where f1 is the focal length of the first lens, and f2 is the focal length of the second lens.

In this configuration, if the upper limit of the conditional relationship (6) is exceeded or if the lower limit of the conditional relationship (6) is not satisfied, the curvatures of the image side surfaces of the first and second lenses and the angle of field become very large. Thus manufacturing becomes difficult, which situation is unfavorable.

Further, in the above wide angle optical system, it is desirable that the following conditional relationship (7) is satisfied:

$$1.2 < |f12/f| < 1.6 \qquad (7)$$

where f12 is the combined focal length of the first lens and second lens, and f is the overall focal length of this entire wide angle optical system.

In this configuration, if the upper limit of the conditional relationship (7) is exceeded, the off-axis light beam incidence angle at the imaging plane becomes large. Thus, the brightness decreases on the periphery of the screen, which situation is unfavorable. Further, if the lower limit of the conditional relationship (7) is not satisfied, the curvature of the image side surface of the first lens as well as the angle of field become very large. Thus manufacturing becomes difficult, which situation is unfavorable.

Further, in the above wide angle optical system, it is desirable that the following conditional relationship (8) is satisfied:

$$0.88 < f3/f4 < 1.55 \qquad (8)$$

where f3 is the focal length of the third lens, and f4 is the focal length of the fourth lens.

In this configuration, if the upper limit of the conditional relationship (8) is exceeded or if the lower limit of the conditional relationship (8) is not satisfied, the optical powers of the third and fourth lenses become very large, and the manufacturing error sensitivity becomes high particularly for the off-axis part. Thus, the productivity becomes low and the cost becomes high, which situation is unfavorable.

Further, in the above wide angle optical system, it is desirable that the following conditional relationship (9) is satisfied:

$$2 < f4/f < 3 \qquad (9)$$

where f4 is the focal length of the fourth lens, and f is the overall focal length of this entire wide angle optical system.

In this configuration, if the upper limit of the conditional relationship (9) is exceeded, the off-axis light beam incidence angle at the imaging plane becomes large. Thus, the brightness decreases on the periphery of the screen, which situation is unfavorable. Further, if the lower limit of the conditional relationship (9) is not satisfied, the optical power of the fourth lens becomes large, and the manufacturing error sensitivity becomes high particularly for the off-axis parts. Thus the productivity becomes low and the cost increases, which situation is unfavorable.

Further, in the above wide angle optical system, it is desirable that the following conditional relationship (10) is satisfied:

$$9.5 < f123/f < 23 \quad (10)$$

where f123 is the combined focal length of the first lens, the second lens, and the third lens, and f is the overall focal length of this entire wide angle optical system.

In this configuration, if the upper limit of the conditional relationship (10) is exceeded, the overall optical length increases. Thus it is impossible to achieve size reduction of the wide angle optical system, which situation is unfavorable. Further, if the lower limit of the conditional relationship (10) is not satisfied, the optical power of the third lens becomes large, and the manufacturing error sensitivity increases by a large amount. Thus the productivity becomes low and the cost becomes high, which situation is unfavorable.

Further, in the above wide angle optical systems, it is desirable that the most object side lens side is a lens made of glass.

Since placing a lens protection member before the optical system conflicts with size reduction, the lens closest to the object is often uncovered. According to the present configuration, when the most object side lens a lens is made of glass, the strength of the glass is high, the surface is difficult to get scratched, thereby reducing the generation of flares due to scratches, hence reducing the deterioration in the imaging performance.

Further, in the above wide angle optical systems, it is desirable that the following conditional relationship (11) is satisfied:

$$0.85 < Da2/R2 < 0.95 \quad (11)$$

where Da2 is the maximum effective radius of the image side surface of the most object side lens, and R2 is the paraxial curvature radius of the image side surface of the most object side lens.

In this configuration, if the upper limit of the conditional relationship (11) is exceeded, the curvature and angle of field become too large on the image side surface of the second lens. Thus the manufacturing becomes difficult, which situation is unfavorable. Further, if the lower limit of the conditional relationship (11) is not satisfied, the distortion cannot be sufficiently corrected, and also the off-axis light beam incidence angle at the imaging plane becomes large. Thus the brightness on the periphery of the screen is reduced, which situation is unfavorable.

Further, in the above wide angle optical systems, it is desirable that the second lens is a lens made of a resin material and has at least one aspherical surface.

According to this configuration, by placing an aspherical surface in the second lens, correction of distortion becomes possible. In addition, because this aspherical surface is realized by a resin lens, it becomes possible to obtain a high performance lens at a low cost.

Further, in the above wide angle optical systems, it is desirable that the following conditional relationships (12) and (13) are satisfied:

$$Dp4/R4 > 1 \quad (12)$$

$$dZ4/R4 < -0.4 \quad (13)$$

where Dp4 is the amount of deviation at the position of the maximum effective radius in the image side surface of the second lens, R4 is the paraxial curvature radius of the image side surface of the second lens, and dZ4 is the amount of aspherical sag (difference from a spherical surface) at a position at which the height from the optical axis is equal to the paraxial curvature radius in the image side surface of the second lens.

In this configuration, if the lower limit of the conditional relationship (12) or the upper limit of the conditional relationship (13) is exceeded, in either case, the correction of off-axis aberration, especially astigmatism, becomes difficult, which situation is unfavorable.

Further, in the above wide angle optical systems, it is desirable that, for the chief light rays of a light beam of a half field angle of 90 degrees, the following conditional relationship (14) is satisfied:

$$-0.3 < Yr/2f - 1 < 0.7 \quad (14)$$

where Yr is the position of the principal light ray on the image plane (the distance from the optical axis), and f is the overall focal length of this entire wide angle optical system.

In this configuration, if the upper limit of the conditional relationship (14) is exceeded, the correction of off-axis aberration, particularly astigmatism and chromatic aberration of magnification, becomes difficult, which situation is unfavorable. Further, if the lower limit of the conditional relationship (14) is not satisfied, the compression ratio of the peripheral image becomes too large. Thus there will be some drop in the amount of information of the peripheral part. Because of this, even if correction is made using image processing, the resolution in the peripheral part gets greatly reduced and hence this is not desirable.

Further, in the wide angle optical systems described above, it is desirable that the following conditional relationship (15) is satisfied:

$$Y'/TL > 0.1 \quad (15)$$

where Y' is the maximum image height, and TL is the distance along the optical axis from the apex of the lens surface closest to the object to the image plane (note that back focus is an air equivalent length).

In this configuration, if the lower limit of the conditional relationship (15) is not satisfied, the overall optical length increases drastically. Thus it is impossible to achieve size reduction of the wide angle optical system, which situation is unfavorable.

Further, in the wide angle optical systems described above, it is desirable that the following conditional relationship (16) is satisfied:

$$|Ep|/Lb > 2.2 \quad (16)$$

where Ep is the position of the exit pupil with respect to the principal light beam of the maximum image height, and Lb is the back focus (air equivalent length).

In this configuration, if the lower limit of the conditional relationship (16) is not satisfied, even if the lens array is placed immediately before the image plane, it is difficult to decrease the reduction in the peripheral brightness, which situation is unfavorable.

Further, in the wide angle optical systems described above, it is desirable that the first lens and the second lens are negative meniscus lenses with a convex shape towards the object side, and the third lens is a double-convex positive lens, the aperture is an aperture diaphragm, and the fourth lens is a double-convex positive lens.

According to this configuration, a wide angle is realized, and the optical power of each of the lenses can be low, it is possible to increase the productivity of a wide angle optical system. In particular, by placing two negative meniscus lenses successively from the object side towards the image side, a sufficient back focus is secured while the powers of the two negative lenses are low. Further, by placing an aperture and two double-convex positive lenses on the image side, since this form becomes symmetrical with respect to the aperture, distortion and astigmatism are effectively corrected.

Further, in these wide angle optical systems described above, the third lens is preferably a resin lens with at least one aspherical surface.

According to this configuration, by providing an aspherical surface in the third lens, the spherical aberration, coma aberration, and astigmatism are effectively corrected. In addition, by realizing this aspherical surface using a resin lens, it is possible to obtain a high performance lens at low cost.

Further, in these wide angle optical systems described above, the fourth lens is favorably a resin lens with at least one aspherical surface.

According to this configuration, by providing an aspherical surface in the fourth lens, the spherical aberration, coma aberration, and astigmatism are effectively corrected. In addition, by realizing this aspherical surface using a lens made of a resin material, it is possible to obtain a high performance lens at low cost.

Further, an imaging lens device according to another aspect of the present invention is provided with one of the wide angle optical systems described above, and has the feature that it is configured so that the wide angle optical system can form an optical image of the photographic subject on a prescribed imaging surface.

Further, a monitor camera according to another aspect of the present invention is a monitor camera that is installed at a prescribed position, and images the photographic subject within a prescribed region in the surroundings of the installed position, and has the feature that it is provided with an imaging lens device described above, and an image sensor that converts the optical image of the photographic subject guided by the imaging lens device into electrical signals.

Further, a digital device according to another aspect of the present invention is a digital device with the feature that it is provided with an imaging lens device described above, and an image sensor that converts the optical image of the photographic subject guided by the imaging lens device into electrical signals, and a control section that makes the imaging lens device and the image sensor carry out at least one type of imaging of still images and moving images.

Further, in the above digital device is preferably provided with an image processing section that corrects the distortion in the optical image of the photographic subject formed on the light receiving surface of the image sensor.

According to this configuration, it is possible to correct the distortion of the optical image of the photographic subject by information processing, and it is possible to generate a natural image with almost no distortion similar to the scenery viewed by the naked eye from an image distorted due to distortion.

Advantage of the Invention

According to the present invention, it is possible to provide a compact wide angle optical system having very good optical performance, an imaging lens device, a monitor camera, and a digital device.

BRIEF DESCRIPTION OF THE DRAWINGS

FIG. 25 is an aberration diagram-2 of the lens group in the wide angle optical system of the first embodiment;

FIGS. 26A, 26B, 26C are aberration diagrams-1 of a lens group in a wide angle optical system of the second embodiment;

FIGS. 28A, 28B, 28C are aberration diagrams-1 of a lens group in a wide angle optical system of the third embodiment;

FIGS. 30A, 30B, 30C are aberration diagrams-1 of a lens group in a wide angle optical system of the fourth embodiment;

FIGS. 34A, 34B, 34C are aberration diagrams-1 of a lens group in a wide angle optical system of the sixth embodiment;

FIGS. 38A, 38B, 38C are aberration diagrams-1 of a lens group in a wide angle optical system of the eighth embodiment;

FIGS. 50A, 50B, 50C are aberration diagrams-1 of a lens group in a wide angle optical system of the 14th embodiment;

FIGS. 56A, 56B, 56C are aberration diagrams-1 of a lens group in a wide angle optical system of the 17th embodiment;

FIGS. 58A, 58B, 58C are aberration diagrams-1 of a lens group in a wide angle optical system of the 18th embodiment.

NUMERALS

| | |
|---|---|
| AX | Optical axis |
| 1, 1A to 1R | Wide angle optical system |
| 3 | Digital device |
| 5 | Mobile telephone |
| 7 | Monitor camera |
| 9 | Automobile |
| 11, L1 | First lens |
| 12, L2 | Second lens |
| 13, L3 | Third lens |
| 14, L4 | Fourth lens |
| 15, ST | Aperture |
| 17, SR | Image sensor |
| 21 | Image pickup device |

BEST MODE FOR CARRYING OUT THE INVENTION

In the following, a preferred embodiment of the present invention is explained in detail with reference to the drawings. Further, in the different drawings, the structures that have been assigned identical symbols indicate identical structures and hence their explanations will be omitted.

(Description of Wide Angle Optical System)

Figure 1:
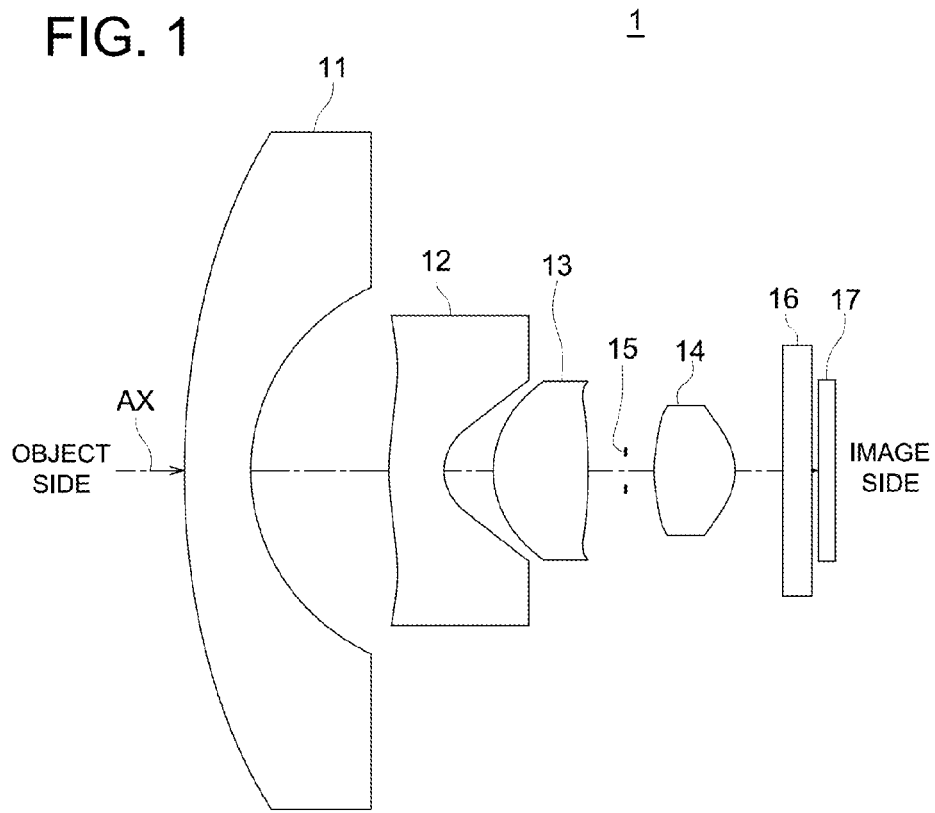
FIG. 1 is a diagram showing a schematic sectional view of a configuration of a lens to describe a wide angle optical system according to an embodiment.

FIG. 1 wide angle is a cross-sectional view schematically showing the construction of the wide angle optical system, and is used for describing a wide angle optical system of preferred embodiment.

In FIG. 1, a present wide angle optical system 1 is configured to be provided desirably in an imaging lens device which is configured to be able to form an optical image of the object (photographic subject) and to be disposed on a prescribed imaging plane including a light receiving surface (image surface) of an image sensor 17 that converts the optical image into electrical signals, and the optical system 1 is constituted by four components of negative-negative-positive-positive in order from the object side towards the image side. A first lens 11 has a negative optical power, a second lens 12 has a negative optical power, a third lens 13 has a positive optical power, an aperture 15, and a fourth lens 14 has a positive optical power. Further, the wide angle optical system 1 shown in FIG. 1 has the same configuration as the wide angle optical system 1A (FIG. 6) of the Example 1 described later.

In FIG. 1, the first lens 11 and the second lens 12 are, respectively, negative meniscus lenses that are convex on the object side, the third lens 13 and the fourth lens 14, respectively, are double-convex positive lenses. The lenses from the second lens 12 to the fourth lens 14 each have aspherical surfaces on both sides, and made of resin, for example.

Regarding the wide angle optical system 1 shown in FIG. 1, the productivity is increased, because the powers of the lenses 11 to 14 can be low while realizing a wide angle due to the configuration where the first lens 11 to the fourth lens 14 are arranged in the order of negative-negative-positive-positive. In particular, because of placing, in order from the object side to the image side, two negative lenses, which are the negative meniscus lenses 11 and 12 in the present preferred embodiment, the optical powers of these two lenses 11 and 12 are appropriately distributed. Thus, when forming an image on the image sensor 17, the off-axis light beam incidence angle to the imaging plane can be low. Further, by placing, on the image side of these two lenses 11 and 12, two positive lenses with an aperture diaphragm in between, the both sides convex positive lenses 13 and 14 in the present preferred embodiment, it is also possible to carry out off-axis aberrations.

Further, the present wide angle optical system 1 satisfies the following conditional relationship (1) when the combined focal length of the third and the fourth lenses 13 and 14 is taken to be f34 and the overall focal length of the entire wide angle optical system 1 is taken to be f.

$$3<f34/f<10 \quad (1)$$

If the upper limit of this conditional relationship (1) is exceeded, the overall optical length increases, thus size reduction of the wide angle optical system 1, which situation is unfavorable. Further, if the lower limit of this conditional relationship (1) is not satisfied, the manufacturing error sensitivities of the third lens 13 and the fourth lens 14 increase, then it leads to a decrease in productivity and increase in cost, which situation is unfavorable.

Therefore, in the wide angle optical system 1 with this configuration, it becomes possible to provide a low cost and compact wide angle optical system that has better optical performances.

Further, from the point of view of further reducing the size and improving productivity and cost, it is more desirable that the wide angle optical system 1 satisfies the following conditional relationship (1').

$$3.2<f34/f<7 \quad (1')$$

By satisfying this conditional relationship (1'), the manufacturing difficulty is sufficiently reduced with respect to eccentric errors, and further, size reduction of the wide angle optical system 1 is achieved.

In addition, on the image side of the present wide angle optical system 1 is provided with a filter 16 and an image sensor 17. The filter 16 is a parallel plate shaped optical element, and schematically represents various types of filters, the cover glass of the image sensor, etc. Depending on the purpose of use, the image sensor, the configuration of the camera, etc., it is possible to place appropriately an optical filter such as a low pass filter, an infrared cutoff filter, etc. The image sensor 17 is an element that carries out photoelectric conversion into a video signal of different components of R (red), G (green), and B (blue) corresponding to the quantity of light of the optical image of an photographic subject formed by the present wide angle optical system and outputs to a prescribed image processing circuit (not shown in the figure). With this arrangement, the optical image on the image side of the photographic subject is guided by the wide angle optical system along its optical axis AX to the light receiving surface of the image sensor 17, and the optical image of the photographic subject is picked up by the image sensor 17.

Further, in the present wide angle optical system 1, each of the first lens 11 and the second lenses 12 is a negative meniscus lens having a convex surface on the object side, the third lens 13 is a positive lens with both surfaces convex, the aperture 15 is an aperture diaphragm, and the fourth lens 14 is a positive lens with both surfaces convex. By having a configuration like this, since, while achieving a wide angle of field, the optical powers of each of the lenses are suppressed, it is possible to increase the productivity of the wide angle optical system 1. In particular, by placing two negative meniscus lenses 11 and 12 from the object side towards the image side, the optical powers of the two negative lenses are reduced, thus it is possible to acquire sufficient back focus. Further, by placing an aperture 15 and two both surfaces convex positive lenses 13 and 14 on the image side of the first and second lenses 11 and 12, this form becomes symmetrical with respect to the aperture 15, thus distortion and astigmatism are effectively corrected.

Further, in the present wide angle optical system 1, the second lens 12 is a lens made of resin material and has at least one aspherical surface. In the example shown in FIG. 1, the second lens 12 is a lens made of a resin material and has aspherical surfaces on the both sides. In this manner, an aspherical surface is provided on the second lens 12, and distortion is well corrected. In addition, this aspherical surface is realized by using a lens made of resin material, and it is possible to obtain a high performance lens at a low cost.

Further, in the present wide angle optical system 1, the third lens 13 is a lens made of resin material and has at least one aspherical surface. In the example shown in FIG. 1, the third lens 13 is a lens made of a resin material and has aspherical surfaces on the both sides. In this manner, an aspherical surface is provided on the third lens 13, and the spherical aberration, coma aberration, and astigmatism are effectively corrected. In addition, this aspherical surface is realized by using a lens made of resin material, and it is possible to obtain a high performance lens at a low cost.

Further, in the present wide angle optical system 1, the fourth lens 14 is a lens made of resin material and has at least one aspherical surface. In the example shown in FIG. 1, the fourth lens 14 is a lens made of resin material and has aspherical surfaces on the both sides. In this manner, an aspherical surface is provided on the fourth lens 14, and the spherical aberration, coma aberration, and astigmatism are effectively corrected. In addition, this aspherical surface is realized by using a lens made of resin material, and it is possible to obtain a high performance lens at a low cost.

Further, in the present wide angle optical system 1, the lens on the most object side, that is, the first lens 11, is a lens made of glass. Since placing a lens protection member before the optical system conflicts size reduction (making the system compact), the most object side lens is often uncovered. Therefore, the most object side first lens 11 is made of glass in this manner, and it is possible to make the strength high, difficult to get scratched, to reduce the generation of flares due to scratches, and deterioration in the imaging performance.

Further, in the present wide angle optical system 1, the second lens 12 having a negative optical power and the fourth lens 14 having a positive optical power are constructed from a resin material. With this configuration, even when the usage temperature range is relatively wide as in applications for in-car use or for monitoring, it is possible to suppress the variations in the back focus during changes in the temperature.

Further, in the present wide angle optical system 1, it is desirable that the following conditional relationship (2) is satisfied, if the combined focal length of the third lens 13 is taken to be f3, and the overall focal length of this entire wide angle optical system 1 is taken to be f.

$$2.9<f3/f<3.6 \quad (2)$$

If the upper limit of this conditional relationship (2) is exceeded, either the overall optical length is increased, or the optical power of the fourth lens 14 is high, and manufacturing error sensitivity becomes high, which situation is not favorable. Further, if the lower limit of this conditional relationship (2) is not satisfied, the manufacturing error sensitivity of the third lens 13 increases by a relatively large amount, thus it leads to decrease in productivity and increase in cost, which situation is not favorable. Therefore, by having such a configuration as this, it is possible to provide a more inexpensive and more compact wide angle optical system 1.

Further, in the present wide angle optical system 1, it is desirable that the following conditional relationship (3) is satisfied if the spacing along the optical axis between the first lens 11 and the second lens 12 is taken to be D12, and the overall focal length of this entire wide angle optical system 1 is taken to be f.

$$2.1 < D12/f < 5 \quad (3)$$

If the upper limit of this conditional relationship (3) is exceeded, the external diameter of the first lens 11 becomes very large, and size reduction of the present wide angle optical system 1 becomes difficult, which situation is not favorable. Further, if the lower limit of this conditional relationship (3) is not satisfied, it is not possible to increase the optical power of the image side surface of the first lens 11 and the object side surface of the second lens 12, thus the curvature of the object side surface of the second lens 12 becomes extremely large, which situation is not favorable. In addition, the combined optical power of the first lens 11 and the second lens 12 becomes very strong, thus the correction of distortion becomes difficult, which situation is not favorable. Therefore, by having such a configuration as this, it is possible to provide a more compact wide angle optical system 1 with better optical characteristics.

Further, in the present wide angle optical system 1, it is desirable that the following conditional relationship (3') is satisfied:

$$2.5 < D12/f < 4.5 \quad (3')$$

If the upper limit of this conditional relationship (3') is exceeded, the combined optical power of the first and second lenses 11 and 12 becomes low, thus the telecentricity with respect to the imaging plane becomes poor, which situation is not favorable. Further, if the lower limit of this conditional relationship (3') is not satisfied, in the first lens 11 and the second lens 12, thus interference can occur easily in the edge portion, and in order to avoid this, the lens shape or the lens tube shape becomes complex, which situation is not favorable. Therefore, by having such a configuration as this, it is possible to provide a more inexpensive wide angle optical system 1 that has much better optical characteristics.

Further, in the present wide angle optical system 1, it is desirable that the following conditional relationship (4) is satisfied if the focal length of the second lens 12 is taken to be f2, and the overall focal length of this entire wide angle optical system 1 is taken to be f.

$$2.2 < |f2/f| < 3 \quad (4)$$

If the upper limit of this conditional relationship (4) is exceeded, the correction of distortion becomes difficult, which situation is not favorable. Further, if the lower limit of this conditional relationship (4) is not satisfied, the curvature of the image side surface of the second lens 12 as well as the angle of field become very large, thus manufacturing becomes difficult, which situation is not favorable. Therefore, by having such a configuration as this, it is possible to provide a more inexpensive wide angle optical system 1 that has much better optical characteristics.

Further, in the present wide angle optical system 1, it is desirable that the following conditional relationship (5) is satisfied, if the focal length of the first lens 11 is taken to be f1, and the overall focal length of this entire wide angle optical system 1 is taken to be f.

$$7.5 < |f1/f| < 10 \quad (5)$$

If the upper limit of this conditional relationship (5) is exceeded, the angle of incidence of off-axis light beam into the image plane becomes very large, thus the brightness decreases on the periphery of the screen, which situation is not favorable. Further, if the lower limit of this conditional relationship (5) is not satisfied, the curvature of the image side surface of the first lens 11 and the angle of field become very large, thus manufacturing becomes difficult, which situation is not favorable. Therefore, by having such a configuration as this, it is possible to provide a more inexpensive wide angle optical system 1 that has much better optical characteristics.

Further, in the present wide angle optical system 1, it is desirable that the following conditional relationship (6) is satisfied if the focal length of the first lens 11 is taken to be f1 and the focal length of the second lens 12 is taken to be f2.

$$2.8 < f1/f2 < 4 \quad (6)$$

If the upper limit of this conditional relationship (6) is exceeded or if the lower limit of this conditional relationship (6) is not satisfied, the curvatures of the image side surface of the first and second lenses 11 and 12 as well as the angle of field become very large, thus manufacturing becomes difficult, which situation is not favorable. Therefore, by having such a configuration as this, it is possible to provide a more inexpensive wide angle optical system 1.

Further, in the present wide angle optical system 1, it is desirable that the following conditional relationship (7) is satisfied if the combined focal length of the first lens 11 and the second lens 12 is taken to be f12, and the overall focal length of this entire wide angle optical system 1 is taken to be f.

$$1.2 < |f12/f| < 1.6 \quad (7)$$

If the upper limit of this conditional relationship (7) is exceeded, the off-axis light beam incidence angle into the imaging plane becomes large, thus the brightness decreases on the periphery of the screen, which situation is not favorable. Further, if the lower limit of this conditional relationship (7) is not satisfied, the curvature of the image side surface of the first lens 11 and the angle of field become very large, thus manufacturing becomes difficult, which situation is not favorable. Therefore, by having such a configuration as this, it is possible to provide a more inexpensive wide angle optical system 1 that has much better optical characteristics.

Further, in the present wide angle optical system 1, it is desirable that the following conditional relationship (8) is satisfied if the focal length of the third lens is taken to be f3 and the focal length of the fourth lens is taken to be f4.

$$0.88 < f3/f4 < 1.55 \quad (8)$$

If the upper limit of this conditional relationship (8) is exceeded or if the lower limit of this conditional relationship (8) is not satisfied, the optical powers of the third and fourth lenses 13 and 14 become very large, and the manufacturing error sensitivity becomes high particularly for the off-axis portion, thus this leads to deterioration in productivity and increase in cost, which situation is not favorable. Therefore, by having such a configuration as this, it is possible to provide a more inexpensive wide angle optical system 1.

Further, in the present wide angle optical system 1, it is desirable that the following conditional relationship (9) is satisfied if the focal length of the fourth lens 14 is taken to be f4, and the overall focal length of this entire wide angle optical system 1 is taken to be f.

$$2 < f4/f < 3 \qquad (9)$$

If the upper limit of this conditional relationship (9) is exceeded, the off-axis light beam incidence angle at the imaging plane becomes large, thus the brightness decreases on the periphery of the screen, which situation is not favorable. Further, if the lower limit of this conditional relationship (9) is not satisfied, the optical power of the fourth lens 14 becomes large, and the manufacturing error sensitivity becomes high particularly for the off-axis portions, thus this leads to deterioration in productivity and increase in cost. Therefore, by having such a configuration as this, it is possible to provide a more inexpensive wide angle optical system 1 that has much better optical characteristics.

Further, in the present wide angle optical system 1, it is desirable that the following conditional relationship (10) is satisfied is the combined focal length of the first lens 11, the second lens 12, and the third lens is taken to be f123, and the overall focal length of this entire wide angle optical system 1 is taken to be f.

$$9.5 < f123/f < 23 \qquad (10)$$

If the upper limit of this conditional relationship (10) is exceeded, the overall optical length increases, thus size reduction of the wide angle optical system 1 is not achieved, which situation is not favorable. Further, if the lower limit of this conditional relationship (10) is not satisfied, the optical power of the third lens 13 becomes large, and the manufacturing error sensitivity increases by a large amount, thus this lead to deterioration in productivity and increase in cost. Therefore, by having a configuration such as this, it is possible to provide a more inexpensive and more compact wide angle optical system 1.

Further, in the present wide angle optical system 1, it is desirable that the following conditional relationship (11) is satisfied, when the maximum effective radius of the image side surface of the most object side lens is taken to be Da, and the paraxial curvature radius of the image side surface of the most object side lens is taken to be R2.

$$0.85 < Da2/R2 < 0.95 \qquad (11)$$

If the upper limit of this conditional relationship (11) is exceeded, the curvature and angle of field become very large on the image side surface of the second lens 12, thus manufacturing becomes difficult, which situation is not favorable. Further, if the lower limit of the conditional relationship (11) is not satisfied, the correction of distortion becomes insufficient, and the off-axis light beam incidence angle at the imaging plane becomes large, thus the brightness decreases on the periphery of the screen, which situation is not favorable. Therefore, by having such a configuration as this, it is possible to provide a more inexpensive wide angle optical system 1 that has much better optical characteristics.

Further, in the present wide angle optical system 1, it is desirable that the following conditional relationships (12) and (13) are satisfied, if the amount of deviation at a position of the maximum effective radius on the image side surface of the second lens 12 is taken to be Dp4, the paraxial curvature radius of the image side surface of the second lens 12 is taken to be R4, and the amount of aspherical sag (difference from a spherical surface) at a position at which the height from the optical axis is equal to the paraxial curvature radius in the image side surface of the second lens is taken to be dZ4.

$$Dp4/R4 > 1 \qquad (12)$$

$$dZ4/R4 < -0.4 \qquad (13)$$

Figure 2:
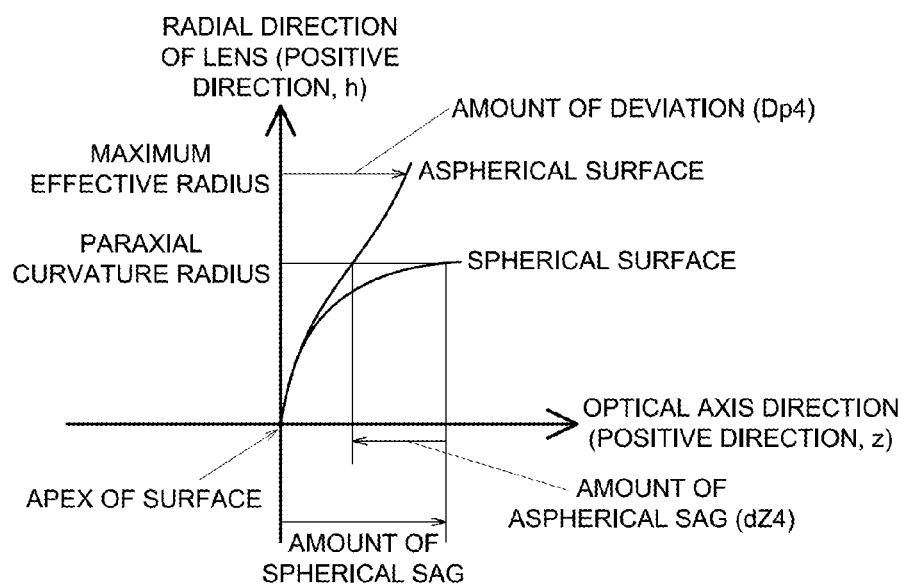
FIG. 2 is a diagram describing a deviation and an aspheric sag amount.

FIG. 2 is a diagram for explaining the amount of deviation Dp4 and the amount of aspherical sag dZ4. The z-axis (the horizontal axis) in FIG. 2 is the optical axis, the positive direction of the optical axis is in the positive direction of the z-axis, and the h-axis (the vertical axis) is the radial direction of the lens. Further, the origin of the coordinate system corresponds to the apex of the lens surface. In the cross-sectional shape of the lens, as is shown in FIG. 2, the amount of deviation Dp4 is the distance from the apex in the direction of the optical axis to the maximum effective radius. Further, as is shown in FIG. 2 the amount of aspherical sag dZ4 is a parameter representing the difference between the following two values: the distance, in the direction of the optical axis, from the apex point of the lens surface to the point on the aspherical curved line at the maximum effective radius; and the amount of the spherical sag based on the paraxial curvature radius.

If the lower limit of this conditional relationship (12) or the upper limit of this conditional relationship (13) is exceeded, in either case, correction becomes difficult of off-axis aberration, particularly, of astigmatism, which situation is not favorable. Therefore, by having such a configuration as this, it is possible to provide a wide angle optical system 1 that has much better optical characteristics.

Further, in the present wide angle optical system 1, it is desirable that the following conditional relationship (14) is satisfied for the principal light rays of a light beam of a half field angle of 90 degrees, if the position on the image plane of the principal light rays (the distance from the optical axis) is taken to be Yr, and the overall focal length of this entire wide angle optical system 1 is taken to be f.

$$-0.3 < Yr/2f - 1 < 0.7 \qquad (14)$$

If the upper limit of this conditional relationship (14) is exceeded, correction becomes difficult of off-axis aberration, particularly, of astigmatism and chromatic aberration of magnification, which situation is not favorable. Further, if the lower limit of this conditional relationship (14) is not satisfied, the compression ratio of the peripheral image becomes very large, thus there will be some drop in the amount of information of the peripheral part, which situation is not favorable. Therefore, this is an unfavorable situation but the resolution in the peripheral part gets greatly reduced, even if correction is performed using image processing. Therefore, by having such a configuration as this, it is possible to provide a wide angle optical system 1 that has much better optical characteristics.

Further, in the present wide angle optical system 1, it is more desirable that the following conditional relationship (14') is satisfied for the principal light rays of a light beam of a half field angle of 90 degrees, $$-0.2 < Yr/2f - 1 < 0.6 \qquad (14')$$

If the upper limit of this conditional relationship (14') is exceeded, it becomes necessary to increase the number of lenses for carrying out correction of off-axis aberration, and the cost will be increased, which situation is not favorable. Further, if the lower limit of this conditional relationship (14') is not satisfied, the amount of information of the peripheral part becomes poor, causing loss of the merits (advantages) of monitoring wide image angles, and this situation is not favorable. Therefore, by having such a configuration as this, it is possible to provide an inexpensive wide angle optical system 1 that has much better optical characteristics.

Further, in the present wide angle optical system 1, it is desirable that the following conditional relationship (15) is satisfied, if the maximum image height is taken to be Y', and the distance along the optical axis from the apex of the lens surface closest to the object to the image plane is taken to be TL (note that back focus is an air equivalent length).

$$Y'/TL>0.1 \tag{15}$$

If the lower limit of this conditional relationship (15) is not satisfied, the overall optical length increases drastically, thus size reduction of the wide angle optical system 1 is not achieved, which situation is not favorable. Therefore, by having such a configuration as this, it is possible to provide a more compact wide angle optical system 1.

Further, in the present wide angle optical system 1, it is more desirable that the following conditional relationship (15') is satisfied:

$$Y'/TL>0.12 \tag{15'}$$

If the lower limit of this conditional relationship (15') is not satisfied, the external diameter of the front lens becomes very large, thus it becomes difficult to make the wide angle optical system 1 compact, which situation is not favorable. Therefore, by having such a configuration as this, it is possible to provide a more compact wide angle optical system 1.

Further, in the present wide angle optical system 1, it is desirable that the following conditional relationship (16) is satisfied, if the position of the exit pupil with respect to the maximum image height principal light beam is taken to be Ep, and the back focus (air equivalent length) is taken to be Lb.

$$|Ep|/Lb>2.2 \tag{16}$$

If the lower limit of this conditional relationship (16) is not satisfied, it becomes difficult to reduce the reduction in the peripheral brightness, even if the lens array is placed immediately before the image plane, which situation is not favorable. Therefore, by having such a configuration as this, it is possible to provide a wide angle optical system 1 that has much better optical characteristics.

Further, in the present wide angle optical system 1, it is more desirable that the following conditional relationship (16') is satisfied:

$$|Ep|/Lb>2.6 \tag{16'}$$

If the lower limit of this conditional relationship (16') is not satisfied, the deterioration in the peripheral brightness is large due to shading, thus the amount of information in the peripheral portion of the image decreases, which situation is not favorable. Therefore, by having such a configuration as this, it is possible to provide a wide angle optical system 1 that has much better optical characteristics.

Further, in the present wide angle optical system 1, it is desirable that the following conditional relationship (17) is satisfied, the first lens 11 in the example shown in FIG. 1, the powder of the glass material of the lens that is closest to the object side is put in a 0.01 mol/l aqueous solution of nitric acid, heated in a tank of boiling water, the acid resistance value calculated as the resultant reduction in mass (%) is taken to be DA1.

$$DA1<0.35 \tag{17}$$

If the upper limit of this conditional relationship (17) is exceeded, a chemical reaction such as so called corrosion, may occur when the most object side is exposed without any protection to the external environment, for example, thus the optical characteristics of the wide angle optical system 1 decrease. However, when the most object side lens satisfies the conditional relationship (17), it is possible to decrease the reduction in the optical characteristics. Here, the numerical values and the measurement method in the present invention are adopted from those described in the catalog of optical glass of Hoya Co., Ltd., or in the catalog of optical glass of Sumida Optical Glass Co., Ltd.

Further, in the present wide angle optical system 1, it is desirable that the most object side lens, the first lens 11 in the example shown in FIG. 1, satisfies either one or both of the following conditional relationships (18) and (19), when a glass material with a diameter of 43.7 mm (30 cm² for both surfaces) and a thickness of about 5 mm with opposite faces polished, and with the Knoop's hardness number being denoted by Hk1, is immersed for one hour in a 50° C. 0.01 mol/l aqueous solution of tri-phosphorous penta-sodium oxide ($Na_5P_3O_{10}$) which is being stirred thoroughly, the value of the reduction in the mass (mg/(cm²·h)) per unit area is denoted by DS1.

$$Hk1>350 \tag{18}$$

$$DS1 \leq 0.01 \tag{19}$$

A glass material that satisfies at least one of these two conditional relationships (18) and (19) is superior in robustness, resistance to chemicals, and water resistance characteristics. Since the first lens 11 that is closest to the object is a lens made of such a glass material, for example, even if a lens protection member is not provided and the lens is exposed being uncovered, it is superior in robustness, resistance to chemicals, and water resistance characteristics, thus it is possible to prevent deterioration in the imaging performance, which situation is favorable. In particular, in applications for in-car use, the front-most surface is very likely to be uncovered, therefore suitable for such applications.

Further, in the present wide angle optical system 1, except for the lens that is closest to the object, it is desirable that all lens surfaces that are in contact with air are aspherical surfaces. By having such a configuration as this, it is possible to realize both compactness and high image quality of the wide angle optical system 1.

Further, in the present wide angle optical system 1, it is also possible that, the glass lens having an aspherical surface is a glass molded aspherical lens, or a polished aspherical surface glass lens, or a composite type aspherical lens (a lens in which aspherical shaped resin layer is formed on a spherical surface glass lens). Glass molded aspherical lenses are desirable because they are suitable for mass manufacturing, composite type aspherical lenses have a high degree of design freedom since a large number of types of glass materials are available for substrate. In particular, regarding an aspherical lens using a high refractive index material, since forming by molding is not easy for such material, composite type aspherical lenses are desirable. Further, in the case of a lens with one aspherical surface, it is possible to make the maximum use of the advantages of the composite type aspherical lenses.

Further, in this wide angle optical system 1, it is desirable that at least one of the lenses made of resin material, which is, for example, at least one resin lens of the second lens 12 through the fourth lens 16 of the example shown in FIG. 1 resin, is preferably a resin lens formed of material containing particles with a maximum length of 30 nanometers or less dispersed in resin material.

In general, when fine particles are mixed in transparent resin materials, since the light is dispersed thereby reducing the transmittance, it was difficult to use them as optical materials. However, by making the size of the fine particles smaller than the wavelength of the transmitted light beam, it is possible to constitute a resin material in which scattering practically does not occur.

Explaining the dependence of the refractive index on temperature, the change with temperature of the refractive index n(T) can be expressed by the equation (20) by differentiating the refractive index n with respect to the temperature T, based on the Lorentz-Lorenz equation.

$$n(T)=((n2+2)\times(n2-1))/6n\times(-3\alpha+(1/[R]\times([\partial R]/\partial T)) \quad (20)$$

where α is a linear expansion coefficient, and [R] is a molecular refraction.

In the case of a resin material, in general, the dependence of refractive index is less affected by the second term than by the first term in equation (13), and is almost negligible. For example, in the case of the PMMA resin, the linear expansion coefficient α is $7\times10^{-5}$, and when it is substituted in equation (20), we get $n(T)=-1.2\times10^{-4}$ (/° C.), which roughly matches with the actual measured value.

The refractive index decreases with an increase in temperature with respect to resin material, on the contrary the refractive index increases with an increase in temperature with respect to inorganic particles. Because of this, by using such temperature dependence so as to cancel each other it is possible to ensure that there is almost no change in the refractive index with temperature. For example, by dispersing inorganic fine particles with a maximum length of 30 nanometers or less in resin material that acts as the base material, it becomes a resin material in which the temperature dependence of refractive index has been reduced. For example, by dispersing Niobium pentoxide ($Nb_2O_5$) fine particles in acrylic resin, it is possible to generate a material having very small changes in refractive index with temperature. According to the above construction, when a resin material in which such inorganic fine particles are dispersed is used for at least one lens, it is possible to reduce to a small extent the shift in the back focus of the wide angle optical system 1 caused by environmental temperature changes.

From the point of view of reducing to a small extent the shift in the back focus, of the wide angle optical system 1, caused by environmental temperature changes, it is desirable that, the temperature dependence of the refractive index n(T) is reduced to less than $8\times10^{-5}$ (/° C.) in absolute value, and it is more desirable to make it less than $6\times10^{-5}$ (/° C.) in absolute value. When the temperature dependence of the refractive index n(T) in absolute value is less than $6\times10^{-5}$ (/° C.), the shift in the back focus, of the wide angle optical system 1, caused by environmental temperature changes is reduced by about half.

Therefore, polyolefin series resin materials, or polycarbonate series resin materials, or polyester series resin materials are favorably used as such materials. In the case of polyolefin series resin materials the temperature dependence of the refractive index n(T) becomes about $-11\times10^{-5}$ (/° C.), and in the case of polycarbonate series resin materials the temperature dependence of the refractive index n(T) becomes about $-14\times10^{-5}$ (/° C.).

(Description on a Digital Device Incorporating a Wide Angle Optical System)

Next, descriptions are given about a digital device in which a wide angle optical system 1 described above is incorporated.

Figure 3:
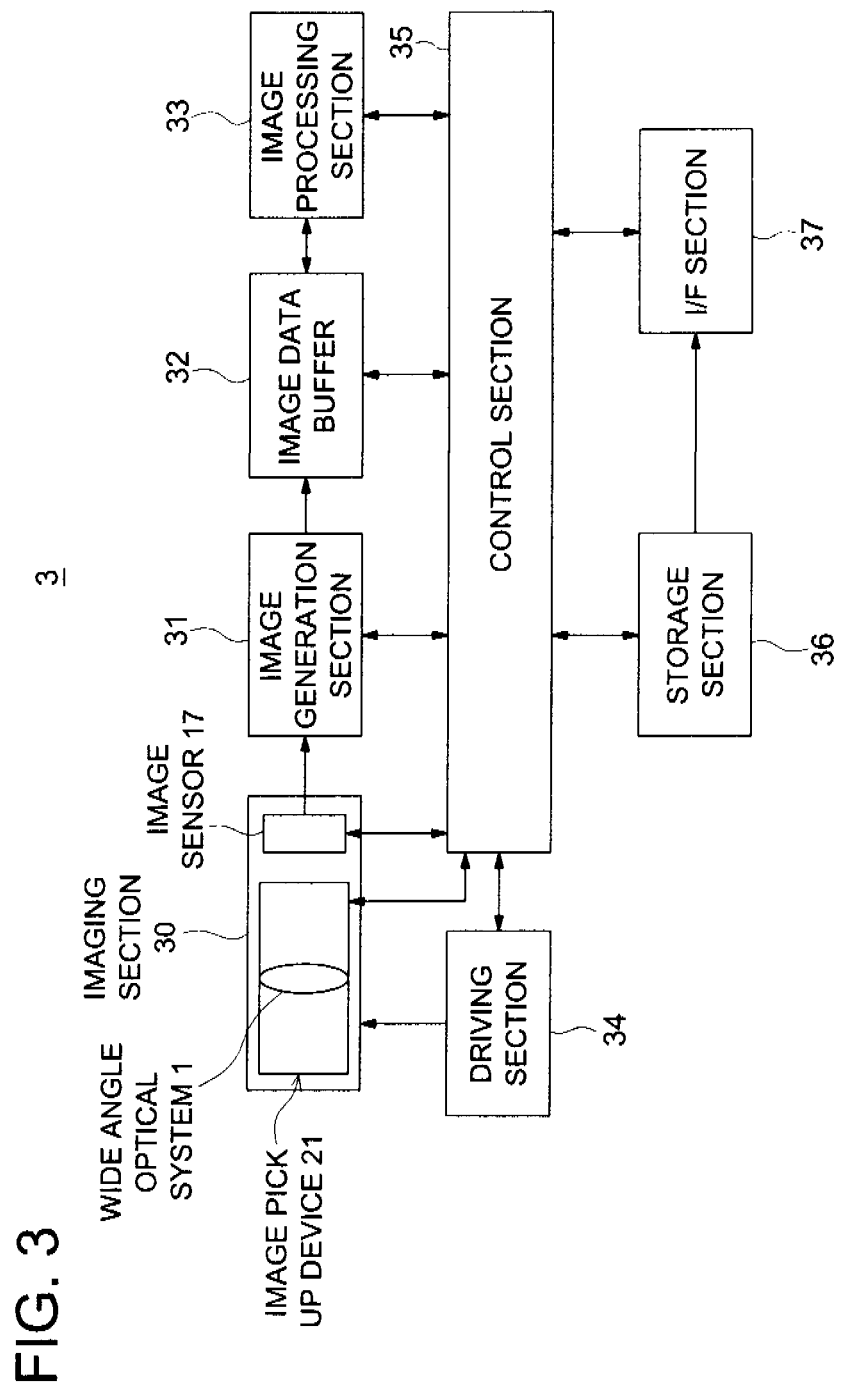
FIG. 3 is a block diagram showing a configuration of a digital device according to an embodiment.

FIG. 3 is a block diagram showing the configuration of a digital device according to a preferred embodiment. In FIG. 3, a digital device 3 is provided, for an imaging function, with an imaging section 30, an image generation section 31, an image data buffer 32, an image processing section 33, a driving section 34, a control section 35, a storage section 36, and an I/F section 37. As the digital device 3, examples include a digital still camera, a digital video camera, a monitoring camera (monitor camera), a portable terminal such as a mobile telephone or a personal digital assistant (PDA), etc., a personal computer, and a mobile computer, and the digital device 3 also includes peripheral equipment (for example, a mouse, a scanner, a printer, etc.) for these devices.

The imaging section 30 is configured with an image pickup device 21 and an image sensor 17. The image pickup device 21 is configured with a wide angle optical system 1 shown in FIG. 1 and an imaging lens device that is not shown in a figure and is configured such that the wide angle optical system 1 forms an optical image of the photographic subject on a prescribed imaging plane, which is, for example, the image sensor 17 in the example of FIG. 3, and with a lens driving device not shown in a figure for driving the lens in the direction of an optical axis to focus. The light beam from the photographic subject is guided by the wide angle optical system 1 to form an image of the optical image of the photographed object on the light receiving surface of the image sensor 17 wide angle.

The image sensor 17 is an element that converts the optical image of the photographic subject guided by the imaging lens device of the image pickup device 21, and as above, it converts the optical image of the photographic subject formed by the wide angle optical system 1 into an electrical signal (video signal) with color components of R, G, and B, and outputs the video signals of each of the colors R, G, and B to the image generation section 31. The image sensor 17 is controlled by the control section 35 to perform image pickup operations such as image picking up one of still images and moving images, or operations such as reading out (horizontal synchronization, vertical synchronization, transfer) the output signals of the different pixels in the image sensor 17, etc. The image sensor 17 can be, for example, a solid state image sensor such as a CCD, or CMOS, etc., and can be a color image sensor or a monochrome image sensor.

On the analog output signal from the image sensor 17, the image generation section 31 performs not only amplification processing, digital conversion processing, etc., but also various well known image processing of determining the appropriate black level for the entire image, γ correction, white balance adjustment (WB adjustment), contour correction, and color irregularity correction, etc. so as to generate the image data of different pixels from the image signal. The image data generated in the image generation section 31 is output to the image data buffer 32.

The image data buffer 32 is a memory that is used for temporarily storing image data and for a working storage at the time of the later-described processing that is carried out by the image processing section 33 on that image data, and is constituted, for example, by a RAM (Random Access Memory) which is a volatile storage device.

The image processing section 33 is a circuit that carries out image processing such as resolution conversion on the image data in the image data buffer 32. Further, if necessary, the image processing section 33, can also be configured to carry out publicly known distortion correction processing that corrects the distortion of the optical image of the photographic subject formed on the light receiving surface of the image sensor 17, so as to correct the aberrations that could not be completely corrected by the wide angle optical system 1. Distortion correction corrects the optical image of the photographic subject that has been distorted due to aberrations into a natural image with almost no distortion similar to the scenery viewed by the naked eye. By configuring in this manner, even if there are distortions in the optical image of the photographic subject guided to the image sensor 17 by the imaging lens device of the image pickup device 21, it becomes possible to generate a natural image with almost no distortion similar to the scenery viewed by naked eyes.

The driving section 34 is a circuit that causes the lens driving device not shown in the figure to operate based on the control signals output from the control section 35, thereby performing focusing of the wide angle optical system 1.

The control section 35 is provided with, for example, a microprocessor and its peripheral circuits, etc., and controls the operations of the imaging section 30, the image generation section 31, the image data buffer 32, the image processing section 33, the driving section 34, the storage section 36, and the I/F section 37 according to their functions. In other words, by this control section 35, the image pickup device 21 is controlled so as to carry out image picking up of at least one of still image pickup and moving image of a photographed object.

The storage section 36 is a storage circuit that stores the image data generated by the image picking up of still image or moving image of the photographic subject, and is provided with, for example, a ROM (Read Only Memory) which is a nonvolatile storage device, or an EEPROM (Electrically Erasable Programmable Read Only Memory) which is a rewritable nonvolatile storage device, or a RAM, etc. In other words, the storage section 36 has the function of storing still images or moving images.

The I/F section 37 is an interface that transmits and receives image data to and from an external device, and is an interface conforming to, for example, the standards such as USB, IEEE 1394.

The image pickup operation of a digital device 3 having the above-described configuration is described next.

When picking up a still image, the control section 35, not only carries out control so as to make the imaging section 21 pick up still images, but also carries out focusing by driving the lens driving device, not shown in the figure, of the image pickup device 21 via the driving section 34. Thus, focused optical images are formed periodically and repeatedly on the light receiving surface of the image sensor 17, and the image is converted into a video signal of R, (and B color components, and the signal is then output to the image generation section 31. This video signal is temporarily stored in the image data buffer 32, and after image processing is carried out by the image processing section 33, an image based on that video signal is displayed on a display device (not shown in the figure). Further, the photographer, by referring to the display, can make adjustments so that the main photographic subject is at the desired position in the screen. By pressing the so called shutter button (not shown in the figure) in this condition, the image data is stored in the storage section 36 as a memory for still images, and still images are obtained.

Further, when carrying out moving image pickup, the control section 35 carries out control so as to make the image pickup device 21 pick up moving images. After that, similarly to the case of still image photography, the photographer, by referring to the display (not shown in the figure), can make adjustments so that the image of the photographic subject to be obtained by the image pickup device 21 is at the desired position on the screen. In this case, similarly to the case of still image pickup, by pressing the shutter button (not shown in the figure), moving image pickup is started.

During moving image pickup, the control section 35 carries out control so as to make the imaging section 21 pick up moving images, and carries out focusing by driving the lens driving device not shown in the figure of the image pickup device 21 via the driving section 34. Thus, focused optical images are formed periodically and repeatedly on the light receiving surface of the image sensor 17, and the image is converted into a video signal with R, G, and B color components, and the signal is then output to the image generation section 31. This video signal is temporarily stored in the image data buffer 32, and after image processing is carried out by the image processing section 33, an image based on that video signal is displayed on a display device (not shown in the figure). Next, the movie photography is stopped by pressing the shutter button again. The picked up moving images are guided to and stored in the storage section 36 as a memory for moving images.

Since such a digital device 3 or an image pickup device 21 (the imaging lens device) provided with a wide angle optical system 1 which is compact and has superior optical characteristics compared to the prior art, it is possible to employ an image sensor 17 having large number of pixels while keeping compactness.

Next, as a concrete example of a digital device provided with the wide angle optical system 1, a case in which an image pickup device 21 is installed in a mobile telephone and a case in which an image pickup device 21 is installed in a monitor camera for in-car use are each explained below.

Figure 4A:
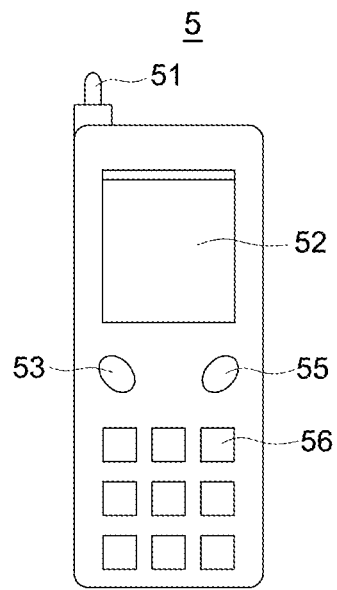
FIGS. 4A and 4B are configuration diagrams showing an appearance of a portable phone equipped with a camera according to an embodiment of a digital device.
Figure 4B:
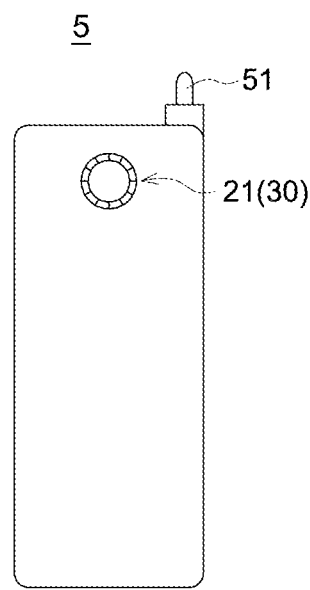

FIGS. 4A and 4B are external view configuration diagrams of a mobile telephone with a camera that is a preferred embodiment of a digital device. FIG. 4A shows the operation side of a mobile telephone, and FIG. 4B shows the backside of the operation side, that is, the back side.

In FIGS. 4 A and 4B, the mobile telephone 5 is provided with an antenna in the top part, and in its operation side, as is shown in FIG. 4A, a rectangular display 52, an image pickup button 53 for carrying out starting of the image pickup mode and for switching between still image pickup and moving image pickup, a shutter button 55, and a dial button 56. Further, in this mobile telephone 5 is provided with circuits for realizing telephone functions utilizing the mobile telephone network, an image pickup section 30, an image generation section 31, an image data buffer 32, an image processing section 33, a driving section 34, a control section 35, and a storage section 36, and the image pickup device 21 of the image pickup section 30 is on the back panel.

When the image pickup button 53 is operated, a control signal indicating the contents of that operation is output to the control section 35, and the control section 35 carries out operations according to those contents of the operation. Further, when the shutter button 55 is pressed, a control signal indicating the contents of that operation is output to the control section 35, and the control section 35 carries out operations according to those contents of the operation. Still images and moving images are imaged in this manner.

Further, the wide angle optical system 1 according to the present preferred embodiment is desirably installed in a monitoring camera that is installed at a prescribed position and picks up images of the photographic subjects within the prescribed region in the surroundings of the installed position, for example, in a monitoring camera for in-car use that picks up images of the regions surrounding the automobile.

Figure 5:
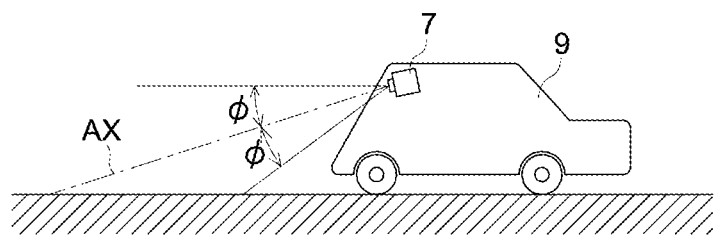
FIG. 5 is a diagram generally showing an appearance of a monitor camera for car-mount use according to an embodiment of a digital device.

FIG. 5 is a diagram for explaining the outline of a monitor camera for in-car use of a preferred embodiment of a digital device. In FIG. 5, a monitor camera 7 for in-car use, is mounted at a prescribed position on the rear part of the automobile 9 so as to pickup, for example, images of the objects behind the automobile, and the images of the photographic subjects are displayed, for example, on a monitor not shown in the figure but installed, for example, in the dashboard. The monitor camera 7 for in-car use is typically installed in the automobile in a downwardly inclined orientation with its optical axis AX tilted downwards since the monitor is not demanded to have a field of view upwards from the automobile 9. Further, it has a vertical angle of field of 2φ with its top edge being on the horizontal line passing through the installation position of the monitor camera 7. In addition, in the present specification, although the angle of field in the horizontal direction has the same value of 2φ as the angle of field in the up-down direction, it is not necessary to be restricted to this, and the angle of field can be different in the vertical direction from the angle of field in the horizontal direction.

The following description generally explains below, with reference to the drawings, the process flow in the case where a monitor camera 7 for in-car use is used as a rear view monitor. The user (the driver) drives the car backward while watching the monitor (display device) that is not shown in the figure but has been installed, for example, in the dashboard of the automobile 9. At this time, if the region that the driver wishes to watch is different from the region displayed by the monitor camera 7, the driver carries out prescribed operations such as operating the operation buttons that are not shown in the figure but are provided on the dashboard, etc.

Upon receiving these operations, the control section 35, controls the driving section 34, and adjusts the orientation of the image pickup section 30. Subsequently, the control section 35 drives the lens driving device of the image pickup device 21, and carries out focusing of the wide angle optical system 1. Thus, a focused optical image is formed on the light receiving surface of the image sensor 17, and the image is converted into R, G, and B color components of a video signal, and the signal is output to the image generation section 31. This video signal is temporarily stored in the image data buffer 32, and image processing is carried out by the image processing section 33. In this manner, a nearly natural image of the region that the driver wishes to watch is displayed on the monitor installed in the dashboard.

(Explanation of More Concrete Examples of a Wide Angle Optical System)

The following description describes a concrete construction of the wide angle optical system 1 of FIG. 1, which is the wide angle optical system 1 installed in the image pickup device 21 mounted on the digital device 3 of FIG. 3.

EXAMPLES

Example 1

Figure 6:
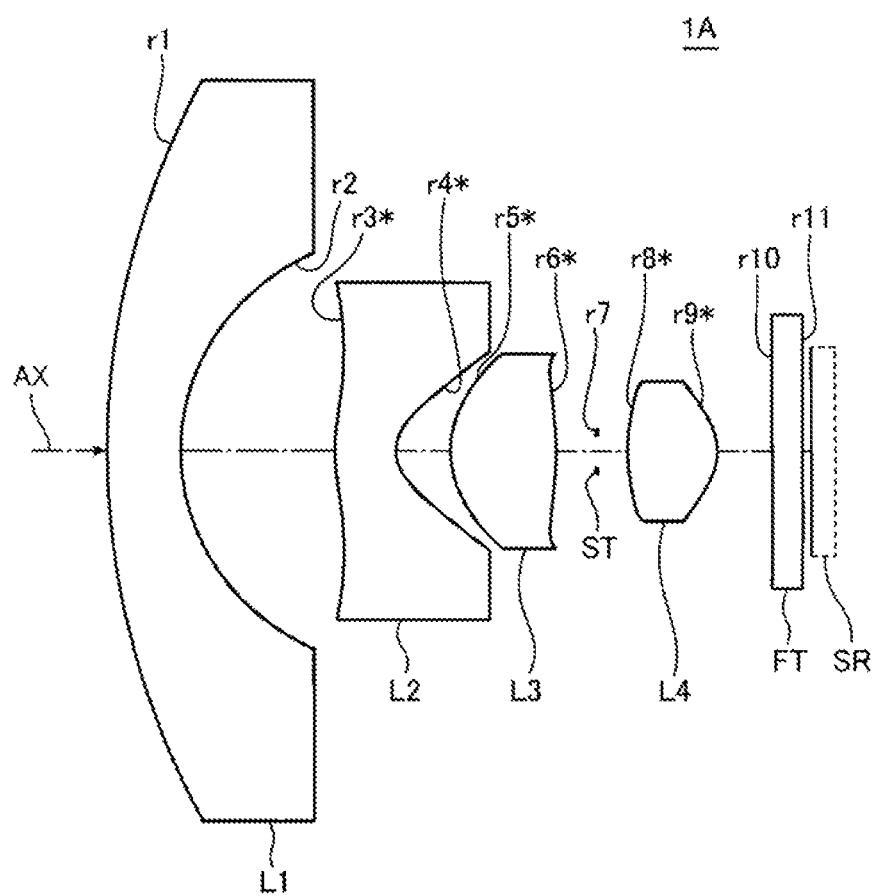
FIG. 6 is diagram showing a cross sectional view of an arrangement of a lens group in a wide angle optical system according to a first embodiment.

FIG. 6 is a cross-sectional view diagram showing an example of an arrangement of a lens group in a wide angle optical system according to Example 1. FIGS. 24A, 24B, 24C and FIG. 25 are aberration diagrams of the lens groups in the wide angle optical system of Example 1.

A wide angle optical system 1A of Example 1 is, as shown in FIG. 6, a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). These lenses from the second lens 12 to the fourth lens 14 respectively have aspherical surfaces on both sides, and are lenses made of, for example, resin material.

Further, the light receiving surface of an image sensor SR is disposed on the image side of the fourth lens L4 with a parallel plate FT therebetween as a filter. The parallel plate FT includes a variety of optical filters and a cover glass for the image sensor, and the like.

In FIG. 6, the number ri (r=1, 2, 3, . . . ) assigned to each lens surface indicates that it is the i-th lens surface counting from the object side (note that the cemented surfaces of lenses are treated as a single surface), and a surface denoted by ri having an asterisk * mark is an aspherical surface. Further, the aperture diaphragm ST and opposite sides of the parallel plate FT, and the light receiving surface are each treated as one surface. These assumptions and indications of symbols are similar for the Example 2 through Example 18 that are described later (FIG. 7 to FIG. 23). However, it is not implied that they are completely identical. For example, Example 2 the same symbol (r1) is assigned to the most object side lens surface in FIG. 6 to FIG. 23 of Example 2 through Example 18, but it does not mean that their curvature, etc., are the same for Example 2 through Example 18.

In this type of construction, the light beam entering from the object side passes through, along the optical axis AX, the first lens L1, the second lens L2, the third lens L3, the aperture ST, the fourth lens L4, and the parallel plate FT in this order, and forms an optical image of the photographic subject on the light receiving surface of the image sensor SR. Further, in the image sensor SR, the optical image is converted into an electrical signal. This electrical signal, if necessary, is subjected to prescribed digital signal processing, etc., and as a digital video signal, for example, is stored in the memory of a digital device such as a digital camera, or is transmitted through wired or wireless communications to another digital device.

The construction data of the lenses in the wide angle optical system 1A of this Example 1 is given below.

Numerical Value Example 1

| Unit mm | | | | |
|---|---|---|---|---|
| Surface data | | | | |
| Surface number | r | D | nd | vd |
| Object surface | ∞ | ∞ | | |
| 1 | 14.154 | 1.200 | 1.83481 | 42.72 |
| 2 | 3.840 | 2.530 | | |
| 3* | 2.887 | 1.000 | 1.53048 | 55.72 |
| 4* | 0.693 | 0.895 | | |
| 5* | 1.942 | 1.729 | 1.63550 | 23.89 |
| 6* | −5.435 | 0.671 | | |
| 7(Aperture) | ∞ | 0.504 | | |
| 8* | 3.154 | 1.471 | 1.53048 | 55.72 |
| 9* | −1.066 | 0.900 | | |
| 10 | ∞ | 0.500 | 1.51680 | 64.20 |
| 11 | ∞ | 0.100 | | |
| Image surface | ∞ | | | |

| Aspherical surface data |
|---|

Third surface

K = −3.0000e+001, A4 = −1.3364e−002, A6 = 1.3918e−003,
A8 = −6.9228e−005, A10 = 1.3057e−006

Fourth surface

K = −1.0000e+000, A4 = −1.2584e−002, A6 = −8.8066e−002,
A8 = 3.7501e−002, A10 = −4.8796e−003

Fifth surface

K = 0.0000e+000, A4 = 4.6932e−002, A6 = −6.3958e−002,
A8 = 2.4821e−002, A10 = −3.6310e−003

-continued

Unit mm

Sixth surface

K = 0.0000e+000, A4 = 2.3370e-002, A6 = 1.8813e-003,
A8 = -2.2382e-003, A10 = -5.8927e-004, A12 = 5.1484e-004
Eighth surface K = 0.0000e+000, A4 = -8.2144e-002, A6 = 1.3260e-001,
A8 = -1.4095e-001, A10 = 5.9375e-002
Ninth surface K = -2.0000e+000, A4 = -7.4633e-002, A6 = 1.1084e-001,
A8 = -5.9296e-002, A10 = 1.2612e-002

Various data

| Focal length | 0.753 |
| F-number | 2.801 |
| Half angle of field | 101.595 |
| Image height | 1.700 |
| Overall lens length | 11.352 |
| BF | 1.352 |

In the above surface data, the surface number corresponds to the number i in the symbol ri (i=1, 2, 3, ...) assigned to each lens surface shown in FIG. 6. A surface indicated by i with an asterisk "*" added is an aspherical surface (a refractive aspherical optical surface or a surface exiting an aspherical-equivalent refractive action).

Further, "r" is a radius of curvature (unit: mm) of each surface, "d" is a spacing between different lens surfaces on the optical axis (on-axis surface spacing) in the infinite-focused state, "nd" is a refractive index of each lens for the d line (wavelength 587.56 nm), and "vd" is the Abbe's number. Further, since the aperture ST and the opposite sides of the parallel plate FT and the light receiving surface (imaging surface) of the image sensor SR are plane surfaces, their radii of curvature are ∞ (infinity).

The above aspherical surface data is the values of the quadratic surface parameter (cone constant K) and the aspheric coefficient Ai (i=4, 6, 8, 10, 12) of the surfaces that are aspherical (the surfaces indicated by number i to which an asterisk * is added in the surface data). Further, the aspherical surface shape of the optical surface is defined by the following equation using a local Cartesian coordinate system (x, y, z) with the apex of the surface located on the origin and with the direction from the object towards the image sensor oriented in the positive direction of the z-axis.

$$z(h)=ch^2/[1+\sqrt{\{1-(1+K)c^2h^2\}}]+\Sigma Ai \cdot h^i$$

where z(h): The amount of deviation along the z-axis at a position of height h (with respect to the apex of the surface)

h: Height in a direction perpendicular to the z-axis ($h^2=x^2+y^2$)

c: Paraxial curvature (=1/radius of curvature)

Ai: i-th order aspheric coefficient

K: Quadratic surface parameter (cone constant).

Further, in the above aspherical surface data, "en" means "10 to the power of n". For example, "e+001" means "10 to the power of +1", and "e-003" means "10 to the power of -3".

With the above lens arrangement and construction, the respective aberrations of the wide angle optical system 1A of Example 1 are shown in FIGS. 24A, 24B, 24C and FIG. 25. In the respective figures FIGS. 24A, 24B, 24C, there are shown from left side spherical aberration (sine condition) (LONGI- TUDINAL SPHERICAL ABERRATION), astigmatism (ASTIGMATISM FIELD CURVE), and distortion (DISTORTION). The horizontal axis of spherical aberration represents the deviation in mm units of the position of the focal point, and the vertical axis represents a value normalized by the maximum incidence height. The horizontal axis of astigmatism represents the deviation in mm units of the position of the focal point, and the vertical axis represents the image height in mm units. The horizontal axis of distortion represents the ratio (%) of the actual image height with respect to the ideal image height, and its vertical axis represents the angle of field in units of degrees (note that the indication is made here for only up to a half angle of field of 90 degrees). Further, in the figure for astigmatism, the broken line represents sagittal and the solid line represents tangential. Further, the lateral aberration is shown in FIG. 25, in which the left side graphs show the results in the tangential (meridional) surface, and the right side graphs represent the results in the sagittal (radial) surface, and the case of the maximum angle of field, the case of a middle angle of field, and the case of being on the optical axis are shown in this order from top to bottom. The height of the incident light ray with respect to the principal ray is expressed in mm units, and the vertical axis represents the shift in mm from the principal ray in the imaging plane.

In the figures of spherical aberration and lateral aberration, the aberrations of three light beams are shown with ct the solid line corresponding the d line (wavelength 587.56 nm), the broken line corresponding to the g line (wavelength 435.84 nm), and the dashed line corresponding to the C line (wavelength 656.28 nm). The figures of astigmatism and distortion show the results when a light beam of the d line (wavelength 587.56 nm) is used.

The understanding of examples in the above manner is similarly used for the construction data of Examples 2 to 18 and FIG. 26A to FIG. 59 showing the aberrations.

Example 2

Figure 7:
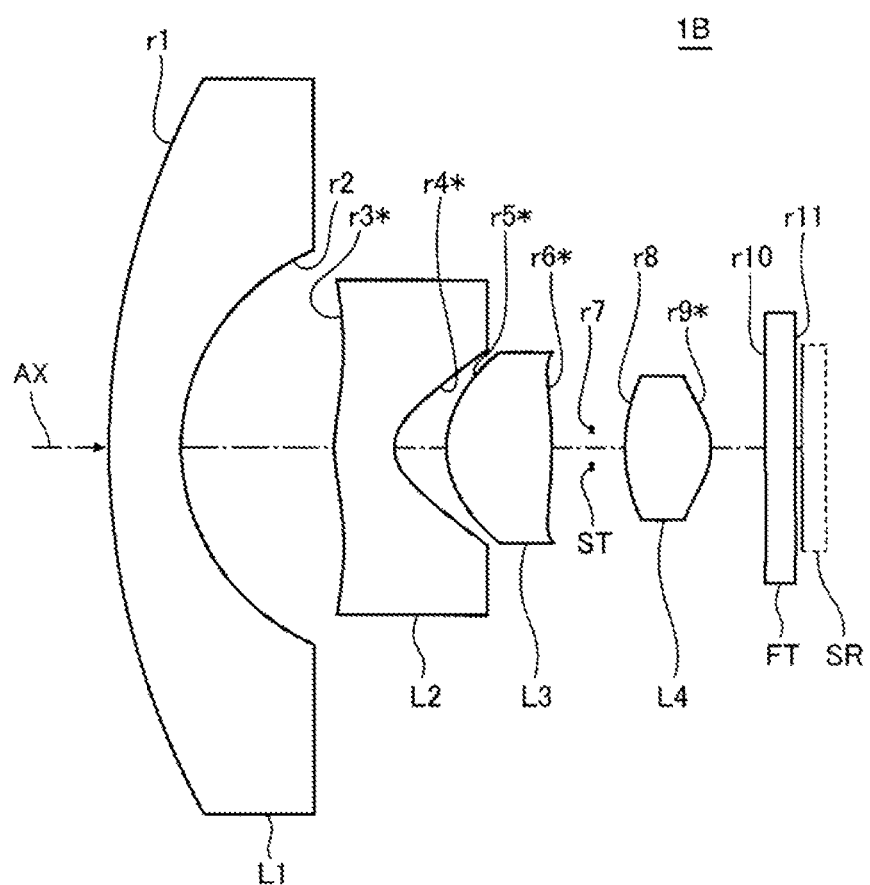
FIG. 7 is diagram showing a cross sectional view of an arrangement of a lens group in a wide angle optical system according to a second embodiment.

FIG. 7 is a cross-sectional view diagram showing an example of the arrangement of a lens group in a wide angle optical system according to Example 2. FIGS. 26A, 26B, 26C and FIG. 27 are the aberration diagrams of the wide angle optical system of Example 2.

A wide angle optical system 1B of Example 2, as shown in FIG. 7, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 and third lens L3 respectively have aspherical surfaces on both sides, and, for example, are lenses made of resin material such as plastic. Further, the fourth lens L4 of the example shown in FIG. 7 has an aspherical surface on the image side surface r9*.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1B of this Example 2 is given below.

Numerical Value Example 2

Unit mm

Surface data

| Surface number | r | d | nd | vd |
|---|---|---|---|---|
| Object surface | ∞ | ∞ | | |
| 1 | 14.266 | 1.198 | 1.83481 | 42.72 |
| 2 | 3.882 | 2.547 | | |
| 3* | 2.690 | 1.000 | 1.53048 | 55.72 |
| 4* | 0.694 | 0.859 | | |
| 5* | 1.967 | 1.745 | 1.63550 | 23.89 |
| 6* | −6.055 | 0.671 | | |
| 7(Aperture) | ∞ | 0.547 | | |
| 8 | 3.184 | 1.433 | 1.58913 | 61.24 |
| 9* | −1.177 | 0.900 | | |
| 10 | ∞ | 0.500 | 1.51680 | 64.20 |
| 11 | ∞ | 0.100 | | |
| Image surface | ∞ | | | |

Aspherical surface data

Third surface

K = −3.0000e+001, A4 = −1.3478e−002, A6 = 1.3586e−003,
A8 = −5.5396e−005, A10 = 4.5377e−007
Fourth surface K = −1.0000e+000, A4 = −1.4175e−002, A6 = −8.8830e−002,
A8 = 3.8392e−002, A10 = −5.0309e−003
Fifth surface K = 0.0000e+000, A4 = 5.6194e−002, A6 = −6.4821e−002,
A8 = 2.4513e−002, A10 = −3.5021e−003
Sixth surface K = 0.0000e+000, A4 = 3.2029e−002, A6 = −6.3523e−003,
A8 = 1.7772e−003, A10 = −1.4859e−003, A12 = 5.7499e−004
Ninth surface K = −2.0000e+000, A4 = −2.3177e−002, A6 = 9.0449e−002,
A8 = −4.5930e−002, A10 = 8.6151e−003

Various data

| Focal length | 0.753 |
|---|---|
| F-number | 2.796 |
| Half angle of field | 102.149 |
| Image height | 1.701 |
| Overall lens length | 11.350 |
| BF | 1.350 |

Figure 27:
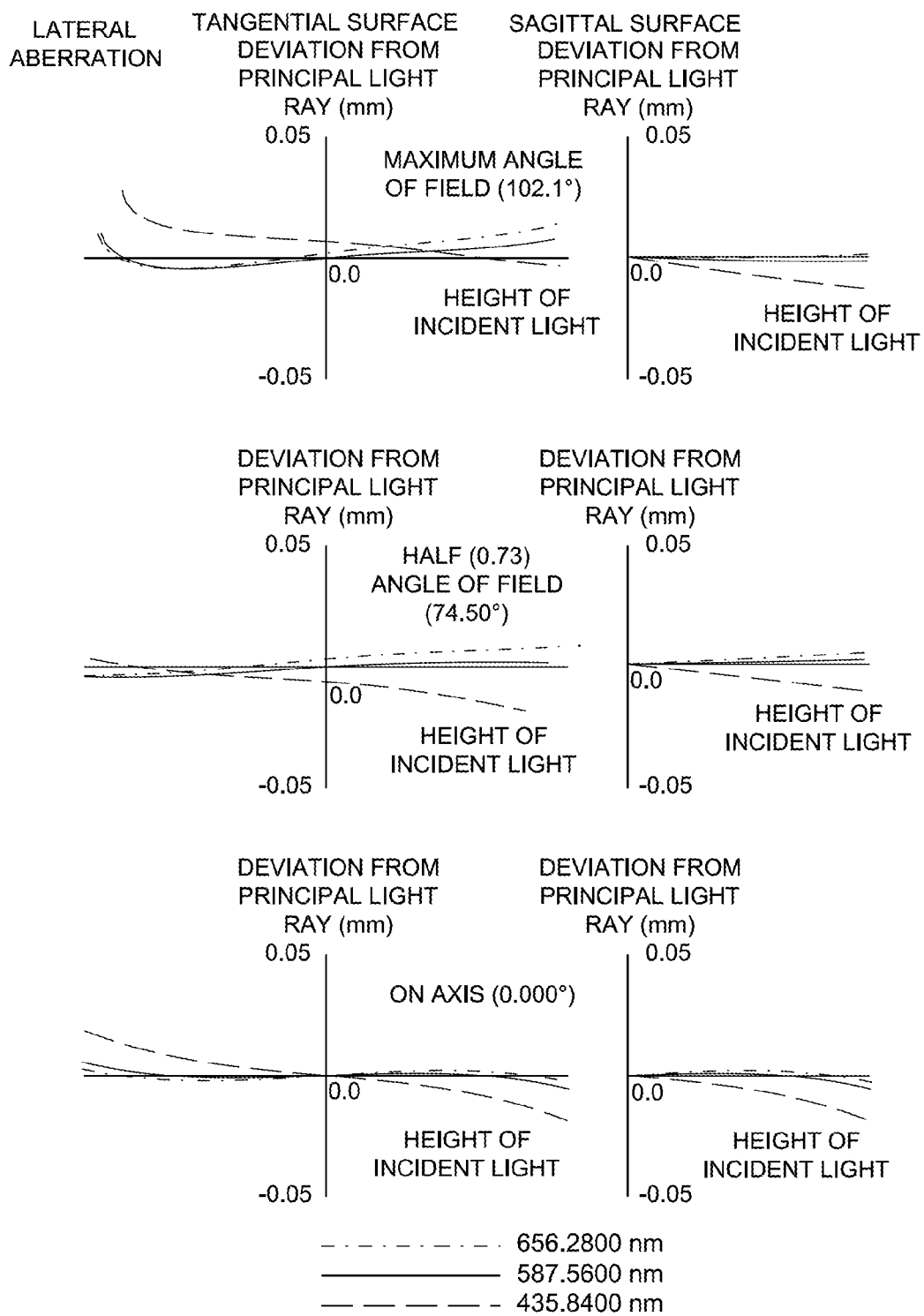
FIG. 27 is an aberration diagram-2 of the lens group in the wide angle optical system of the second embodiment.

With the above lens arrangement and construction, the spherical aberration (sine condition), the astigmatism, and the distortion, in the wide angle optical system 1B of the Example 2 are shown in FIGS. 26A, 26B, 26C, and the lateral aberration is shown in FIG. 27.

Example 30

Figure 8:
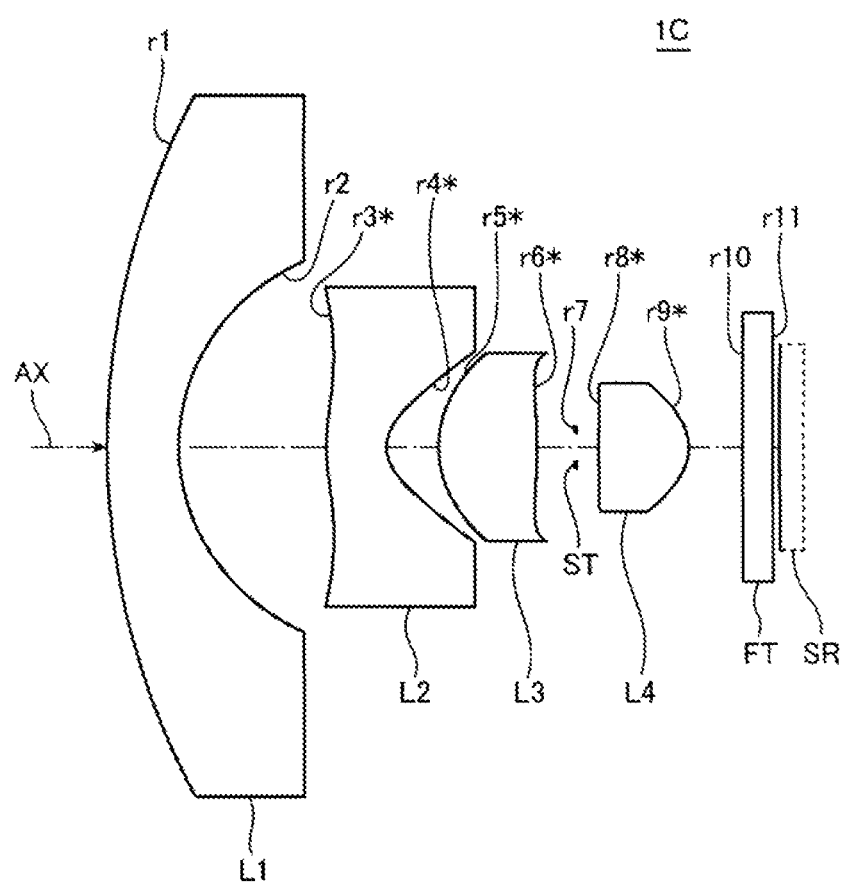
FIG. 8 is diagram showing a cross sectional view of an arrangement of a lens group in a wide angle optical system according to a third embodiment.
Figure 29:
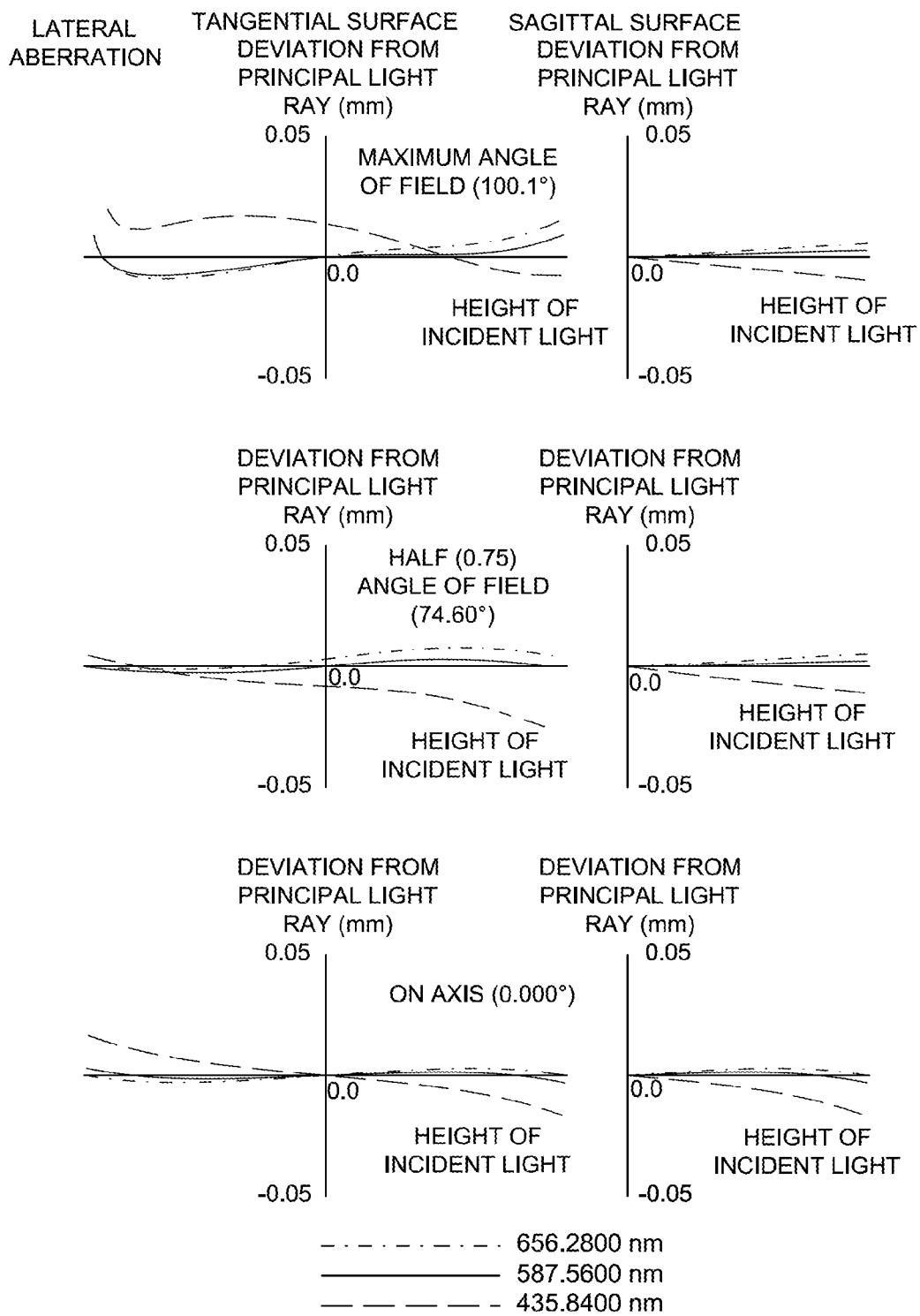
FIG. 29 is an aberration diagram-2 of the lens group in the wide angle optical system of the third embodiment.

FIG. 8 is a cross-sectional view diagram showing an example of the arrangement of a lens group in a wide angle optical system according to Example 3. FIGS. 28A, 28B, 28C and o FIG. 29 are the aberration diagrams of the wide angle optical system of Example 3.

A wide angle optical system 1C of Example 3, as shown in FIG. 8, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and the second lens L2 and the fourth lens L4 are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1C of this Example 3 is given below.

Numerical Value Example 3

Unit mm

Surface data

| Surface number | r | d | nd | vd |
|---|---|---|---|---|
| Object surface | ∞ | ∞ | | |
| 1 | 13.984 | 1.200 | 1.83481 | 42.72 |
| 2 | 3.657 | 2.473 | | |
| 3* | 2.957 | 1.000 | 1.53048 | 55.72 |
| 4* | 0.692 | 0.863 | | |
| 5* | 2.001 | 1.650 | 1.80542 | 26.13 |
| 6* | −11.213 | 0.646 | | |
| 7(Aperture) | ∞ | 0.385 | | |
| 8* | 5.618 | 1.513 | 1.53048 | 55.72 |
| 9* | −0.907 | 0.900 | | |
| 10 | ∞ | 0.500 | 1.51680 | 64.20 |
| 11 | ∞ | 0.100 | | |
| Image surface | ∞ | | | |

Aspherical surface data

Third surface

K = −3.0000e+001, A4 = −1.7603e−002, A6 = 2.2353e−003,
A8 = −1.4527e−004, A10 = 4.0508e−006
Fourth surface K = −1.0000e+000, A4 = −4.7670e−002, A6 = −6.3674e−002,
A8 = 3.2022e−002, A10 = −4.5557e−003
Fifth surface K = 0.0000e+000, A4 = 3.0319e−002, A6 = −4.6400e−002,
A8 = 1.9102e−002, A10 = −2.8174e−003
Sixth surface K = 0.0000e+000, A4 = 1.0089e−003, A6 = 1.9847e−002,
A8 = −8.0153e−003, A10 = −4.5280e−004, A12 = 8.4110e−004
Eighth surface K = 0.0000e+000, A4 = −1.8624e−001, A6 = 2.8312e−001,
A8 = −3.0529e−001, A10 = 1.2919e−001
Ninth surface K = −2.0000e+000, A4 = −1.5315e−001, A6 = 1.3069e−001,
A8 = −9.6264e−002, A10 = 2.8352e−002

Various data

| Focal length | 0.753 |
|---|---|
| F-number | 2.796 |
| Half angle of field | 100.105 |
| Image height | 1.699 |
| Overall lens length | 11.082 |
| BF | 1.351 |

With the above lens arrangement and construction, the spherical aberration (sine condition), the astigmatism, and the distortion, in the wide angle optical system 1C of the Example 3 are shown in FIGS. 28A, 28B, 28C, and the lateral aberration is shown in FIG. 29.

Example 4

Figure 9:
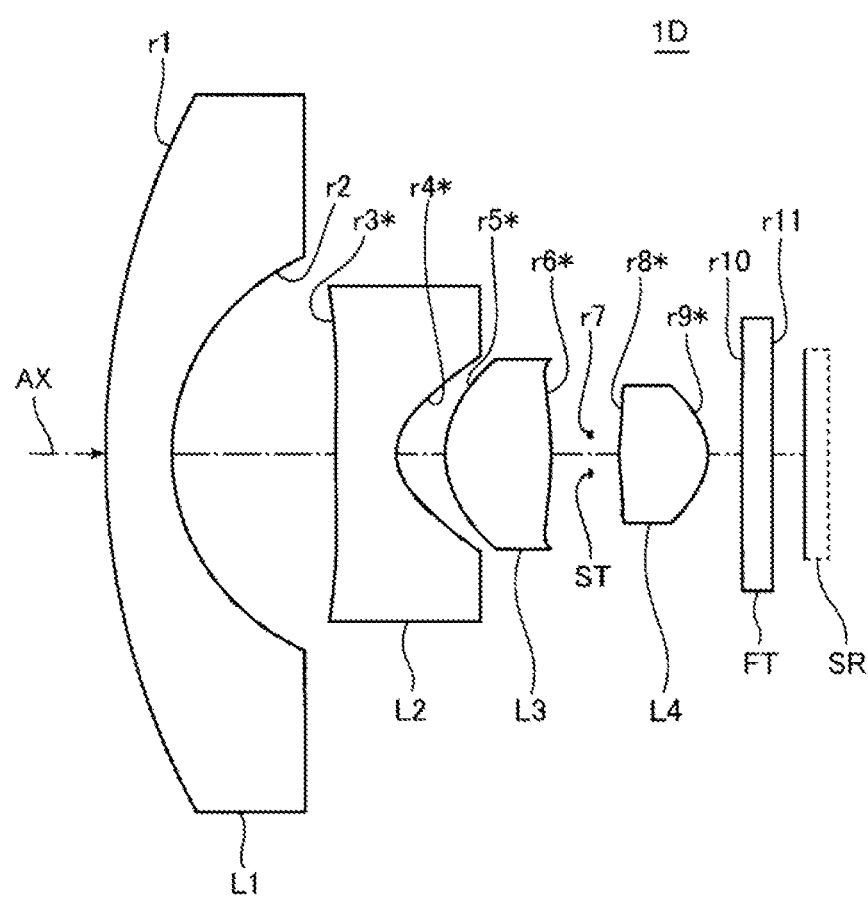
FIG. 9 is diagram showing a cross sectional view of an arrangement of a lens group in a wide angle optical system according to a fourth embodiment.

FIG. 9 is a cross-sectional view diagram showing an example of the arrangement of a lens group in a wide angle optical system according to Example 4. FIGS. 30A, 30B, 30C and FIG. 31 are the aberration diagrams of the wide angle optical system of Example 4.

A wide angle optical system 1D of Example 4, as shown in FIG. 9, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1D of this Example 4 is given below.

Numerical Value Example 4

| Unit mm | | | | |
|---|---|---|---|---|
| Surface data | | | | |
| Surface number | r | d | nd | vd |
| Object surface | ∞ | ∞ | | |
| 1 | 13.999 | 1.100 | 1.88300 | 40.81 |
| 2 | 3.837 | 2.690 | | |
| 3* | 29.399 | 1.000 | 1.53048 | 55.72 |
| 4* | 1.016 | 0.799 | | |
| 5* | 1.962 | 1.747 | 1.63200 | 23.41 |
| 6* | −5.019 | 0.640 | | |
| 7(Aperture) | ∞ | 0.478 | | |
| 8* | 4.008 | 1.461 | 1.53048 | 55.72 |
| 9* | −1.098 | 0.565 | | |
| 10 | ∞ | 0.500 | 1.56400 | 47.00 |
| 11 | ∞ | 0.520 | | |
| Image surface | ∞ | | | |

Aspherical surface data

Third surface

K = −3.0000e+001, A4 = −5.4043e−003, A6 = 4.0794e−005,
A8 = 5.0085e−005, A10 = −3.0399e−006
Fourth surface K = −2.0788e+000, A4 = 2.4740e−001, A6 = −1.7754e−001,
A8 = 5.7603e−002, A10 = −6.9424e−003
Fifth surface K = 0.0000e+000, A4 = 5.5106e−002, A6 = −6.3595e−002,
A8 = 2.4535e−002, A10 = −3.6937e−003

-continued

| Unit mm |
|---|

Sixth surface

K = 0.0000e+000, A4 = 4.9789e−002, A6 = −3.3464e−002,
A8 = 2.1739e−002, A10 = −9.4383e−003, A12 = 1.9006e−003
Eighth surface K = 0.0000e+000, A4 = −1.2333e−001, A6 = 1.7672e−001,
A8 = −2.1232e−001, A10 = 8.5862e−002
Ninth surface K = −2.0000e+000, A4 = −7.5634e−002, A6 = 5.8591e−002,
A8 = −2.2662e−002, A10 = 1.3248e−003

| Various data | |
|---|---|
| Focal length | 0.753 |
| F-number | 2.887 |
| Half angle of field | 103.802 |
| Image height | 1.750 |
| Overall lens length | 11.345 |
| BF | 1.430 |

Figure 31:
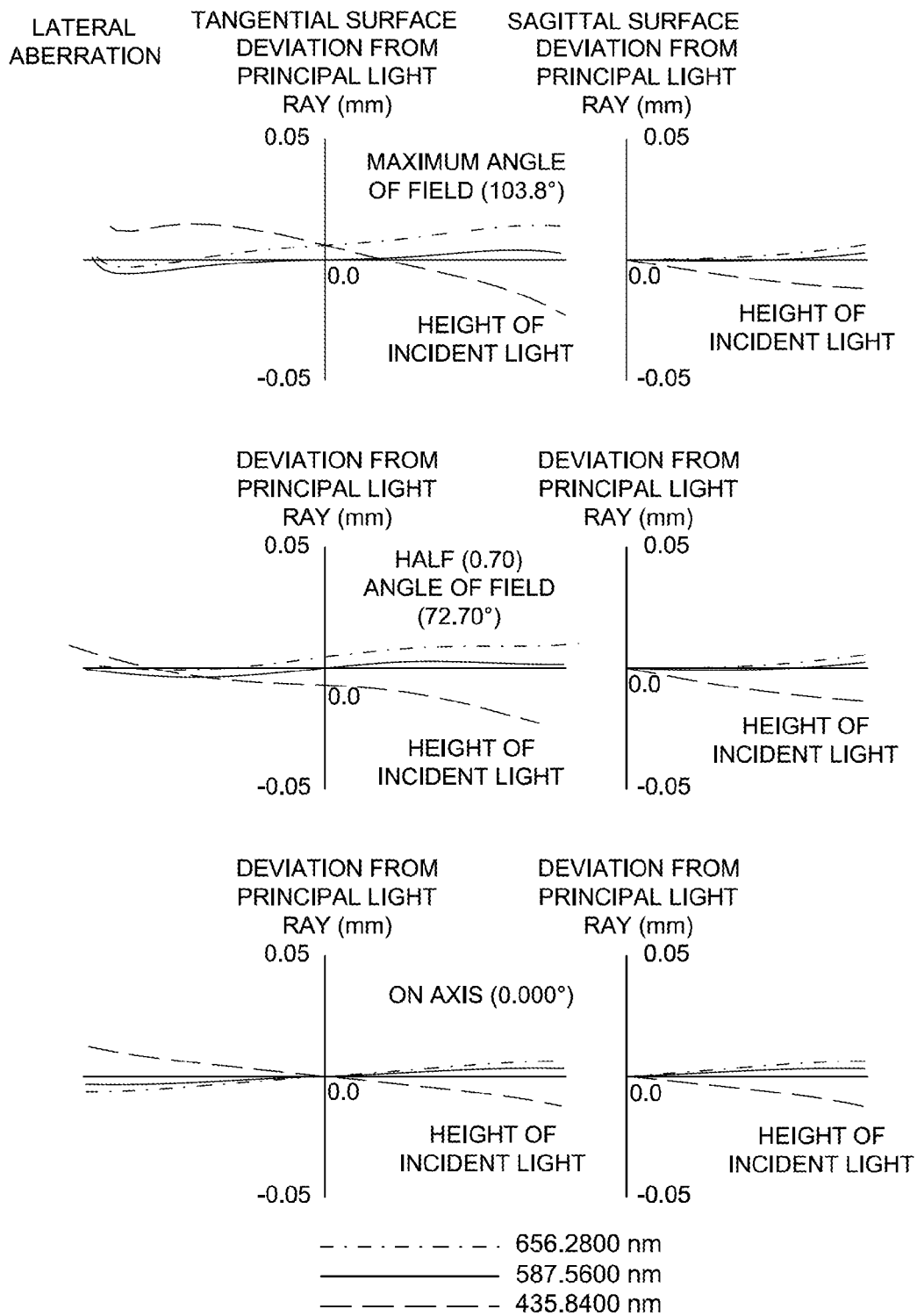
FIG. 31 is an aberration diagram-2 of the lens group in the wide angle optical system of the fourth embodiment.
Figure 32:
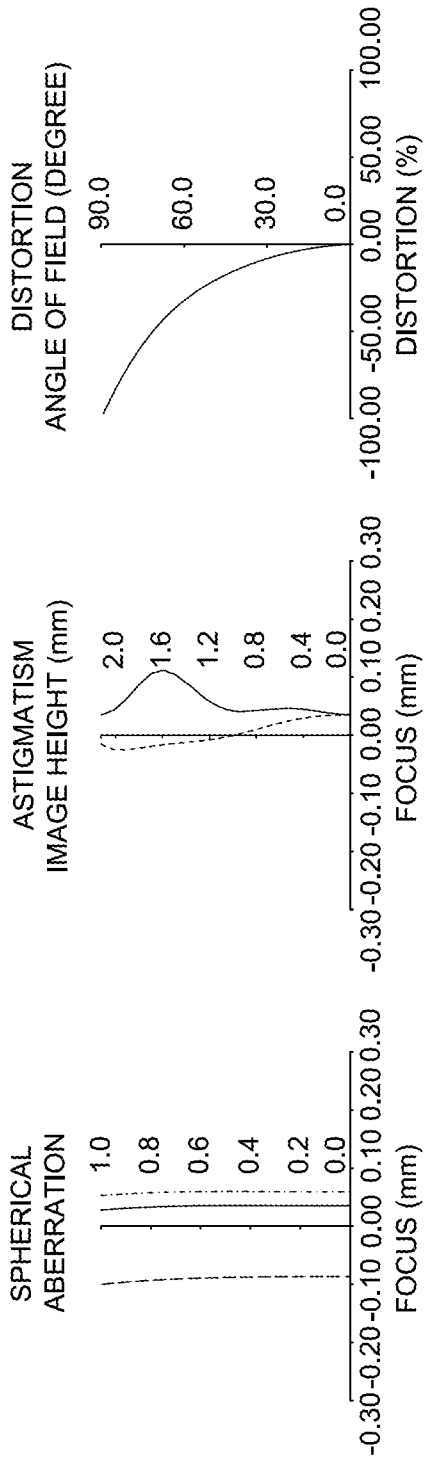
FIGS. 32A, 32B, 32C are aberration diagrams-1 of a lens group in a wide angle optical system of the fifth embodiment.

With the above lens arrangement and construction, the spherical aberration (sine condition), the astigmatism, and the distortion, in the wide angle optical system 1D of the Example 4 are shown in FIGS. 30A, 30B, 30C, and the lateral aberration is shown in FIG. 31.

Example 5

Figure 10:
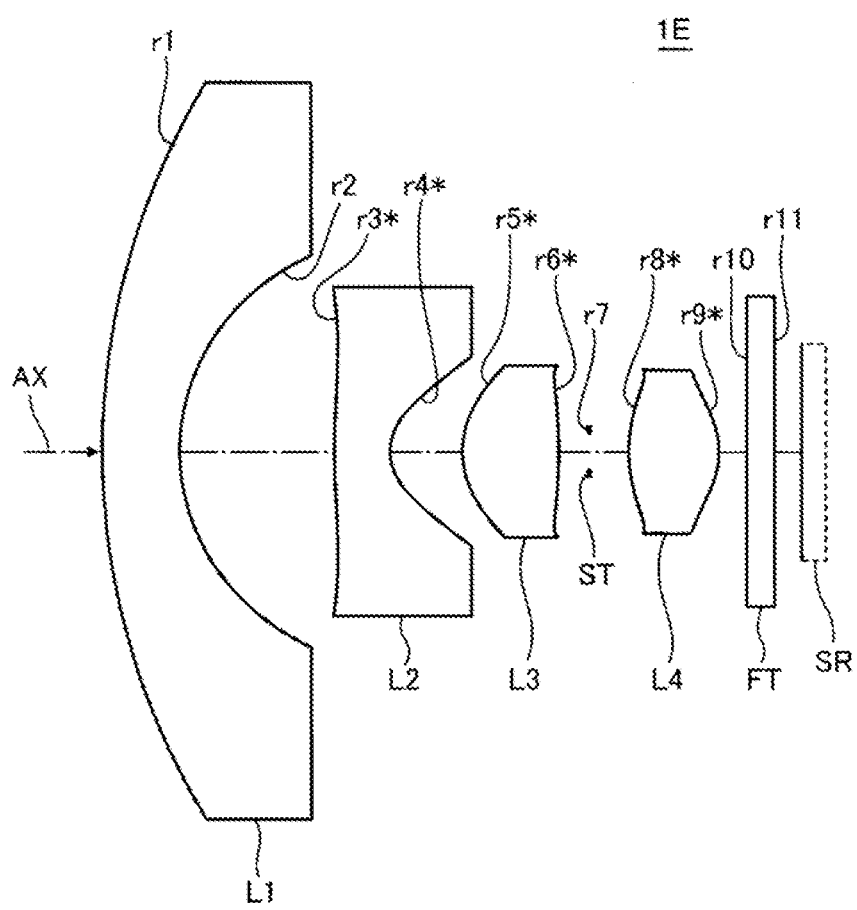
FIG. 10 is diagram showing a cross sectional view of an arrangement of a lens group in a wide angle optical system according to a fifth embodiment.

FIG. 10 is a cross-sectional view diagram showing an example of the arrangement of a lens group in a wide angle optical system according to Example 5. FIGS. 32A, 32B, 30C and FIG. 33 are the aberration diagrams of the wide angle optical system of Example 5.

A wide angle optical system 1E of Example 5, as shown in FIG. 10, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1E of this Example 5 is given below.

Numerical Value Example 5

| Unit mm | | | | |
|---|---|---|---|---|
| Surface data | | | | |
| Surface number | r | d | nd | vd |
| Object surface | ∞ | ∞ | | |
| 1 | 14.435 | 1.400 | 1.88300 | 40.81 |
| 2 | 4.201 | 2.806 | | |

-continued

Unit mm

| | | | | |
|---|---|---|---|---|
| 3* | 18.046 | 1.000 | 1.53048 | 55.72 |
| 4* | 1.035 | 1.311 | | |
| 5* | 1.901 | 1.740 | 1.63200 | 23.41 |
| 6* | −7.145 | 0.540 | | |
| 7(Aperture) | ∞ | 0.725 | | |
| 8* | 2.837 | 1.629 | 1.53048 | 55.72 |
| 9* | −1.663 | 0.502 | | |
| 10 | ∞ | 0.500 | 1.56400 | 47.00 |
| 11 | ∞ | 0.500 | | |
| Image surface | ∞ | | | |

Aspherical surface data

Third surface

K = −5.0000e+000, A4 = −2.8407e−003, A6 = −2.0654e−004,
A8 = 1.8328e−005, A10 = 1.3083e−006, A12 = −1.1270e−007
Fourth surface K = −2.0000e+000, A4 = 1.6634e−001, A6 = −8.7701e−002,
A8 = 2.0131e−002, A10 = −1.3772e−003, A12 = −9.1985e−005
Fifth surface K = 0.0000e+000, A4 = 3.0146e−003, A6 = −2.1090e−002,
A8 = 5.9446e−003, A10 = −2.8002e−005, A12 = −3.0303e−004
Sixth surface K = 0.0000e+000, A4 = 2.0048e−002, A6 = −2.3632e−003,
A8 = 2.2588e−004, A10 = −2.2209e−003, A12 = 9.1617e−000
Eighth surface K = 0.0000e+000, A4 = −6.6502e−002, A6 = 7.7287e−002,
A8 = −5.9858e−002, A10 = 2.3673e−002, A12 = −4.0895e−003
Ninth surface K = −2.0000e+000, A4 = −1.3332e−002, A6 = 2.3115e−002,
A8 = 1.7916e−003, A10 = −3.5067e−003, A12 = 4.7323e−004

Various data

| | |
|---|---|
| Focal length | 0.891 |
| F-number | 2.795 |
| Half angle of field | 104.564 |
| Image height | 2.068 |
| Overall lens length | 12.508 |
| BF | 1.357 |

Figure 33:
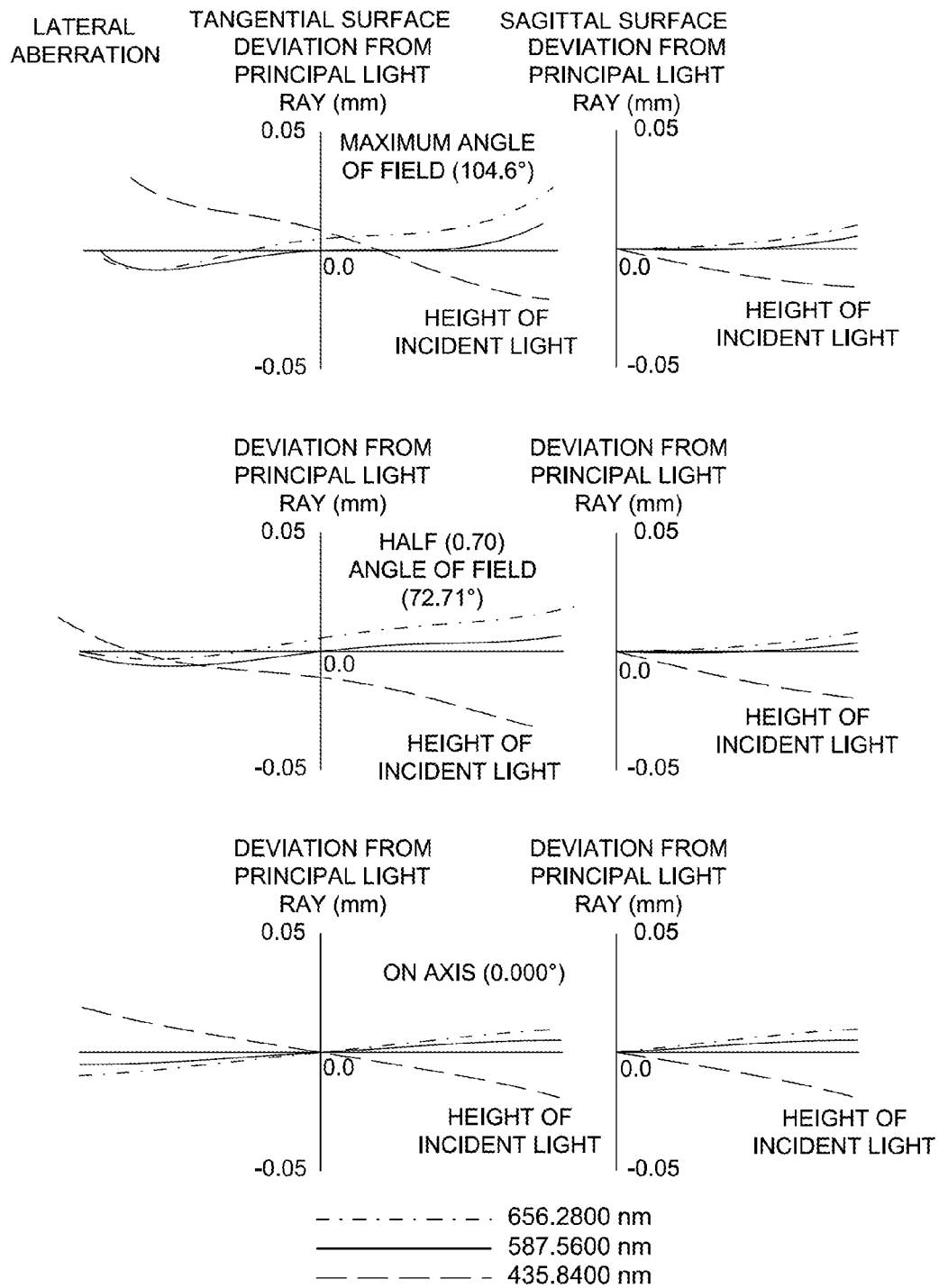
FIG. 33 is an aberration diagram-2 of the lens group in the wide angle optical system of the fifth embodiment.

With the above lens arrangement and construction, the spherical aberration (sine condition), the astigmatism, and the distortion, in the wide angle optical system 1E of the Example 5 are shown in FIGS. 32A, 32B, 326C, and the lateral aberration is shown in FIG. 33.

Example 6

Figure 11:
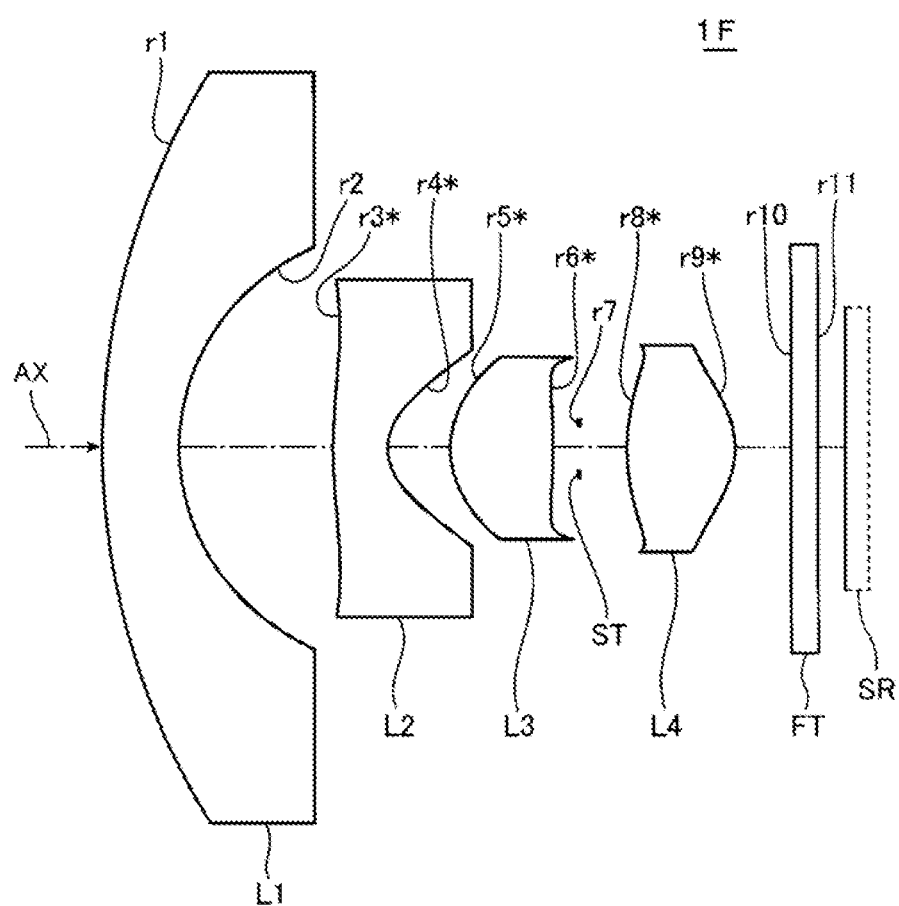
FIG. 11 is diagram showing a cross sectional view of an arrangement of a lens group in a wide angle optical system according to a sixth embodiment.

FIG. 11 is a cross-sectional view diagram showing an example of the arrangement of a lens group in a wide angle optical system according to Example 6. FIGS. 34A, 34B, 34C and FIG. 35 are the aberration diagrams of the wide angle optical system of Example 6.

A wide angle optical system 1F of Example 6, as shown in FIG. 11, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1F of this Example 6 is given below.

Numerical Value Example 6

Unit mm

Surface data

| Surface number | r | d | nd | vd |
|---|---|---|---|---|
| Object surface | ∞ | ∞ | | |
| 1 | 14.723 | 1.400 | 1.88300 | 40.81 |
| 2 | 4.376 | 2.824 | | |
| 3* | 11.328 | 1.000 | 1.53048 | 55.72 |
| 4* | 1.060 | 1.144 | | |
| 5* | 1.997 | 1.870 | 1.63200 | 23.41 |
| 6* | −10.601 | 0.479 | | |
| 7(Aperture) | ∞ | 0.881 | | |
| 8* | 3.921 | 1.973 | 1.53048 | 55.72 |
| 9* | −1.761 | 1.024 | | |
| 10 | ∞ | 0.500 | 1.56400 | 47.00 |
| 11 | ∞ | 0.500 | | |
| Image surface | ∞ | | | |

Aspherical surface data

Third surface

K = −2.8612e+001, A4 = −2.0350e−003, A6 = −1.6746e−004,
A8 = 7.2034e−006, A10 = 1.3033e−006, A12 = −7.3695e−00
Fourth surface K = −2.0000e+000, A4 = 1.1433e−001, A6 = −4.2316e−002,
A8 = 5.1180e−003, A10 = 4.1021e−004, A12 = −1.0701e−004
Fifth surface K = 0.0000e+000, A4 = −3.0906e−003, A6 = −3.3491e−003,
A8 = −2.9631e−003, A10 = 1.8309e−003, A12 = −3.3866e−004
Sixth surface K = 0.0000e+000, A4 = 1.6870e−002, A6 = −1.1841e−003,
A8 = 4.9275e−003, A10 = −5.8262e−003, A12 = 1.7245e−003
Eighth surface K = 0.0000e+000, A4 = −3.2047e−002, A6 = 2.2974e−002,
A8 = −1.0720e−002, A10 = 2.7148e−003, A12 = −3.1166e−004
Ninth surface K = −2.0000e+000, A4 = −2.4097e−003, A6 = 1.8993e−003,
A8 = 1.5419e−003, A10 = −3.7264e−004, A12 = 9.0955e−006

Various data

| | |
|---|---|
| Focal length | 1.122 |
| F-number | 2.791 |
| Half angle of field | 104.156 |
| Image height | 2.757 |
| Overall lens length | 13.4628 |
| BF | 1.891 |

Figure 35:
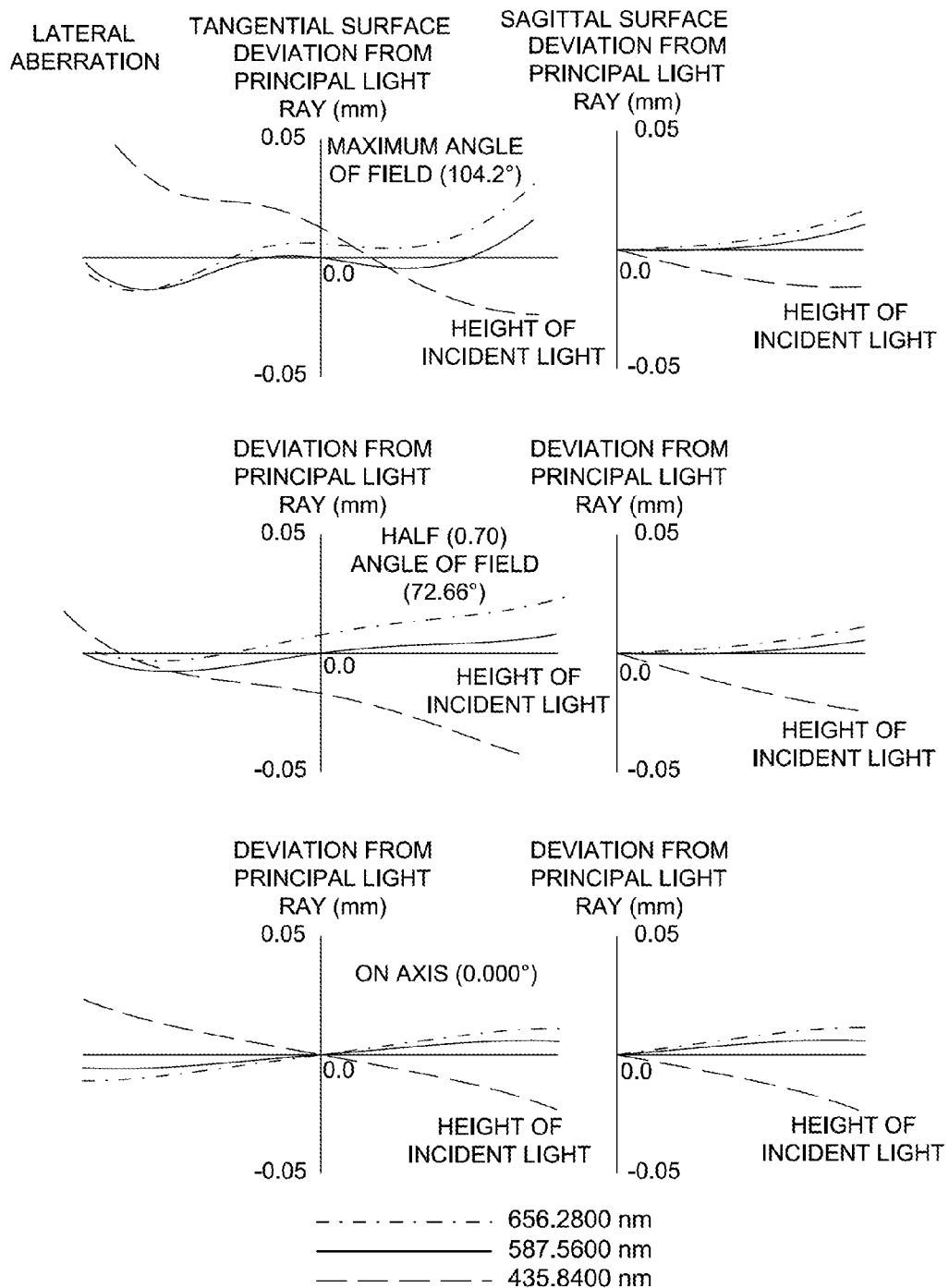
FIG. 35 is an aberration diagram-2 of the lens group in the wide angle optical system of the sixth embodiment.

With the above lens arrangement and construction, the spherical aberration (sine condition), the astigmatism, and the distortion, in the wide angle optical system 1F of the Example 6 are shown in FIGS. 34A, 34B, 34C, and the lateral aberration is shown in FIG. 35.

Example 7

Figure 12:
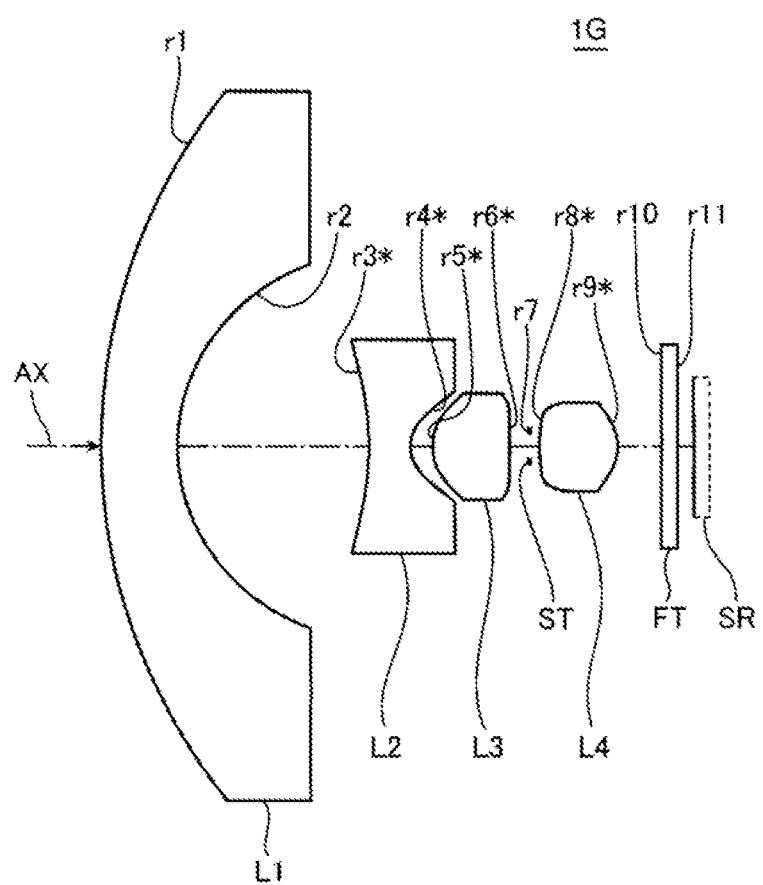
FIG. 12 is diagram showing a cross sectional view of an arrangement of a lens group in a wide angle optical system according to a seventh embodiment.

FIG. 12 is a cross-sectional view diagram showing an example of the arrangement of a lens group in a wide angle optical system according to Example 7. FIGS. 36A, 36B, 36C and FIG. 37 are the aberration diagrams of the wide angle optical system of Example 7.

A wide angle optical system 1G of Example 7, as shown in FIG. 11, is a negative-negative-positive-positive four component optical system configured, in order from the object side towards the image side, with a negative meniscus lens (the first lens L1) that is convex on the object side, a negative concavo-concave lens (the second lens L2), a double-convex positive lens (the third lens L3), an aperture diaphragm ST, and a double-convex positive lens (the fourth lens L4). The second lens L2 through the fourth lens L4 respectively have aspherical surfaces on both sides, and the second lens L2, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1G of this Example 7 is given below.

Numerical Value Example 7

| Unit mm | | | | |
|---|---|---|---|---|
| Surface data | | | | |
| Surface number | r | d | nd | vd |
| Object surface | ∞ | ∞ | | |
| 1 | 11.636 | 1.400 | 1.88300 | 40.81 |
| 2 | 3.826 | 3.513 | | |
| 3* | −5.985 | 0.764 | 1.53048 | 55.72 |
| 4* | 0.772 | 0.407 | | |
| 5* | 1.168 | 1.413 | 1.63200 | 23.41 |
| 6* | −8.197 | 0.361 | | |
| 7(Aperture) | ∞ | 0.185 | | |
| 8* | 3.200 | 1.441 | 1.53048 | 55.72 |
| 9* | −0.917 | 0.800 | | |
| 10 | ∞ | 0.300 | 1.56400 | 47.00 |
| 11 | ∞ | 0.300 | | |
| Image surface | ∞ | | | |

Aspherical surface data

Third surface

K = −5.0000e+000, A4 = −3.6223e−003, A6 = 1.1909e−003,
A8 = −6.3586e−005, A10 = 1.9291e−005, A12 = −3.0988e−006
Fourth surface K = −3.6201e+000, A4 = 1.0213e+000, A6 = −1.1904e+000,
A8 = 5.4191e−001, A10 = 2.9634e−002, A12 = −7.9731e−002
Fifth surface K = 0.0000e+000, A4 = 1.3442e−001, A6 = 5.5084e−002,
A8 = −6.8268e−001, A10 = 8.1707e−001, A12 = −3.6301e−001
Sixth surface K = 0.0000e+000, A4 = 2.4454e−001, A6 = −2.9441e−001,
A8 = −9.8690e−002, A10 = 6.1323e−003, A12 = 8.8561e−002
Eighth surface K = 0.0000e+000, A4 = −2.9917e−001, A6 = 2.3425e+000,
A8 = −8.9235e+000, A10 = 1.5921e+001, A12 = −8.2016e+000
Ninth surface K = −2.0000e+000, A4 = −1.8169e−001, A6 = 2.8826e−001,
A8 = −1.8024e−001, A10 = 9.6407e−002, A12 = 7.3851e−003

| Unit mm | |
|---|---|
| Various data | |
| Focal length | 0.665 |
| F-number | 2.806 |
| Half angle of field | 104.016 |
| Image height | 1.378 |
| Overall lens length | 10.799 |
| BF | 1.315 |

Figures 36A, 36B, 36C:
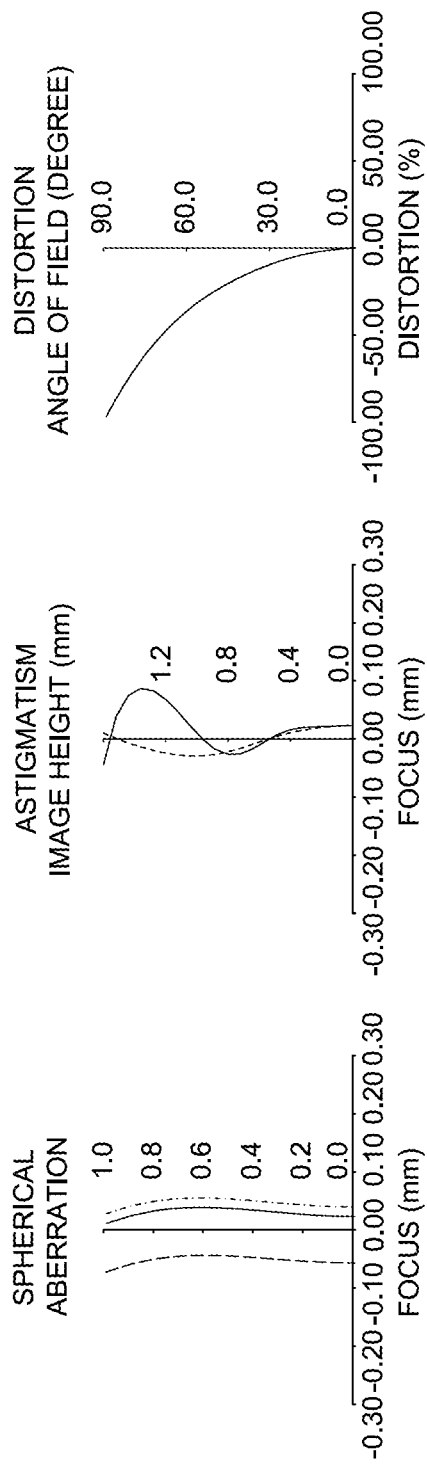
FIGS. 36A, 36B, 36C are aberration diagrams-1 of a lens group in a wide angle optical system of the seventh embodiment.
Figure 37:
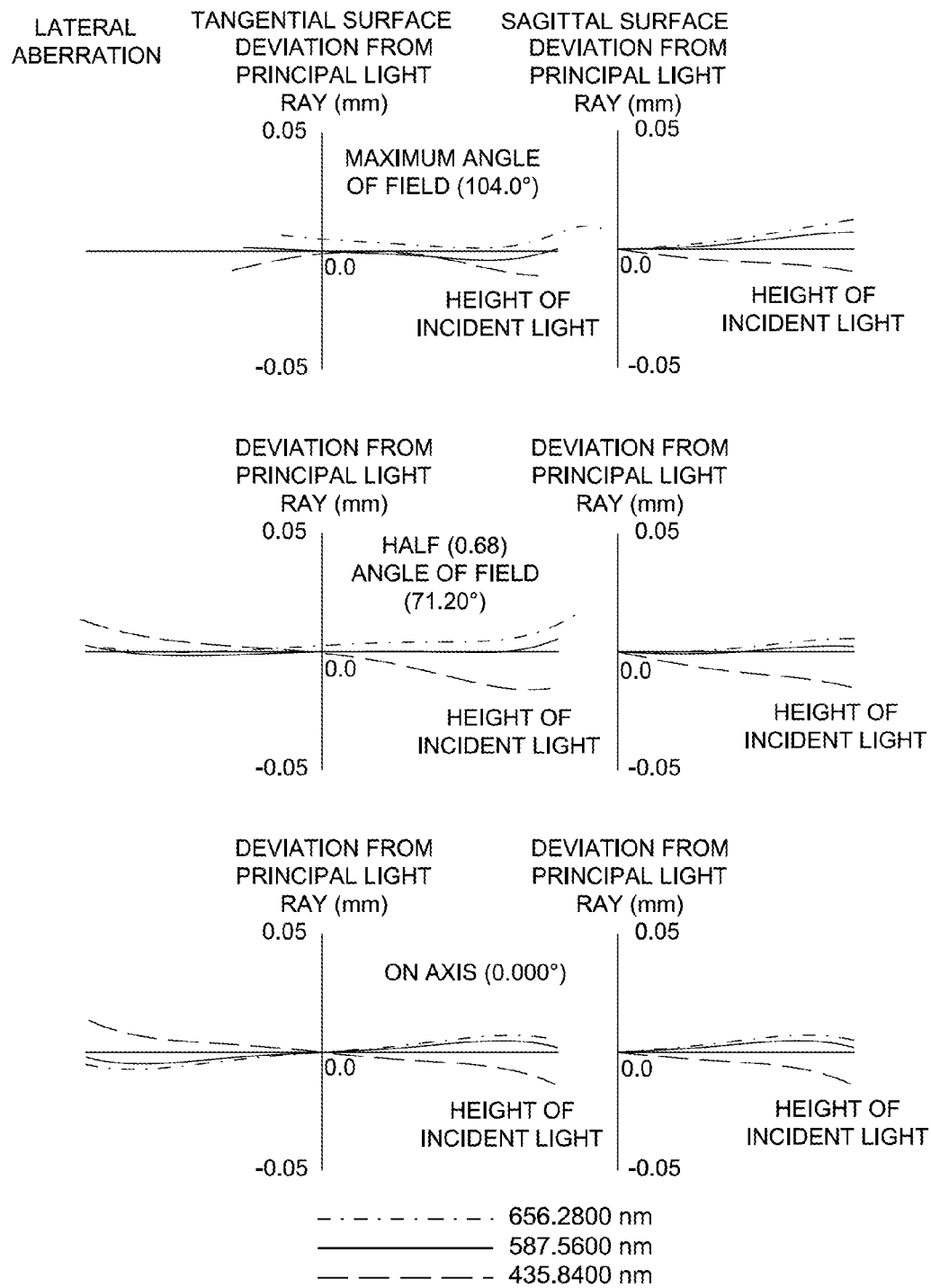
FIG. 37 is an aberration diagram-2 of the lens group in the wide angle optical system of the seventh embodiment.

With the above lens arrangement and construction, the spherical aberration (sine condition), the astigmatism, and the distortion, in the wide angle optical system 1G of the Example 7 are shown in FIGS. 36A, 36B, 36C, and the lateral aberration is shown in FIG. 37.

Example 8

Figure 13:
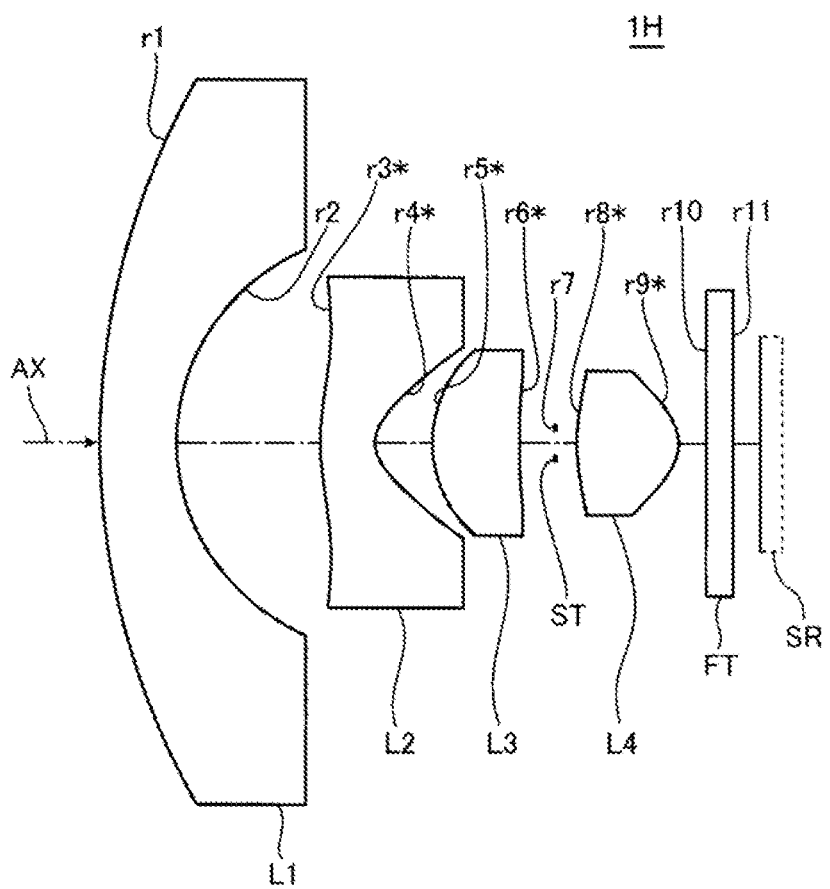
FIG. 13 is diagram showing a cross sectional view of an arrangement of a lens group in a wide angle optical system according to a eighth embodiment.

FIG. 13 is a cross-sectional view diagram showing an example of the arrangement of a lens group in a wide angle optical system according to Example 8. FIGS. 38A, 38B, 38C and FIG. 39 are the aberration diagrams of the wide angle optical system of Example 8.

A wide angle optical system 1H of Example 8, as shown in FIG. 13, is a negative-negative-positive-positive four component optical system configured, in order from the object side towards the image side, with a negative meniscus lens (the first lens L1) that is convex on the object side, a negative meniscus lens (the second lens L2) that is convex on the object side, a positive meniscus lens (the third lens L3) that is convex on the object side, an aperture diaphragm ST, and a double-convex positive lens (the fourth lens L4). The second lens L2 through the fourth lens L4 respectively have aspherical surfaces on both sides, and the second lens L2 and the fourth lens L4 are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1H of this Example 8 is given below.

Numerical Value Example 8

| Unit mm | | | | |
|---|---|---|---|---|
| Surface data | | | | |
| Surface number | r | d | nd | vd |
| Object surface | ∞ | ∞ | | |
| 1 | 15.120 | 1.400 | 1.89800 | 34.01 |
| 2 | 4.206 | 2.648 | | |
| 3* | 5.115 | 1.000 | 1.53048 | 55.72 |
| 4* | 0.689 | 1.042 | | |
| 5* | 2.432 | 1.603 | 2.00170 | 20.64 |
| 6* | 39.577 | 0.662 | | |
| 7(Aperture) | ∞ | 0.391 | | |
| 8* | 3.773 | 1.867 | 1.53048 | 55.72 |
| 9* | −0.847 | 0.500 | | |
| 10 | ∞ | 0.500 | 1.51680 | 64.20 |
| 11 | ∞ | 0.500 | | |
| Image surface | ∞ | | | |

-continued

Unit mm

Aspherical surface data

Third surface

K = −8.9708e+000, A4 = −8.5404e−003, A6 = 1.6037e−004,
A8 = 1.7163e−005, A10 = 1.8196e−006, A12 = −1.6486e−007
Fourth surface K = −2.0582e+000, A4 = 1.4364e−001, A6 = −9.2621e−002,
A8 = 2.4919e−002, A10 = −1.8777e−003, A12 = −1.2094e−004
Fifth surface K = 0.0000e+000, A4 = −8.1504e−003, A6 = 2.8126e−003,
A8 = −3.3407e−003, A10 = 2.0200e−003, A12 = −3.4010e−004
Sixth surface K = 0.0000e+000, A4 = 1.4359e−002, A6 = −9.5648e−003,
A8 = 2.2659e−002, A10 = −1.4797e−002, A12 = 2.8253e−003
Eighth surface K = 0.0000e+000, A4 = −9.4837e−002, A6 = 1.8112e−001,
A8 = −1.9637e−001, A10 = 9.9926e−002, A12 = −1.9270e−002
Ninth surface K = −2.0000e+000, A4 = −6.5541e−003, A6 = −4.3145e−002,
A8 = 3.7525e−002, A10 = −1.0082e−002, A12 = 6.7158e−004

Various data

| Focal length | 0.599 |
| F-number | 2.745 |
| Half angle of field | 103.387 |
| Image height | 2.068 |
| Overall lens length | 11.963 |
| BF | 1.349 |

Figure 39:
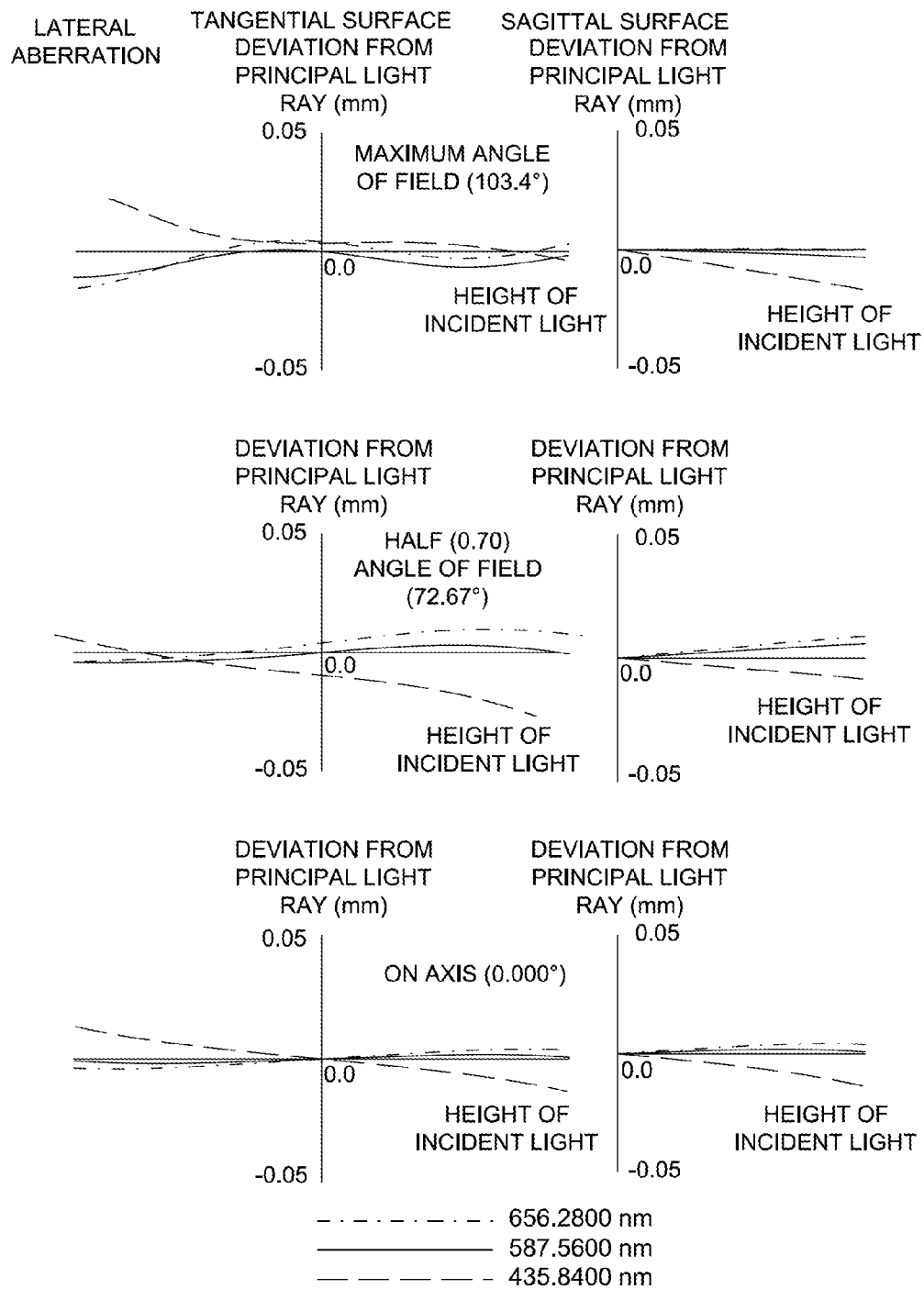
FIG. 39 is an aberration diagram-2 of the lens group in the wide angle optical system of the eighth embodiment.
Figure 40:
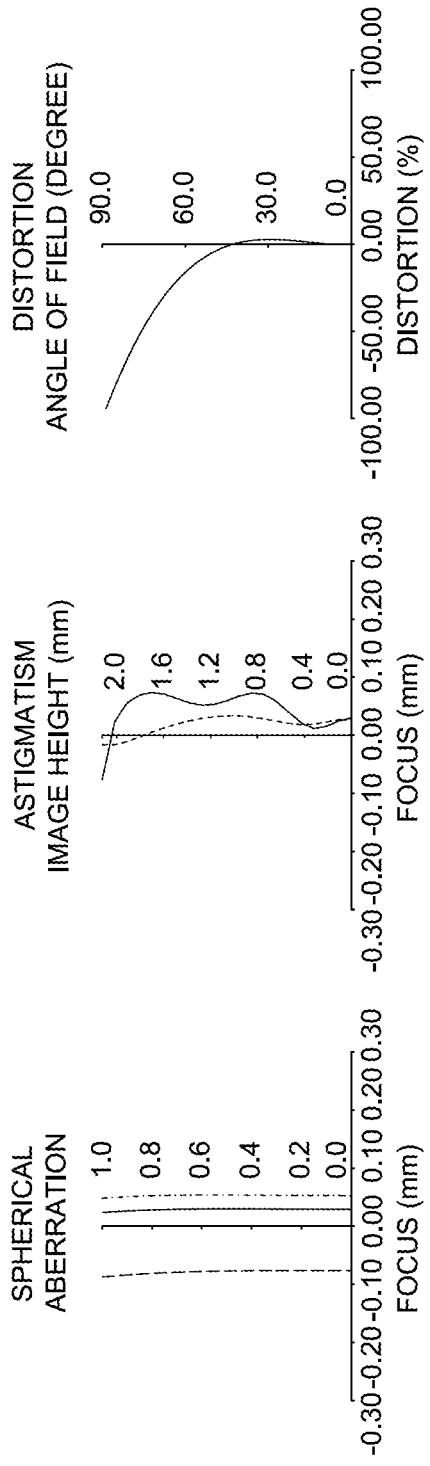
FIGS. 40A, 40B, 40C are aberration diagrams-1 of a lens group in a wide angle optical system of the ninth embodiment.

With the above lens arrangement and construction, the spherical aberration (sine condition), the astigmatism, and the distortion, in the wide angle optical system 1H of the Example 8 are shown in FIGS. 38A, 38B, 38C, and the lateral aberration is shown in FIG. 39.

Example 9

Figure 14:
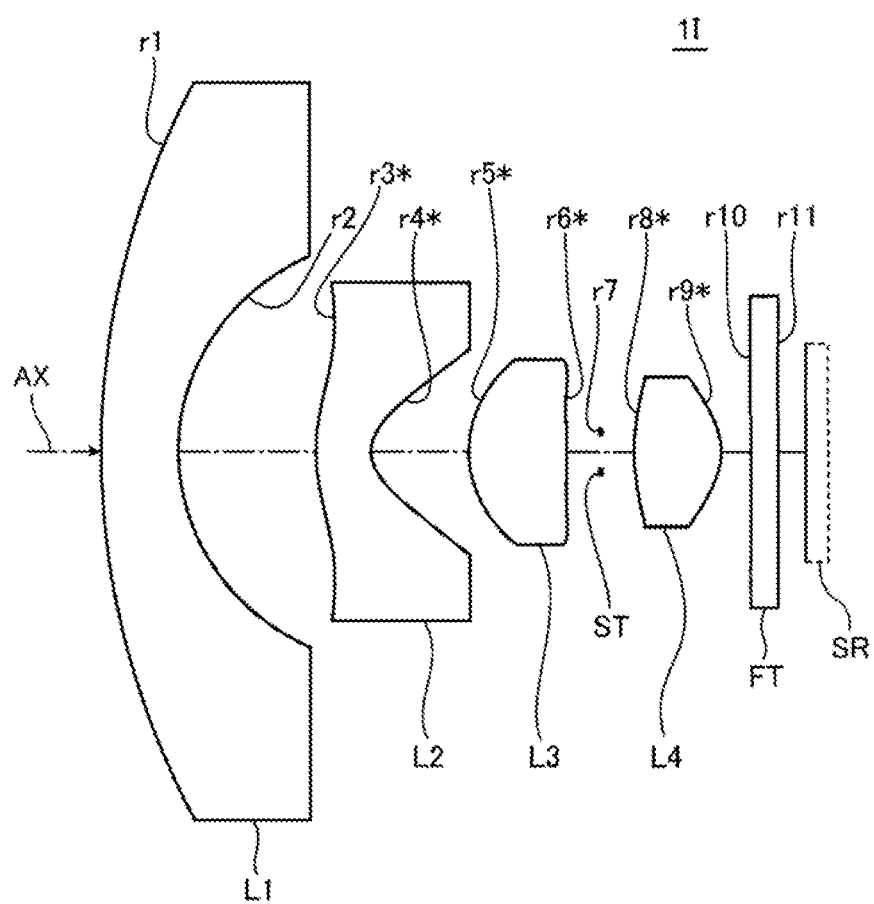
FIG. 14 is diagram showing a cross sectional view of an arrangement of a lens group in a wide angle optical system according to a ninth embodiment.

FIG. 14 is a cross-sectional view diagram showing an example of the arrangement of a lens group in a wide angle optical system according to Example 9. FIGS. 40A, 40B, 40C and FIG. 41 are the aberration diagrams of the wide angle optical system of Example 9.

A wide angle optical system 1I of Example 9, as shown in FIG. 14, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1I of this Example 9 is given below.

Numerical Value Example 9

Unit mm

Surface data

| Surface number | r | d | nd | vd |
|---|---|---|---|---|
| Object surface | ∞ | ∞ | | |
| 1 | 15.758 | 1.400 | 1.88300 | 40.81 |
| 2 | 4.186 | 2.487 | | |
| 3* | 3.491 | 1.000 | 1.53048 | 55.72 |
| 4* | 0.703 | 1.752 | | |
| 5* | 2.081 | 1.780 | 1.75120 | 24.80 |
| 6* | −19.680 | 0.618 | | |
| 7(Aperture) | ∞ | 0.602 | | |
| 8* | 3.778 | 1.575 | 1.53048 | 55.72 |
| 9* | −1.296 | 0.533 | | |
| 10 | ∞ | 0.500 | 1.51680 | 64.20 |
| 11 | ∞ | 0.500 | | |
| Image surface | ∞ | | | |

Aspherical surface data

Third surface

K = −7.2600e+000, A4 = −5.4462e−003, A6 = −4.4312e−004,
A8 = 4.5943e−005, A10 = 1.8651e−006, A12 = −1.8278e−007
Fourth surface K = −2.0000e+000, A4 = 1.7009e−001, A6 = −9.2952e−002,
A8 = 2.1326e−002, A10 = −1.8453e−003, A12 = 9.8857e−006
Fifth surface K = 0.0000e+000, A4 = −1.3670e−002, A6 = 5.3090e−003,
A8 = −5.6228e−003, A10 = 2.3670e−003, A12 = −3.5594e−004
Sixth surface K = 0.0000e+000, A4 = 9.2507e−003, A6 = 1.1698e−002,
A8 = −4.3537e−003
Eighth surface K = 0.0000e+000, A4 = −6.7739e−002, A6 = 1.0282e−001,
A8 = −1.1549e−001, A10 = 6.5513e−002, A12 = −1.3741e−002
Ninth surface K = −2.0000e+000, A4 = 5.3266e−002, A6 = −8.3637e−002,
A8 = 7.4917e−002, A10 = −3.2920e−002, A12 = −5.6561e−003

Various data

| Focal length | 0.740 |
| F-number | 2.753 |
| Half angle of field | 104.394 |
| Image height | 2.068 |
| Overall lens length | 12.607 |
| BF | 1.392 |

Figure 41:
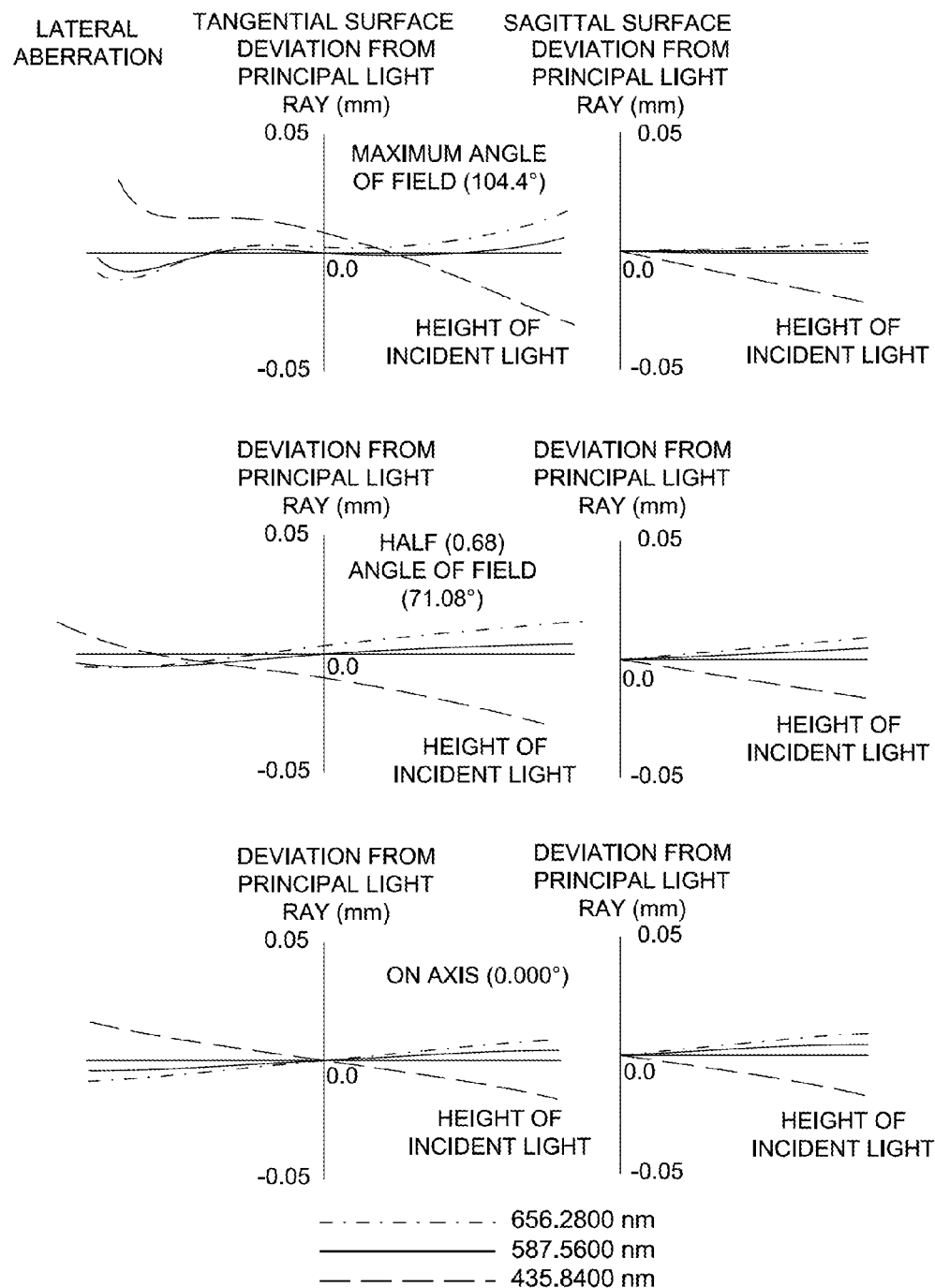
FIG. 41 is an aberration diagram-2 of the lens group in the wide angle optical system of the ninth embodiment.
Figure 42:
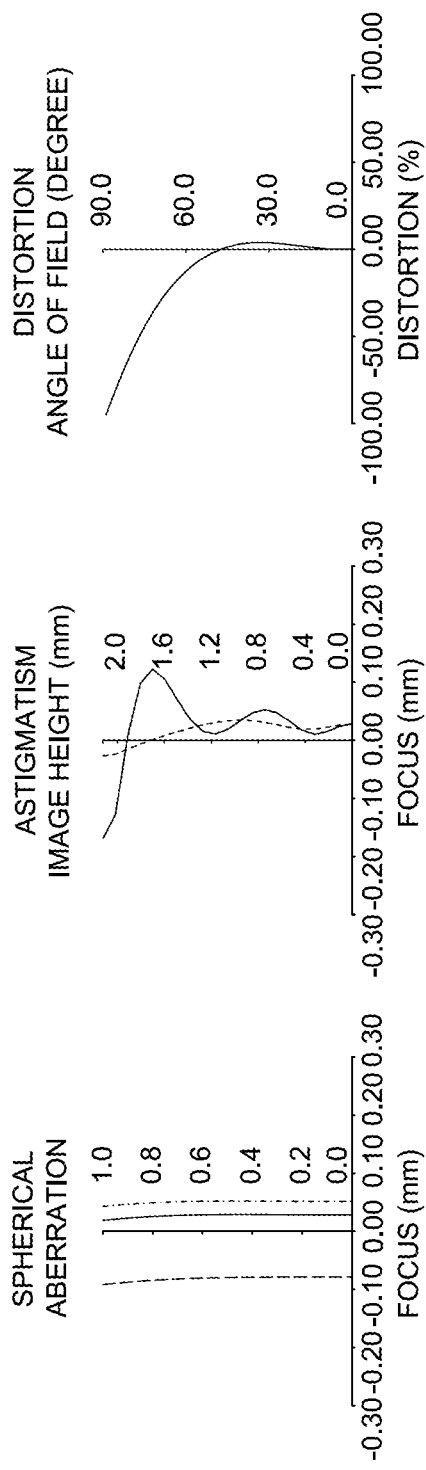
FIGS. 42A, 42B, 42C are aberration diagrams-1 of a lens group in a wide angle optical system of the 10th embodiment.

With the above lens arrangement and construction, the spherical aberration (sine condition), the astigmatism, and the distortion, in the wide angle optical system 1I of the Example 9 are shown in FIGS. 40A, 40B, 40C, and the lateral aberration is shown in FIG. 41.

Example 10

Figure 15:
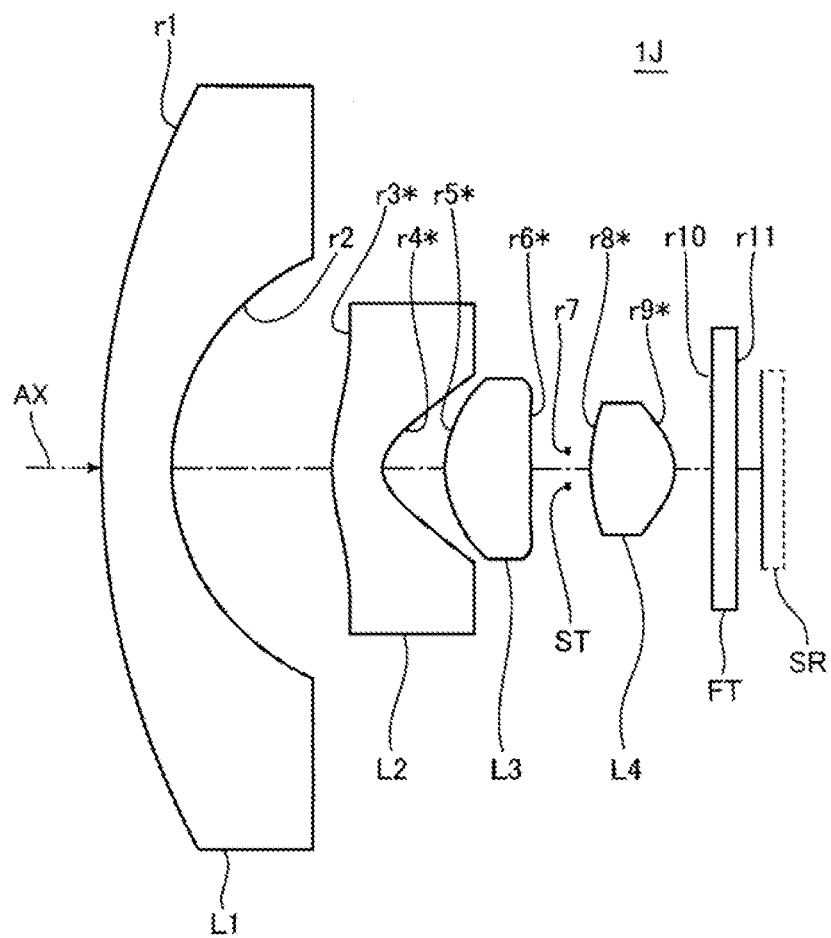
FIG. 15 is diagram showing a cross sectional view of an arrangement of a lens group in a wide angle optical system according to a 10th embodiment.

FIG. 15 is a cross-sectional view diagram showing an example of the arrangement of a lens group in a wide angle optical system according to Example 10. FIGS. 42A, 42B, 42C and FIG. 43 are the aberration diagrams of the wide angle optical system of Example 10.

A wide angle optical system 1J of Example 10, as shown in FIG. 15, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1J of this Example 10 is given below.

Numerical Value Example 10

| Unit mm | | | | |
|---|---|---|---|---|
| Surface data | | | | |
| Surface number | r | d | nd | vd |
| Object surface | ∞ | ∞ | | |
| 1 | 18.040 | 1.400 | 1.88300 | 40.81 |
| 2 | 4.970 | 3.207 | | |
| 3* | 4.198 | 1.000 | 1.53048 | 55.72 |
| 4* | 0.673 | 1.247 | | |
| 5* | 2.224 | 1.709 | 1.76130 | 18.40 |
| 6* | −27.171 | 0.733 | | |
| 7(Aperture) | ∞ | 0.460 | | |
| 8* | 3.506 | 1.684 | 1.53048 | 55.72 |
| 9* | −1.142 | 0.743 | | |
| 10 | ∞ | 0.500 | 1.51680 | 64.20 |
| 11 | ∞ | 0.500 | | |
| Image surface | ∞ | | | |

Aspherical surface data

Third surface $K = -1.1384e+001, A4 = -2.0656e-003, A6 = -3.9876e-004,$
$A8 = 2.9770e-005, A10 = 8.1903e-007, A12 = -7.3470e-008$ Fourth surface $K = -2.0000e+000, A4 = 1.6836e-001, A6 = -9.3318e-002,$
$A8 = 2.1430e-002, A10 = -1.7746e-003, A12 = -2.3299e-006$ Fifth surface $K = 0.0000e+000, A4 = -2.7011e-002, A6 = 7.8703e-003,$
$A8 = -5.9471e-003, A10 = 2.3364e-003, A12 = -3.1493e-004$ Sixth surface $K = 0.0000e+000, A4 = -6.7325e-003, A6 = 2.0818e-002,$
$A8 = -5.6452e-003$ Eighth surface $K = 0.0000e+000, A4 = -7.3548e-002, A6 = 1.2354e-001,$
$A8 = -1.3762e-001, A10 = 7.8947e-002, A12 = -1.6892e-002$ Ninth surface $K = -2.0000e+000, A4 = 1.8419e-002, A6 = -6.8344e-002,$
$A8 = 7.3910e-002, A10 = -3.4047e-002, A12 = 6.0222e-003$

| Various data | |
|---|---|
| Focal length | 0.691 |
| F-number | 2.750 |
| Half angle of field | 104.090 |

-continued

| Unit mm | |
|---|---|
| Image height | 2.068 |
| Overall lens length | 13.040 |
| BF | 1.601 |

Figure 43:
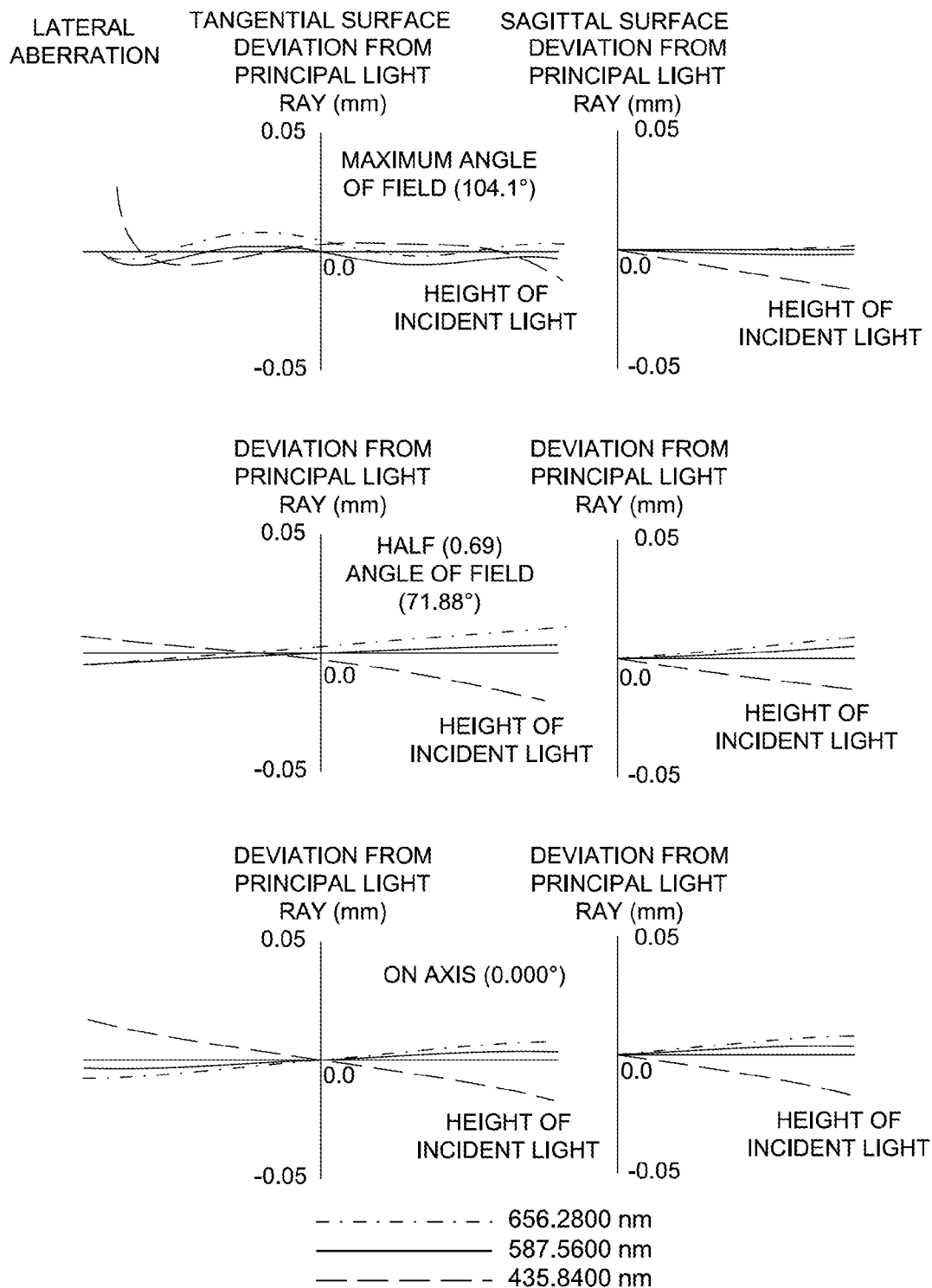
FIG. 43 is an aberration diagram-2 of the lens group in the wide angle optical system of the 10th embodiment.
Figure 44:
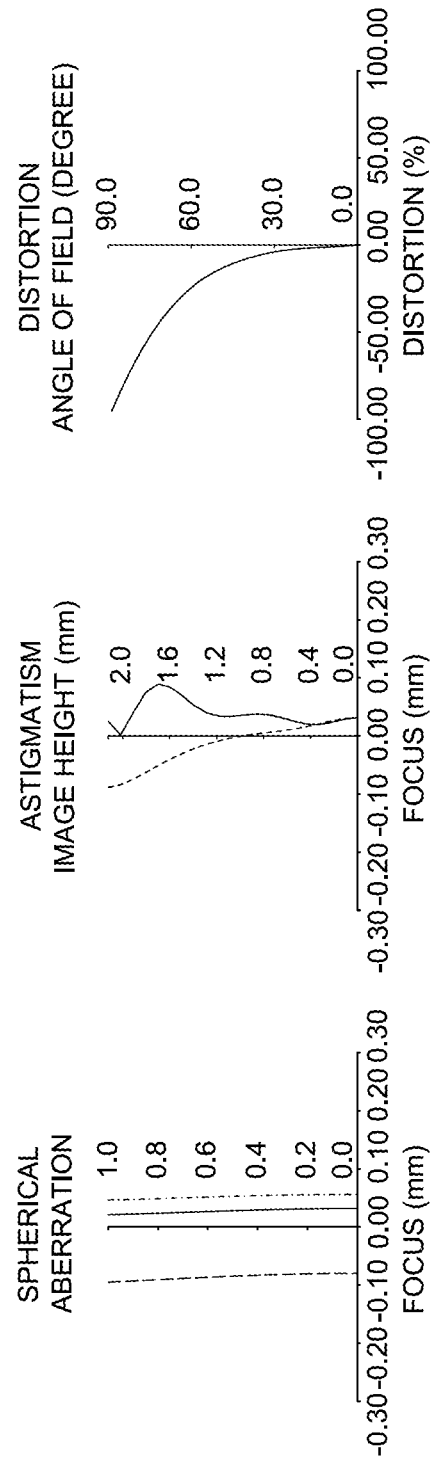
FIGS. 44A, 44B, 44C are aberration diagrams-1 of a lens group in a wide angle optical system of the 11th embodiment.

With the above lens arrangement and construction, the spherical aberration (sine condition), the astigmatism, and the distortion, in the wide angle optical system 1J of the Example 10 are shown in FIGS. 42A, 42B, 42C, and the lateral aberration is shown in FIG. 43.

Example 11

Figure 16:
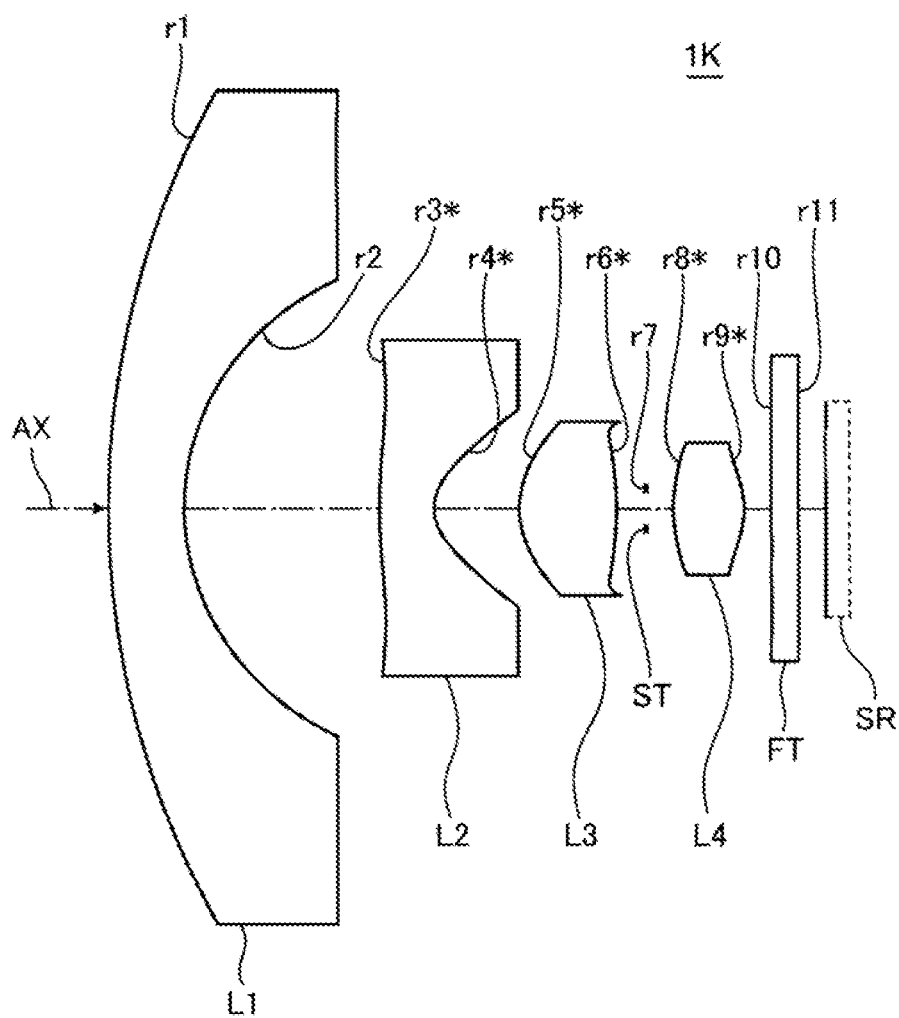
FIG. 16 is diagram showing a cross sectional view of an arrangement of a lens group in a wide angle optical system according to a 11th embodiment.

FIG. 16 is a cross-sectional view diagram showing an example of the arrangement of a lens group in a wide angle optical system according to Example 11. FIGS. 44A, 44B, 44C and FIG. 45 are the aberration diagrams of the wide angle optical system of Example 11.

A wide angle optical system 1K of Example 11, as shown in FIG. 16, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1K of this Example 11 is given below.

Numerical Value Example 11

| Unit mm | | | | |
|---|---|---|---|---|
| Surface data | | | | |
| Surface number | r | d | nd | vd |
| Object surface | ∞ | ∞ | | |
| 1 | 17.607 | 1.400 | 1.83481 | 42.72 |
| 2 | 4.970 | 3.583 | | |
| 3* | 10.000 | 1.000 | 1.53048 | 55.72 |
| 4* | 0.925 | 1.562 | | |
| 5* | 1.836 | 1.794 | 1.61420 | 25.59 |
| 6* | −5.646 | 0.528 | | |
| 7(Aperture) | ∞ | 0.515 | | |
| 8* | 3.421 | 1.299 | 1.53048 | 55.72 |
| 9* | −1.692 | 0.500 | | |
| 10 | ∞ | 0.500 | 1.51680 | 64.20 |
| 11 | ∞ | 0.500 | | |
| Image surface | ∞ | | | |

Aspherical surface data

Third surface $K = -1.5496e+001, A4 = -3.6093e-003, A6 = -2.0553e-004,$
$A8 = 2.1383e-005, A10 = 1.6335e-006, A12 = -1.3189e-007$ -continued

| Unit mm |
|---|
| Fourth surface |

K = −2.1529e+000, A4 = 1.5000e−001, A6 = −8.7614e−002,
A8 = 2.1241e−002, A10 = −1.4261e−003, A12 = −9.2773e−005
Fifth surface K = 0.0000e+000, A4 = −1.3976e−002, A6 = −2.1039e−002,
A8 = 6.3676e−003, A10 = 8.2538e−004, A12 = −6.5452e−004
Sixth surface K = 0.0000e+000, A4 = 1.9629e−002, A6 = 5.7736e−003,
A8 = −8.1620e−003, A10 = −9.7389e−004, A12 = 1.3283e−003
Eighth surface K = 0.0000e+000, A4 = −2.6676e−002, A6 = 4.1736e−002,
A8 = −7.3223e−002, A10 = 5.6967e−002, A12 = −1.3970e−002
Ninth surface K = −2.0000e+000, A4 = 5.1901e−002, A6 = 2.1804e−002,
A8 = −9.0973e−003, A10 = −8.7537e−003, A12 = 4.3291e−003

| Various data | |
|---|---|
| Focal length | 0.811 |
| F-number | 2.781 |
| Half angle of field | 103.960 |
| Image height | 2.068 |
| Overall lens length | 13.043 |
| BF | 1.361 |

Figure 45:
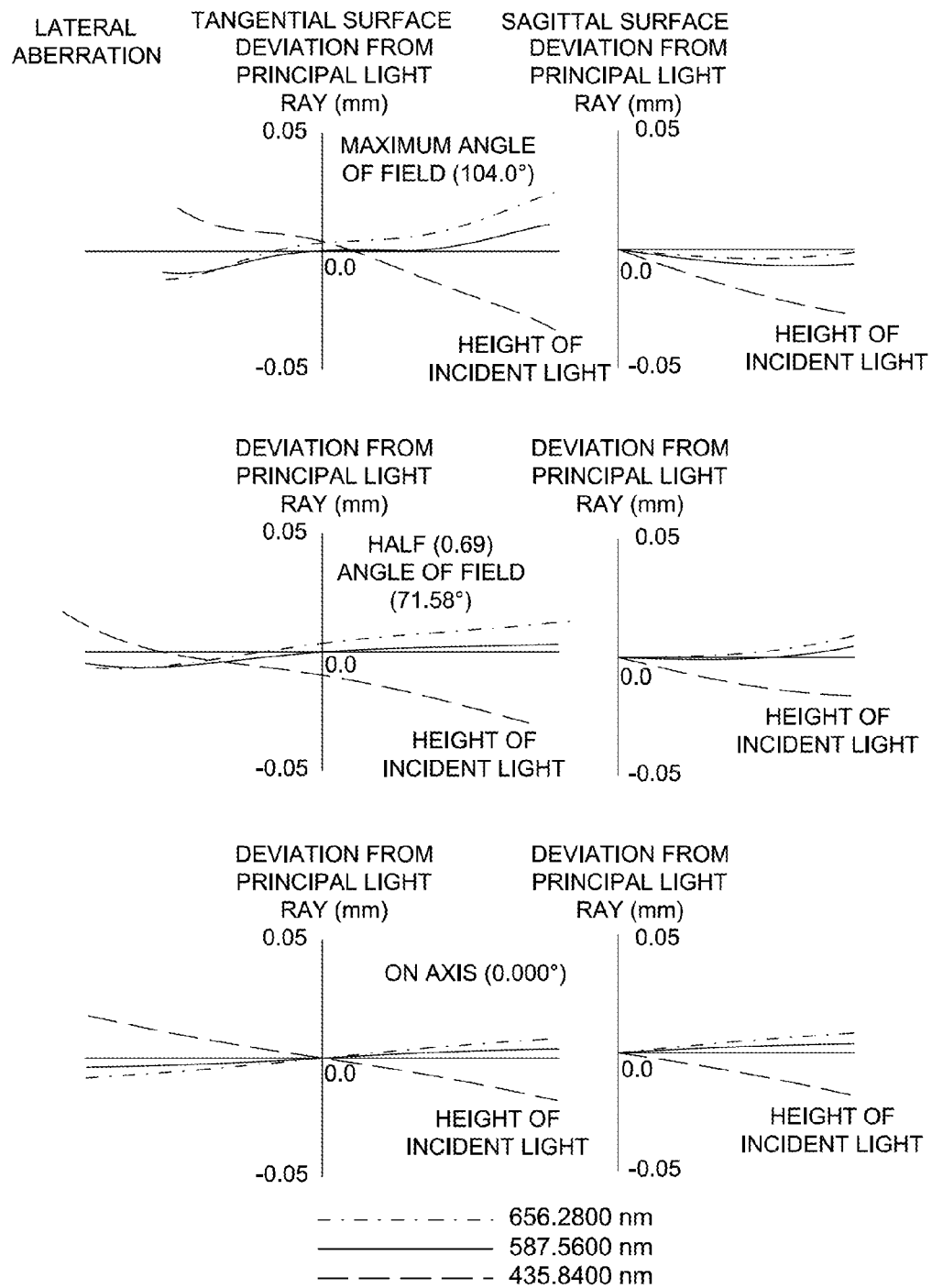
FIG. 45 is an aberration diagram-2 of the lens group in the wide angle optical system of the 11th embodiment.
Figure 46:
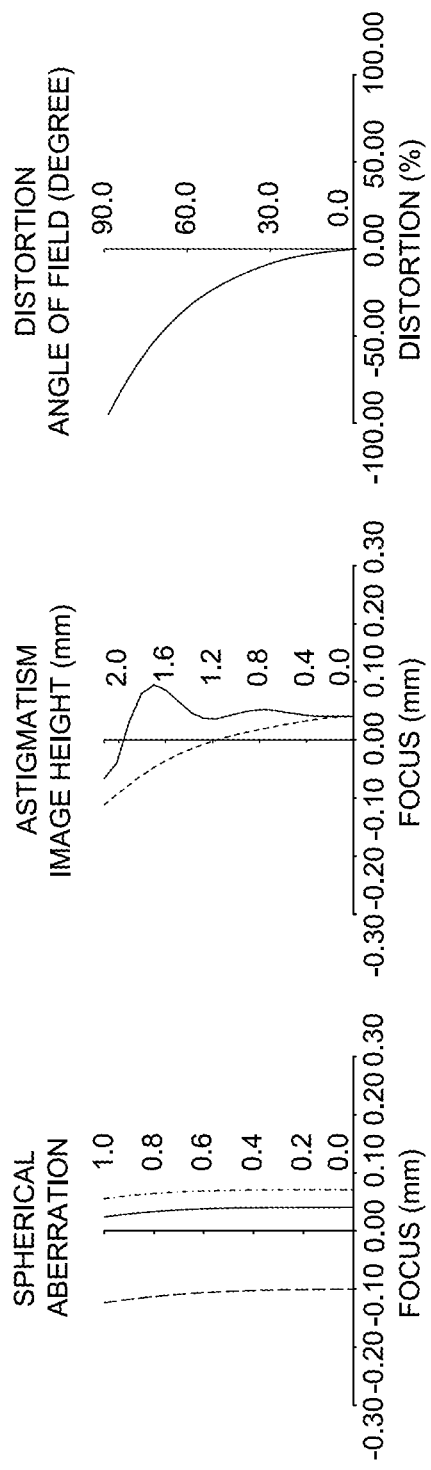
FIGS. 46A, 46B, 46C are aberration diagrams-1 of a lens group in a wide angle optical system of the 12th embodiment.

With the above lens arrangement and construction, the spherical aberration (sine condition), the astigmatism, and the distortion, in the wide angle optical system 1K of the Example 11 are shown in FIGS. 44A, 44B, 44C, and the lateral aberration is shown in FIG. 45.

Example 12

Figure 17:
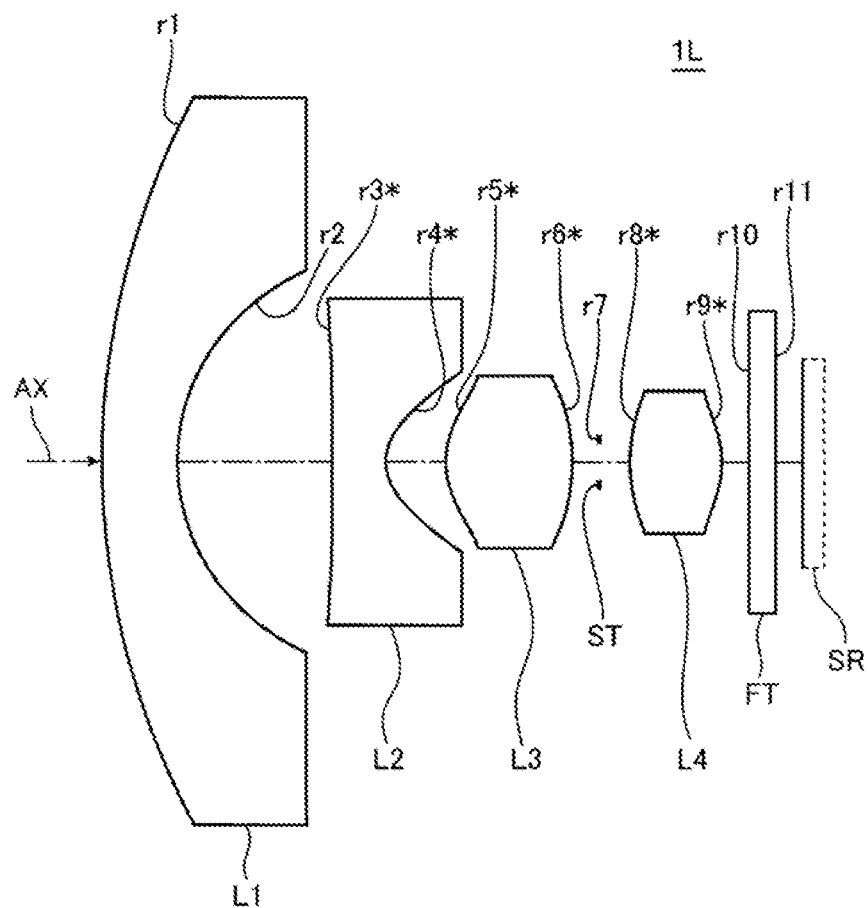
FIG. 17 is diagram showing a cross sectional view of an arrangement of a lens group in a wide angle optical system according to a 12th embodiment.

FIG. 17 is a cross-sectional view diagram showing an example of the arrangement of a lens group in a wide angle optical system according to Example 12. FIGS. 46A, 46B, 46C and FIG. 47 are the aberration diagrams of the wide angle optical system of Example 12.

A wide angle optical system 1L of Example 12, as shown in FIG. 17, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1L of this Example 12 is given below.

Numerical Value Example 12

| Unit mm | | | | |
|---|---|---|---|---|
| Surface data | | | | |
| Surface number | r | d | nd | vd |
| Object surface | ∞ | ∞ | | |
| 1 | 16.088 | 1.400 | 1.81600 | 46.55 |
| 2 | 4.205 | 2.861 | | |
| 3* | 145.176 | 1.000 | 1.53048 | 55.72 |
| 4* | 1.009 | 1.105 | | |
| 5* | 1.835 | 2.337 | 1.62090 | 24.44 |
| 6* | −4.093 | 0.490 | | |
| 7(Aperture) | ∞ | 0.580 | | |
| 8* | 3.166 | 1.706 | 1.53048 | 55.72 |
| 9* | −2.092 | 0.500 | | |
| 10 | ∞ | 0.500 | 1.51680 | 64.20 |
| 11 | ∞ | 0.500 | | |
| Image surface | ∞ | | | |

| Aspherical surface data |
|---|
| Third surface |

K = −5.0000e+000, A4 = −1.7796e−003, A6 = −7.4829e−005,
A8 = 1.4634e−005, A10 = 9.4500e−007, A12 = −9.8801e−008
Fourth surface K = −2.0000e+000, A4 = 1.4934e−001, A6 = −8.9554e−002,
A8 = 2.3089e−002, A10 = −1.1566e−003, A12 = −2.6233e−004
Fifth surface K = 0.0000e+000, A4 = −1.2787e−002, A6 = −2.5416e−002,
A8 = 4.8999e−003, A10 = 7.7868e−004, A12 = −5.8450e−004
Sixth surface K = 0.0000e+000, A4 = 8.1740e−003, A6 = −6.4806e−003,
A8 = −4.4905e−003, A10 = 3.3276e−003, A12 = −4.7852e−004
Eighth surface K = 0.0000e+000, A4 = −4.9925e−002, A6 = 7.2763e−002,
A8 = −8.0620e−002, A10 = 4.7746e−002, A12 = −1.0609e−002
Ninth surface K = −2.0000e+000, A4 = −2.1696e−003, A6 = 2.6139e−002,
A8 = −3.1309e−003, A10 = −4.3895e−003, A12 = 1.5380e−003

| Various data | |
|---|---|
| Focal length | 0.963 |
| F-number | 2.797 |
| Half angle of field | 103.708 |
| Image height | 2.068 |
| Overall lens length | 12.849 |
| BF | 1.370 |

Figure 47:
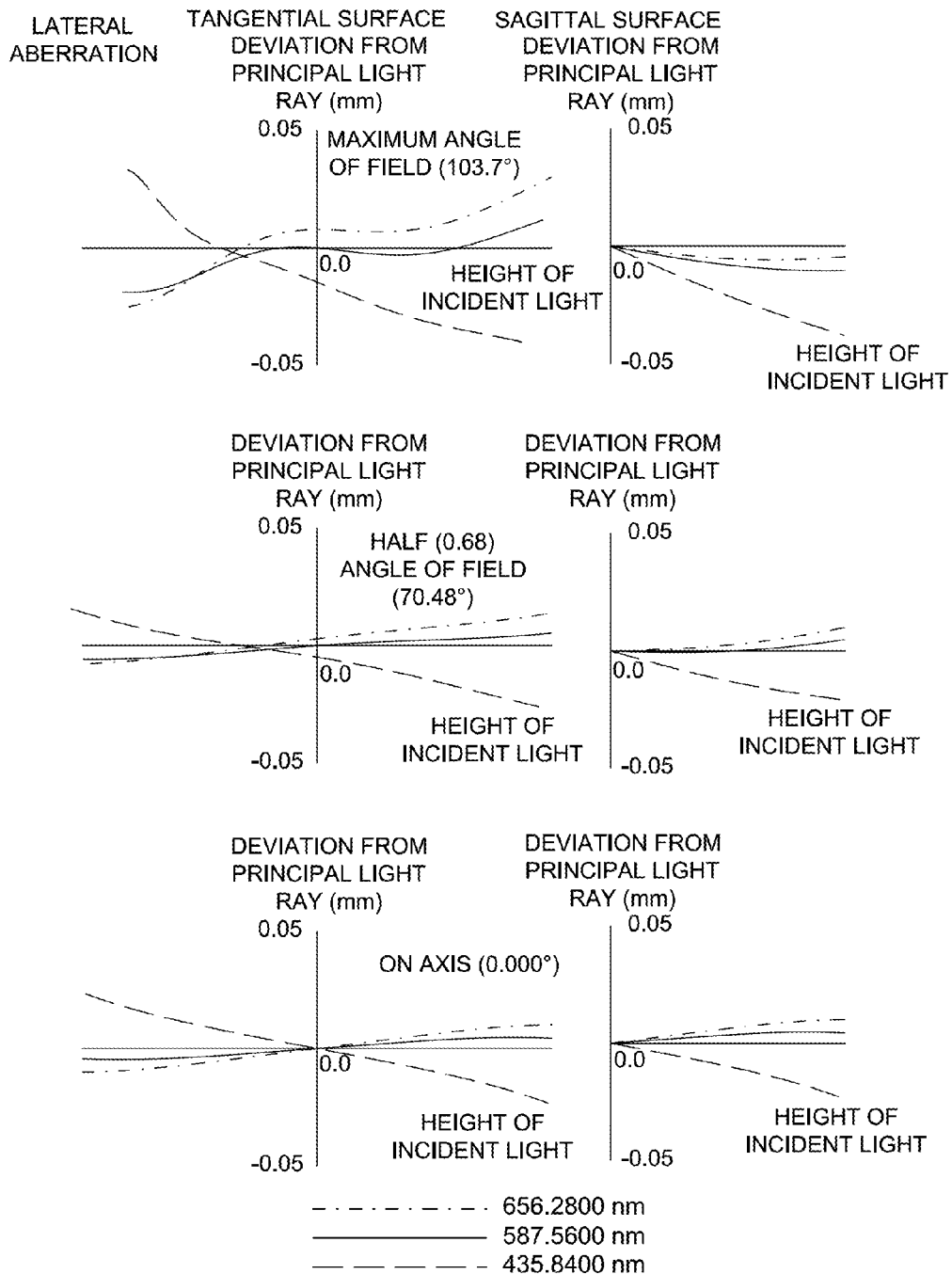
FIG. 47 is an aberration diagram-2 of the lens group in the wide angle optical system of the 12th embodiment.
Figure 48:
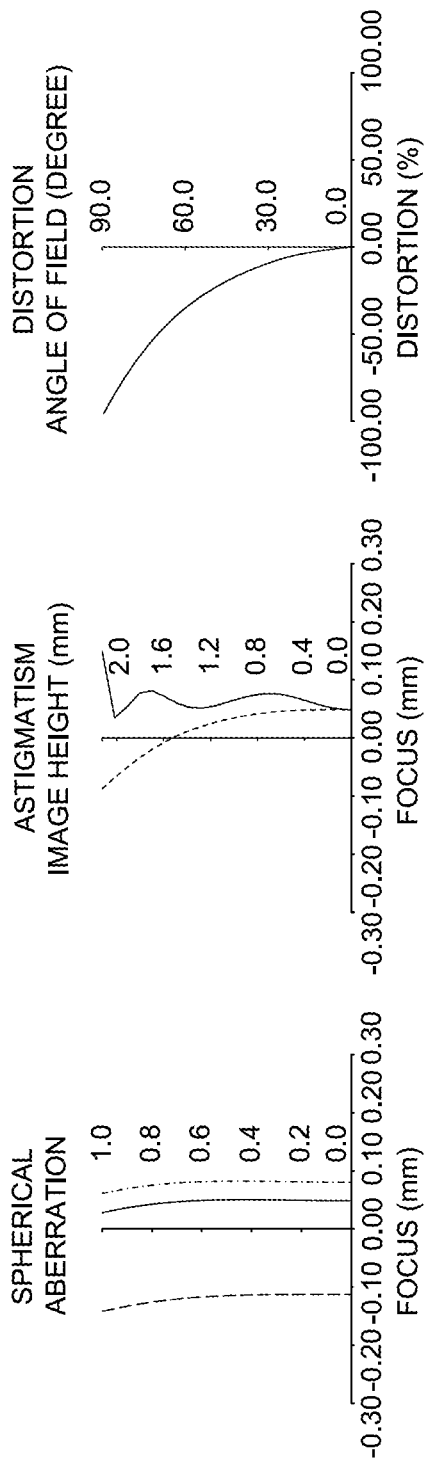
FIGS. 48A, 48B, 48C are aberration diagrams-1 of a lens group in a wide angle optical system of the 13th embodiment.

With the above lens arrangement and construction, the spherical aberration (sine condition), the astigmatism, and the distortion, in the wide angle optical system 1L of the Example 12 are shown in FIGS. 46A, 46B, 46Ct, and the lateral aberration is shown in FIG. 47.

Example 13

Figure 18:
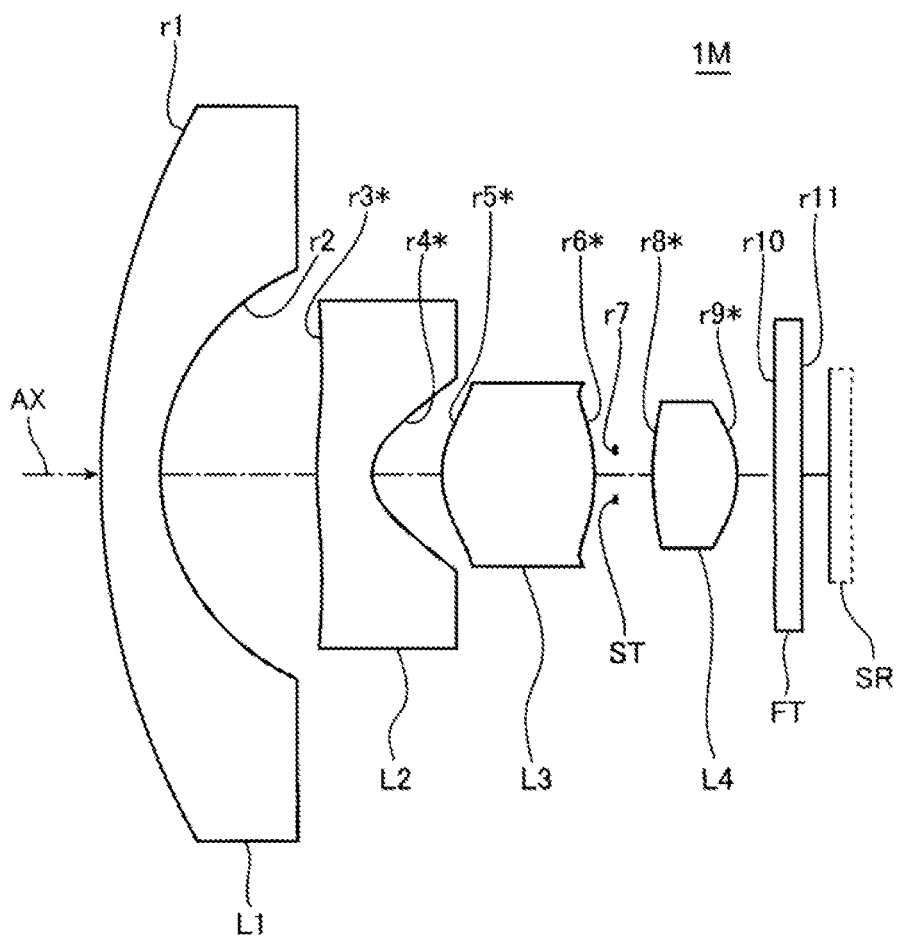
FIG. 18 is diagram showing a cross sectional view of an arrangement of a lens group in a wide angle optical system according to a 13th embodiment.

FIG. 18 is a cross-sectional view diagram showing an example of the arrangement of a lens group in a wide angle optical system according to Example 13. FIGS. 48A, 48B, 48C and FIG. 49 are the aberration diagrams of the wide angle optical system of Example 13.

A wide angle optical system 1M of Example 13, as shown in FIG. 18, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1M of this Example 13 is given below.

Numerical Value Example 13

| Unit mm | | | | |
|---|---|---|---|---|
| Surface data | | | | |
| Surface number | r | d | nd | vd |
| Object surface | ∞ | ∞ | | |
| 1 | 15.285 | 1.076 | 1.80420 | 46.49 |
| 2 | 4.371 | 2.835 | | |
| 3* | 10.000 | 1.000 | 1.53048 | 55.72 |
| 4* | 0.955 | 1.257 | | |
| 5* | 2.039 | 2.757 | 1.63200 | 23.41 |
| 6* | −3.690 | 0.375 | | |
| 7(Aperture) | ∞ | 0.682 | | |
| 8* | 4.609 | 1.522 | 1.53048 | 55.72 |
| 9* | −2.124 | 0.679 | | |
| 10 | ∞ | 0.500 | 1.51680 | 64.20 |
| 11 | ∞ | 0.500 | | |
| Image surface | ∞ | | | |

Aspherical surface data

Third surface $K = -1.2923e+001, A4 = -7.2249e-003, A6 = 2.8311e-004, A8 = 1.8963e-005, A10 = -5.9761e-007, A12 = -4.4340e-008$ Fourth surface $K = -2.0000e+000, A4 = 1.8628e-001, A6 = -1.0117e-001, A8 = 2.1556e-002, A10 = -1.1189e-003, A12 = -1.1522e-004$ Fifth surface $K = 0.0000e+000, A4 = -7.4072e-003, A6 = -1.5642e-002, A8 = 7.4547e-004$ Sixth surface $K = 0.0000e+000, A4 = 2.3906e-003, A6 = -6.7022e-003, A8 = 4.5067e-003$ Eighth surface $K = 0.0000e+000, A4 = -7.9528e-002, A6 = 1.1752e-001, A8 = -1.2420e-001, A10 = 7.0527e-002, A12 = -1.5163e-002$ Ninth surface $K = -2.0000e+000, A4 = -3.8524e-002, A6 = 2.3014e-002, A8 = 4.1851e-004, A10 = -4.8948e-003, A12 = 1.5599e-003$

| Various data | |
|---|---|
| Focal length | 1.017 |
| F-number | 2.802 |
| Half angle of field | 103.831 |
| Image height | 2.068 |
| Overall lens length | 13.061 |
| BF | 1.558 |

Figure 49:
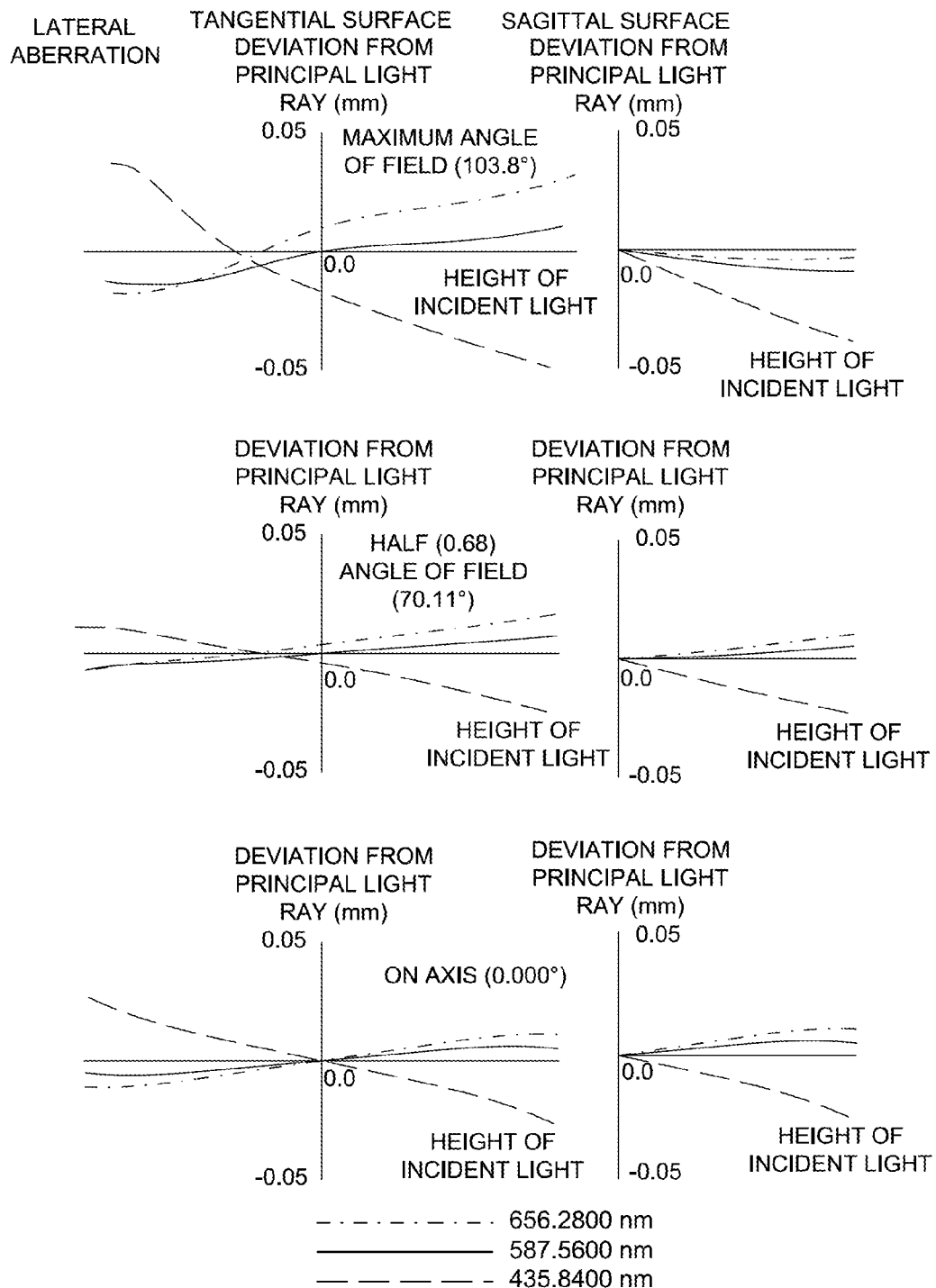
FIG. 49 is an aberration diagram-2 of the lens group in the wide angle optical system of the 13th embodiment.

With the above lens arrangement and construction, the spherical aberration (sine condition), the astigmatism, and the distortion, in the wide angle optical system 1M of the Example 13 are shown in FIGS. 48A, 48B, 48C, and the lateral aberration is shown in FIG. 49.

Example 14

Figure 19:
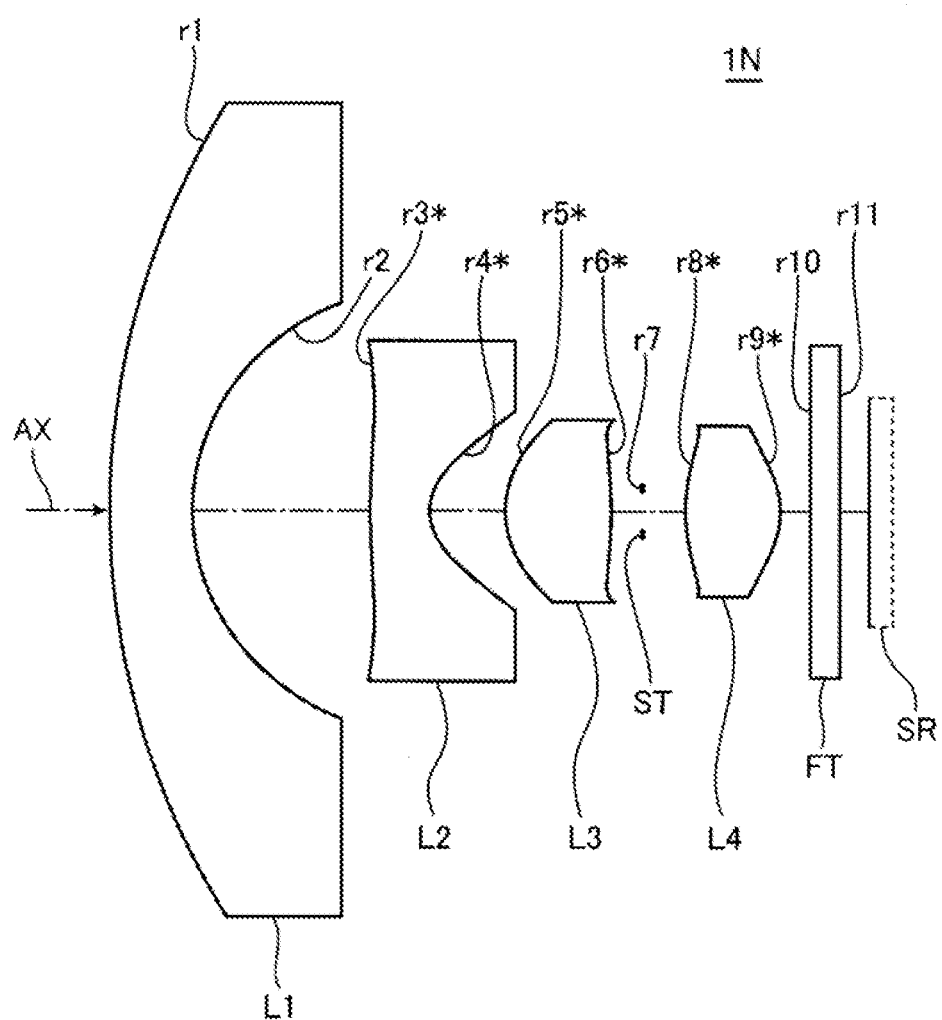
FIG. 19 is diagram showing a cross sectional view of an arrangement of a lens group in a wide angle optical system according to a 14th embodiment.

FIG. 19 is a cross-sectional view diagram showing an example of the arrangement of a lens group in a wide angle optical system according to Example 14. FIGS. 50A, 50B, 50C and FIG. 51 are the aberration diagrams of the wide angle optical system of Example 14.

A wide angle optical system 1N of Example 14, as shown in FIG. 19, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1N of this Example 14 is given below.

Numerical Value Example 14

| Unit mm | | | | |
|---|---|---|---|---|
| Surface data | | | | |
| Surface number | r | d | nd | vd |
| Object surface | ∞ | ∞ | | |
| 1 | 14.617 | 1.400 | 1.83400 | 37.35 |
| 2 | 4.061 | 3.011 | | |
| 3* | 14.980 | 1.000 | 1.53048 | 55.72 |
| 4* | 0.982 | 1.281 | | |
| 5* | 1.868 | 1.786 | 1.63450 | 23.90 |
| 6* | −6.594 | 0.529 | | |
| 7(Aperture) | ∞ | 0.732 | | |
| 8* | 3.117 | 1.607 | 1.53048 | 55.72 |
| 9* | −1.562 | 0.500 | | |
| 10 | ∞ | 0.500 | 1.51680 | 64.20 |
| 11 | ∞ | 0.500 | | |
| Image surface | ∞ | | | |

Aspherical surface data

Third surface $K = -3.0000e+001, A4 = -3.2061e-003, A6 = -2.1451e-004, A8 = 1.8572e-005, A10 = 1.4226e-006, A12 = -1.1201e-007$ Fourth surface $K = -2.0000e+000, A4 = 1.6697e-001, A6 = -8.8464e-002, A8 = 2.0375e-002, A10 = -1.4067e-003, A12 = -9.5828e-005$ Fifth surface $K = 0.0000e+000, A4 = 4.2952e-003, A6 = -2.0660e-002, A8 = 5.8774e-003, A10 = 2.4104e-004, A12 = -4.0028e-004$ -continued Unit mm Sixth surface K = 0.0000e+000, A4 = 2.5865e−002, A6 = −5.4384e−004,
A8 = −1.4984e−003, A10 = −2.8890e−003, A12 = 1.4917e−003
Eighth surface K = 0.0000e+000, A4 = −6.2949e−002, A6 = 7.4237e−002,
A8 = −6.1957e−002, A10 = 2.5910e−002, A12 = −4.6203e−003
Ninth surface K = −2.0000e+000, A4 = −7.9903e−003, A6 = 1.9876e−002,
A8 = 1.1896e−003, A10 = −3.5518e−003, A12 = 5.8601e−004

Various data

| | |
|---|---|
| Focal length | 0.860 |
| F-number | 2.785 |
| Half angle of field | 104.045 |
| Image height | 2.068 |
| Overall lens length | 12.709 |
| BF | 1.363 |

Figure 51:
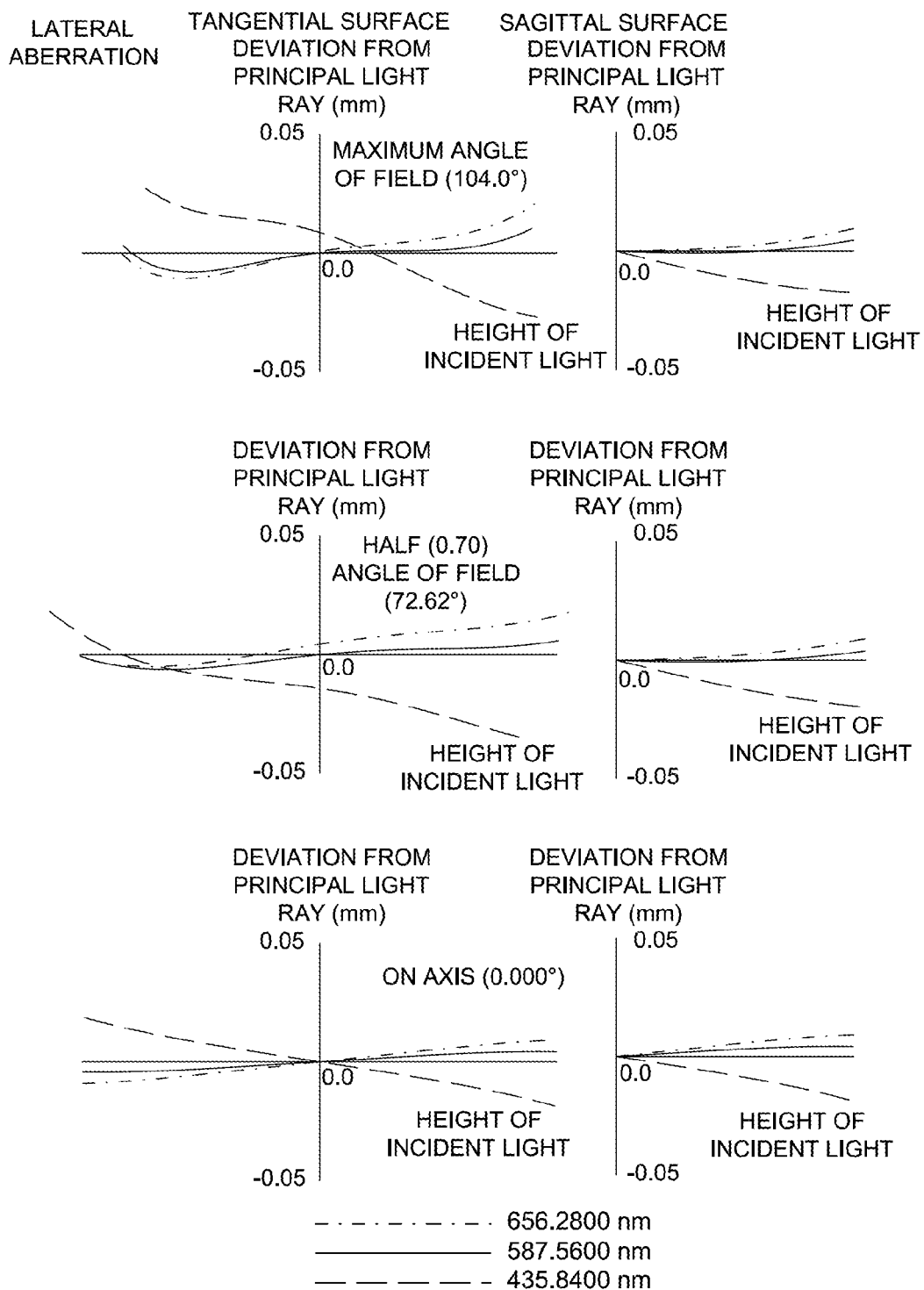
FIG. 51 is an aberration diagram-2 of the lens group in the wide angle optical system of the 14th embodiment.
Figure 52:
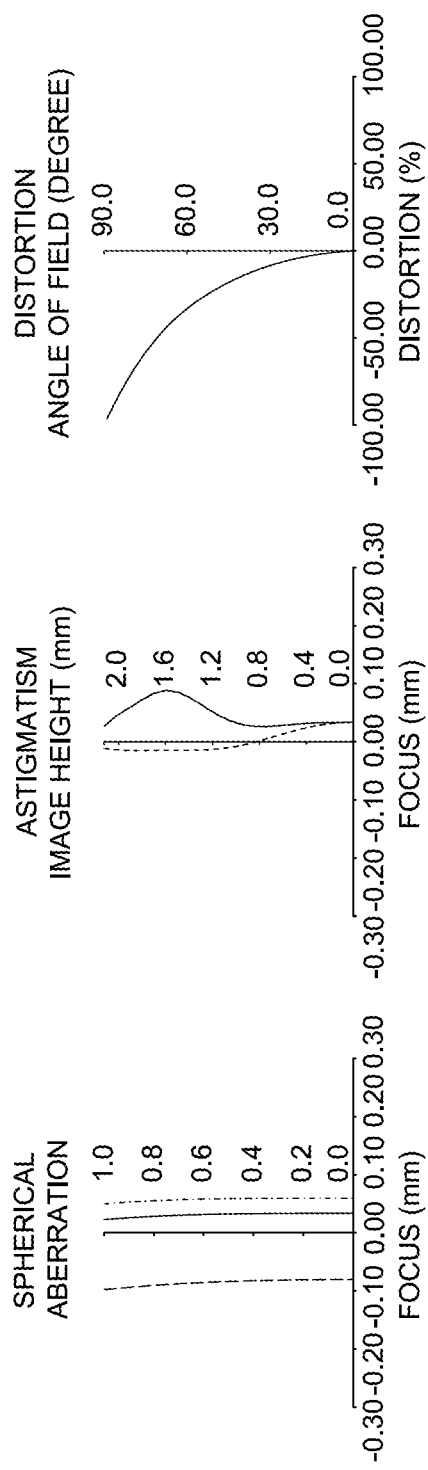
FIGS. 52A, 52B, 52C are aberration diagrams-1 of a lens group in a wide angle optical system of the 15th embodiment.

With the above lens arrangement and construction, the spherical aberration (sine condition), the astigmatism, and the distortion, in the wide angle optical system 1N of the Example 14 are shown in FIGS. 50A, 50B, 50C from left to right, and the lateral aberration is shown in FIG. 51.

Example 15

Figure 20:
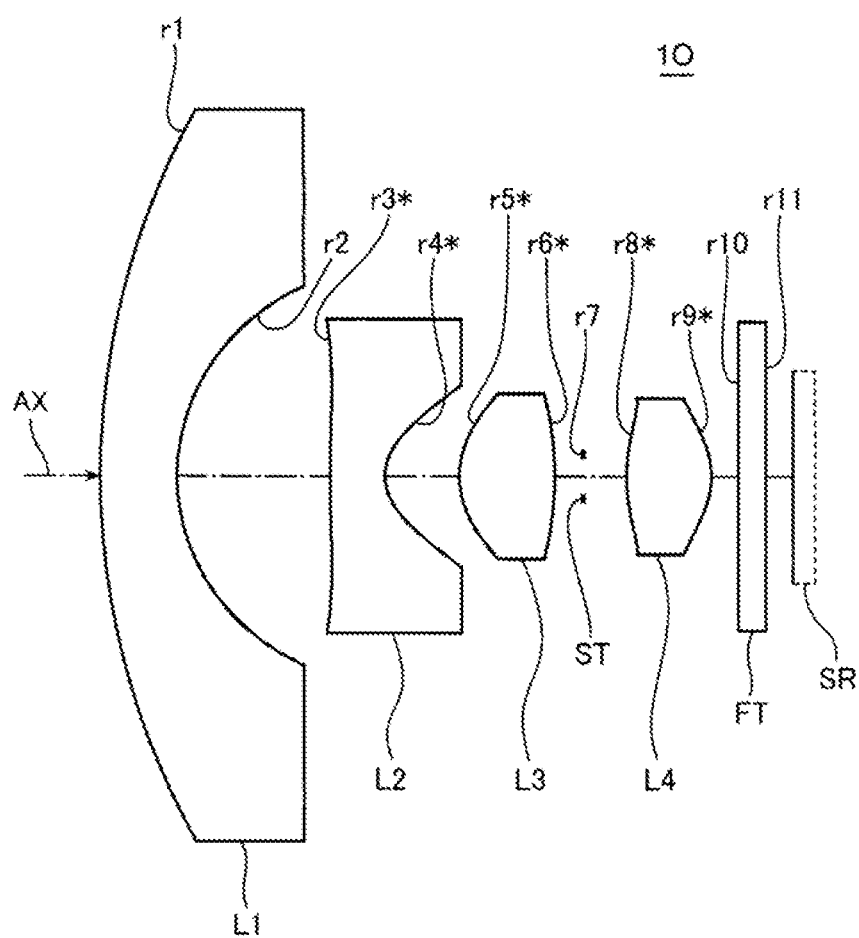
FIG. 20 is diagram showing a cross sectional view of an arrangement of a lens group in a wide angle optical system according to a 15th embodiment.

FIG. 20 is a cross-sectional view diagram showing an example of the arrangement of a lens group in a wide angle optical system according to Example 15. FIGS. 52A, 52B, 52C and FIG. 53 are the aberration diagrams of the wide angle optical system of Example 20.

A wide angle optical system 10 of Example 15, as shown in FIG. 20, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 10 of this Example 15 is given below.

Numerical Value Example 15

Unit mm

Surface data

| Surface number | r | d | nd | vd |
|---|---|---|---|---|
| Object surface | ∞ | ∞ | | |
| 1 | 15.303 | 1.400 | 1.80420 | 46.49 |
| 2 | 4.089 | 2.796 | | |
| 3* | 28.709 | 1.000 | 1.53048 | 55.72 |
| 4* | 1.031 | 1.354 | | |
| 5* | 1.845 | 1.740 | 1.60700 | 27.10 |
| 6* | −5.314 | 0.522 | | |
| 7(Aperture) | ∞ | 0.792 | | |
| 8* | 3.186 | 1.545 | 1.53048 | 55.72 |
| 9* | −1.760 | 0.500 | | |
| 10 | ∞ | 0.500 | 1.51680 | 64.20 |
| 11 | ∞ | 0.500 | | |
| Image surface | ∞ | | | |

Aspherical surface data

Third surface

K = −3.0000e+001, A4 = −2.1351e−003, A6 = −1.7353e−004,
A8 = 1.1791e−005, A10 = 8.6785e−007, A12 = −6.5507e−008
Fourth surface K = −2.0727e+000, A4 = 1.6966e−001, A6 = −8.9161e−002,
A8 = 2.0913e−002, A10 = −1.4759e−003, A12 = −1.0723e−004
Fifth surface K = 0.0000e+000, A4 = 2.0822e−004, A6 = −2.4385e−002,
A8 = 6.2483e−003, A10 = 9.1390e−004, A12 = −6.6165e−004
Sixth surface K = 0.0000e+000, A4 = 1.6334e−002, A6 = 5.5332e−003,
A8 = −7.8608e−003, A10 = 1.1285e−003, A12 = 2.4314e−004
Eighth surface K = 0.0000e+000, A4 = −7.7296e−002, A6 = 8.5276e−002,
A8 = −6.4871e−002, A10 = 2.4873e−002, A12 = −4.1132e−003
Ninth surface K = −2.0000e+000, A4 = −2.8534e−002, A6 = 2.7877e−002,
A8 = 9.9006e−004, A10 = −4.0566e−003, A12 = 6.9885e−004

Various data

| | |
|---|---|
| Focal length | 0.905 |
| F-number | 2.789 |
| Half angle of field | 104.349 |
| Image height | 2.068 |
| Overall lens length | 12.512 |
| BF | 1.363 |

Figure 53:
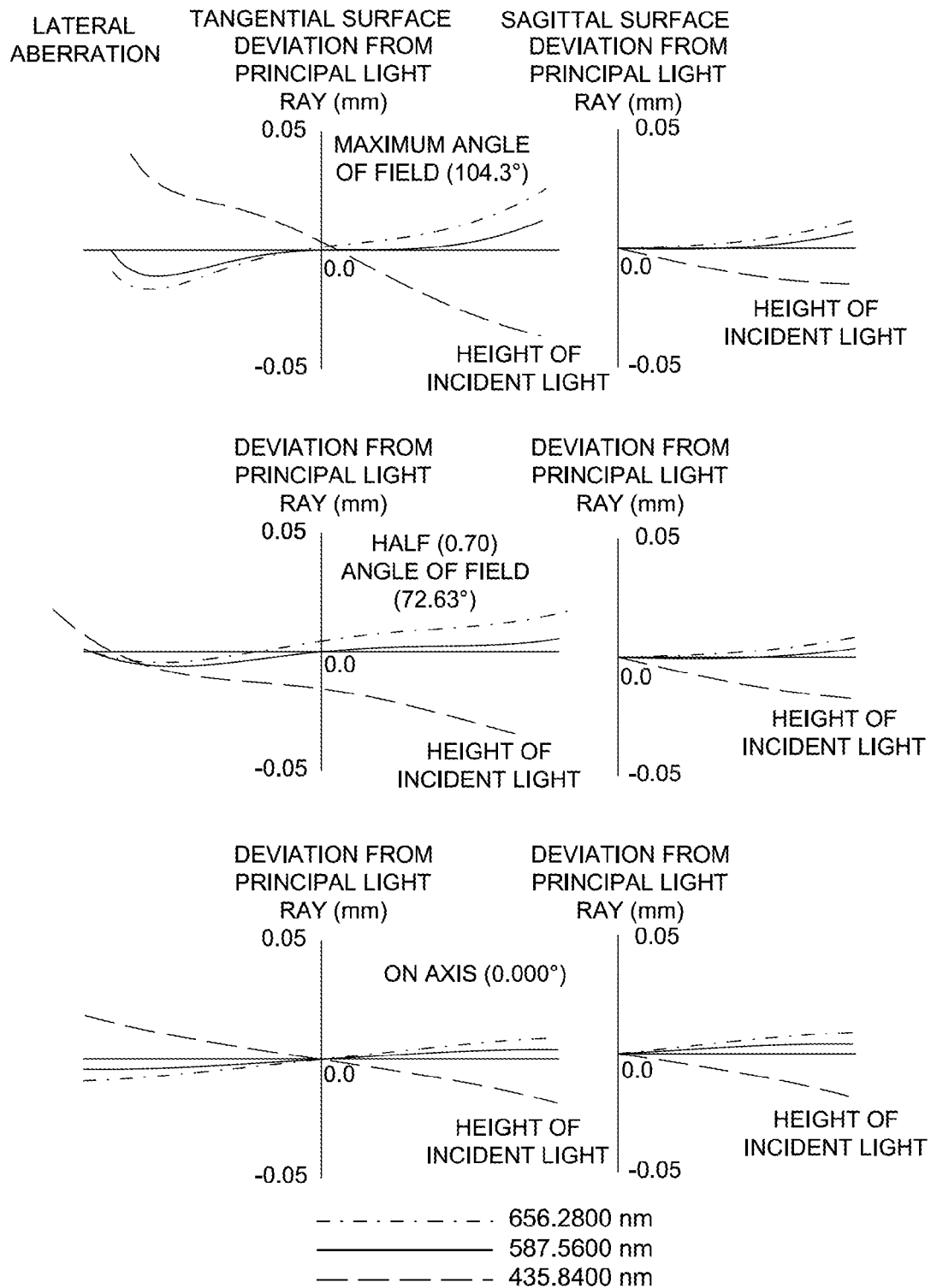
FIG. 53 is an aberration diagram-2 of the lens group in the wide angle optical system of the 15th embodiment.
Figure 54:
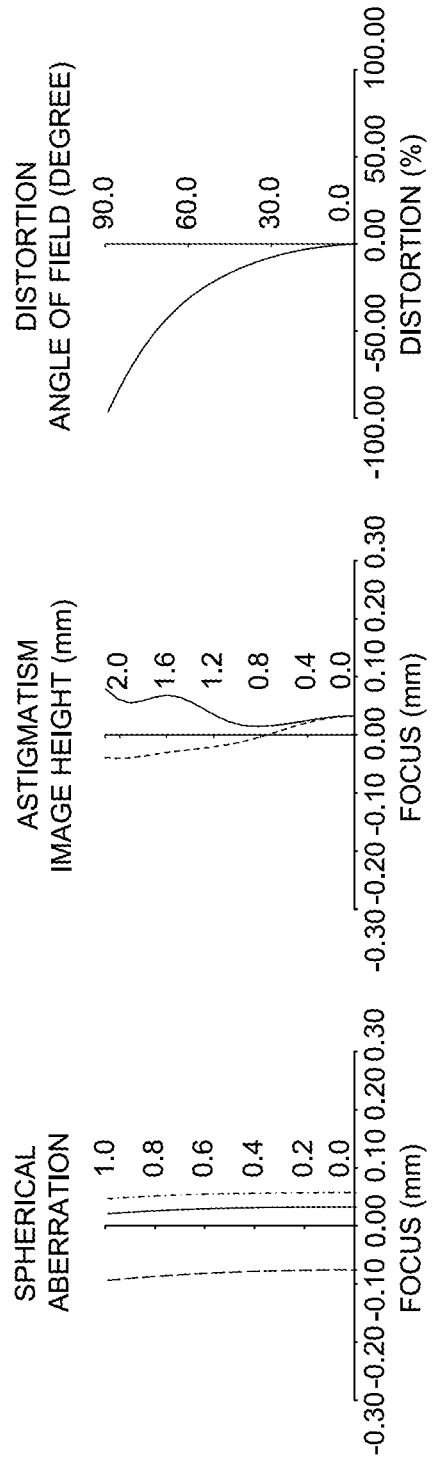
FIGS. 54A, 54B, 54C are aberration diagrams-1 of a lens group in a wide angle optical system of the 16th embodiment.

With the above lens arrangement and construction, the spherical aberration (sine condition), the astigmatism, and the distortion, in the wide angle optical system 10 of the Example 15 are shown in FIGS. 52A, 52B, 52C, and the lateral aberration is shown in FIG. 53.

Example 16

Figure 21:
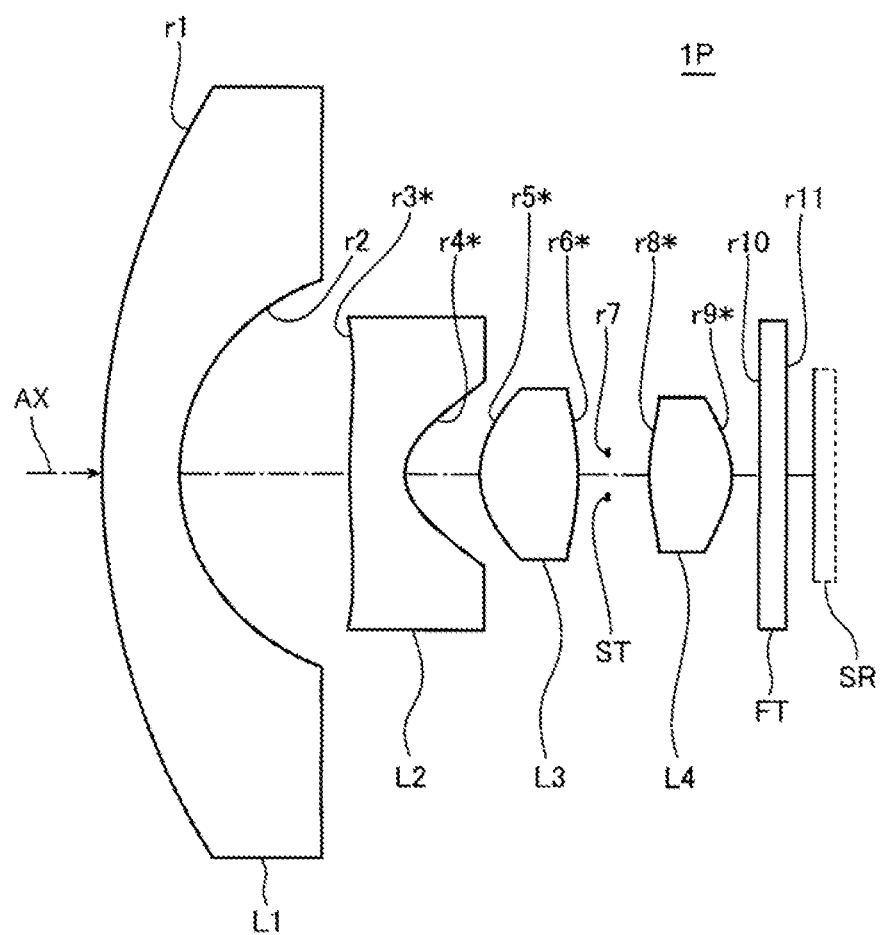
FIG. 21 is diagram showing a cross sectional view of an arrangement of a lens group in a wide angle optical system according to a 16th embodiment.

FIG. 21 is a cross-sectional view diagram showing an example of the arrangement of a lens group in a wide angle optical system according to Example 16. FIGS. 54A, 54B, 54C and FIG. 55 are the aberration diagrams of the wide angle optical system of Example 16.

A wide angle optical system 1P of Example 16, as shown in FIG. 21, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1P of this Example 15 is given below.

Numerical Value Example 16

| Unit mm | | | | |
|---|---|---|---|---|
| Surface data | | | | |
| Surface number | r | d | nd | vd |
| Object surface | ∞ | ∞ | | |
| 1 | 14.951 | 1.400 | 1.80420 | 46.49 |
| 2 | 4.018 | 3.116 | | |
| 3* | 15.445 | 1.000 | 1.53048 | 55.72 |
| 4* | 0.996 | 1.356 | | |
| 5* | 1.856 | 1.801 | 1.60280 | 28.30 |
| 6* | −4.704 | 0.537 | | |
| 7(Aperture) | ∞ | 0.758 | | |
| 8* | 3.403 | 1.510 | 1.53048 | 55.72 |
| 9* | −1.756 | 0.500 | | |
| 10 | ∞ | 0.500 | 1.51680 | 64.20 |
| 11 | ∞ | 0.500 | | |
| Image surface | ∞ | | | |

Aspherical surface data

Third surface

K = −2.9172e+001, A4 = −2.8984e−003, A6 = −1.9962e−004,
A8 = 1.2592e−005, A10 = 9.2223e−007, A12 = −5.2269e−008

Fourth surface

K = −2.0000e+000, A4 = 1.6709e−001, A6 = −8.9139e−002,
A8 = 2.0888e−002, A10 = −1.5288e−003, A12 = −8.6482e−005

Fifth surface

K = 0.0000e+000, A4 = 8.1748e−004, A6 = −2.3735e−002,
A8 = 5.8736e−003, A10 = 9.5558e−004, A12 = −6.1595e−004

Sixth surface

K = 0.0000e+000, A4 = 1.9053e−002, A6 = 6.2215e−003,
A8 = −8.4784e−003, A10 = 1.5257e−003, A12 = 1.8851e−004

Eighth surface

K = 0.0000e+000, A4 = −6.9402e−002, A6 = 7.8209e−002,
A8 = −6.7923e−002, A10 = 2.7912e−002, A12 = −4.4255e−003

Ninth surface

K = −2.0000e+000, A4 = −1.9873e−002, A6 = 2.9005e−002,
A8 = −1.7074e−003, A10 = −4.7814e−003, A12 = 1.1174e−003

| Various data | |
|---|---|
| Focal length | 0.880 |
| F-number | 2.784 |
| Half angle of field | 104.051 |
| Image height | 2.068 |
| Overall lens length | 12.839 |
| BF | 1.362 |

Figure 55:
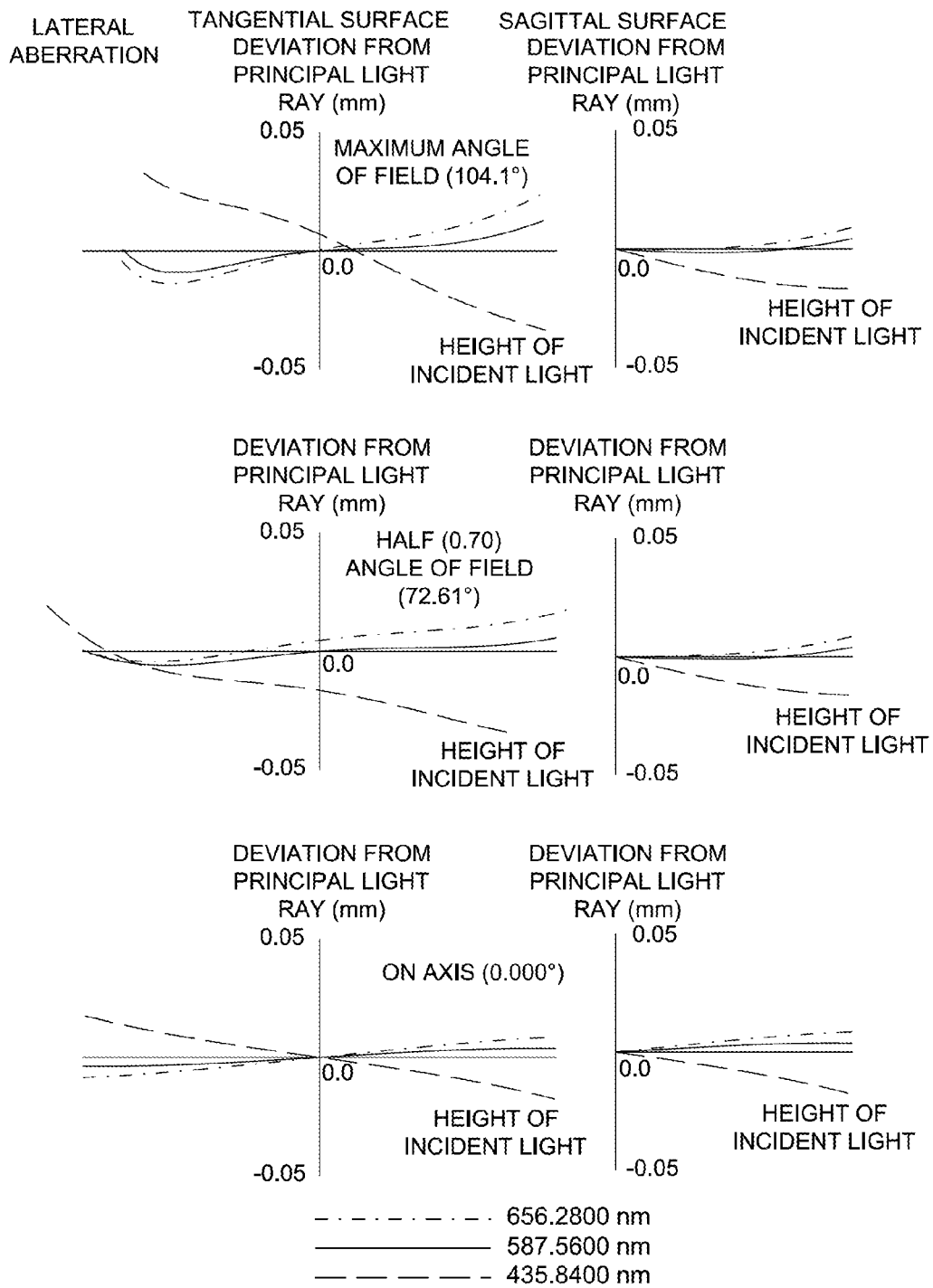
FIG. 55 is an aberration diagram-2 of the lens group in the wide angle optical system of the 16th embodiment.

With the above lens arrangement and construction, the spherical aberration (sine condition), the astigmatism, and the distortion, in the wide angle optical system 1P of the Example 15 are shown in FIGS. 54A, 54B, 54C from left to right, and the lateral aberration is shown in FIG. 55.

Example 17

Figure 22:
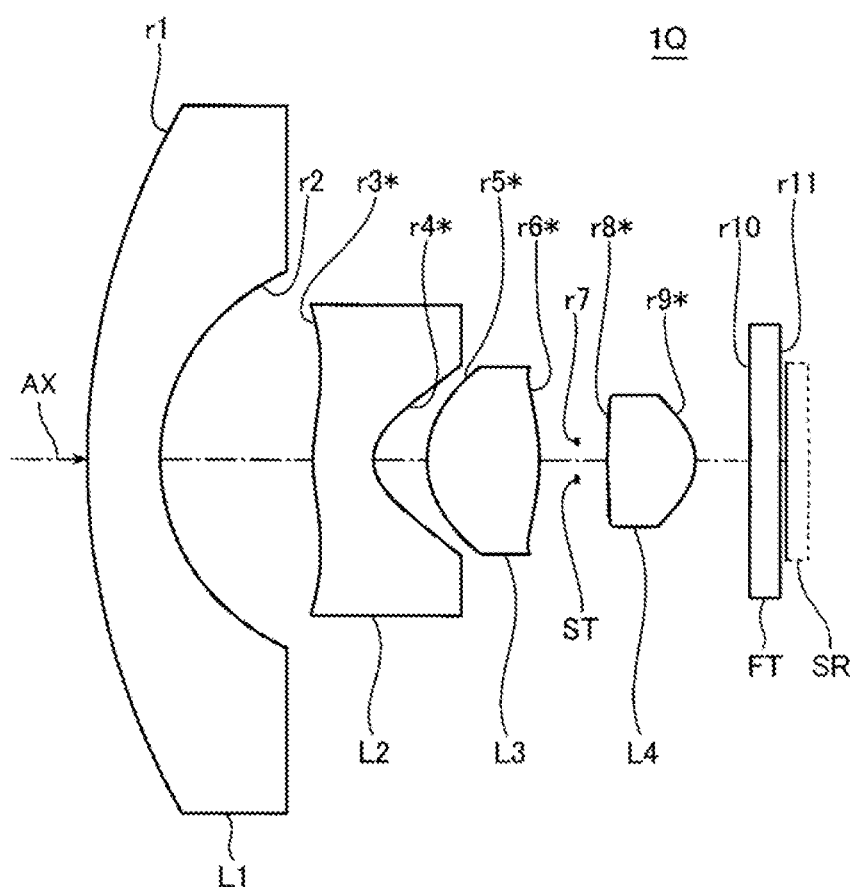
FIG. 22 is diagram showing a cross sectional view of an arrangement of a lens group in a wide angle optical system according to a 17th embodiment.

FIG. 22 is a cross-sectional view diagram showing an example of the arrangement of a lens group in a wide angle optical system according to Example 17. FIGS. 56A, 56B, 56C and FIG. 57 are the aberration diagrams of the wide angle optical system of Example 17.

A wide angle optical system 1Q of Example 17, as shown in FIG. 22, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1Q of this Example 17 is given below.

Numerical Value Example 17

| Unit mm | | | | |
|---|---|---|---|---|
| Surface data | | | | |
| Surface number | r | d | nd | vd |
| Object surface | ∞ | ∞ | | |
| 1 | 13.082 | 1.200 | 1.83481 | 42.72 |
| 2 | 3.673 | 2.511 | | |
| 3* | 2.971 | 1.000 | 1.53048 | 55.72 |
| 4* | 0.731 | 0.877 | | |
| 5* | 1.892 | 1.845 | 1.58340 | 30.23 |
| 6* | −3.516 | 0.620 | | |
| 7 (Aperture) | ∞ | 0.504 | | |
| 8* | 6.123 | 1.444 | 1.53048 | 55.72 |
| 9* | −0.964 | 0.900 | | |
| 10 | ∞ | 0.500 | 1.51680 | 64.20 |
| 11 | ∞ | 0.100 | | |
| Image surface | ∞ | | | |

Aspherical surface data

Third surface

K = −3.0000e+001, A4 = −1.7303e−002, A6 = 2.4328e−003,
A8 = −2.5632e−004, A10 = 1.2614e−005

Fourth surface

K = −1.0000e+000, A4 = 5.1358e−003, A6 = −7.2334e−002,
A8 = 2.5766e−002, A10 = −2.9839e−003

Fifth surface

K = 0.0000e+000, A4 = 6.3485e−002, A6 = −6.7401e−002,
A8 = 2.5268e−002, A10 = −3.8803e−003

Sixth surface

K = 0.0000e+000, A4 = 3.8928e−002, A6 = −9.3930e−003,
A8 = 5.3611e−003, A10 = −3.7946e−003

Eighth surface

K = 0.0000e+000, A4 = −1.2350e−001, A6 = 1.7733e−001,
A8 = −1.9928e−001, A10 = 9.4716e−002

Ninth surface

K = −2.0000e+000, A4 = −1.2320e−001, A6 = 1.2257e−001,
A8 = −7.1889e−002, A10 = 1.8416e−002

| Various data | |
|---|---|
| Focal length | 0.754 |
| F-number | 2.803 |
| Half angle of field | 102.336 |

-continued

| Unit mm | | |
|---|---|---|
| Image height | 1.700 | |
| Overall lens length | 11.350 | |
| BF | 1.350 | |

Figure 57:
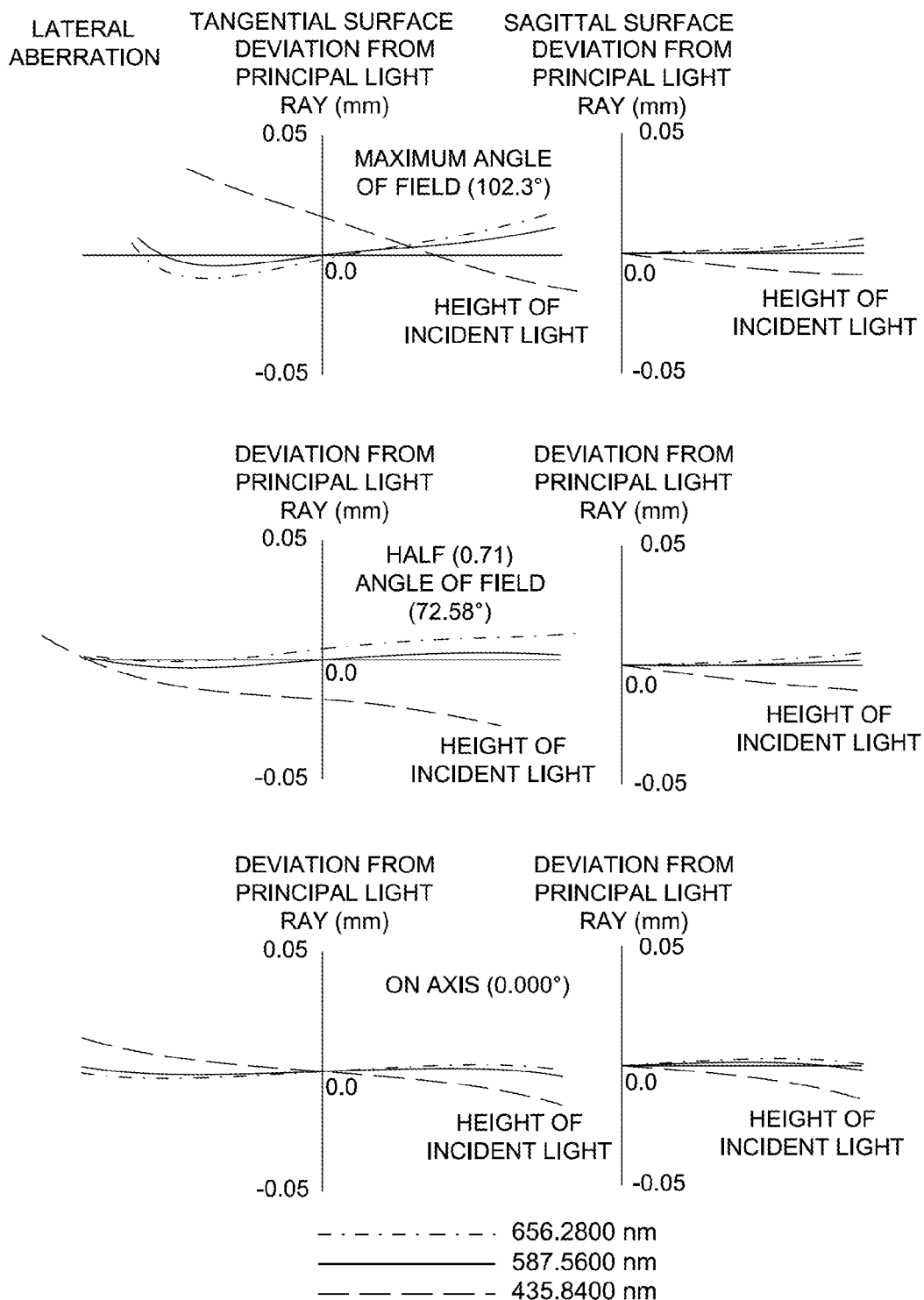
FIG. 57 is an aberration diagram-2 of the lens group in the wide angle optical system of the 17th embodiment.

With the above lens arrangement and construction, the spherical aberration (sine condition), the astigmatism, and the distortion, in the wide angle optical system 1Q of the Example 17 are shown in FIGS. 56A, 56B, 56C, and the lateral aberration is shown in FIG. 57.

Example 18

Figure 23:
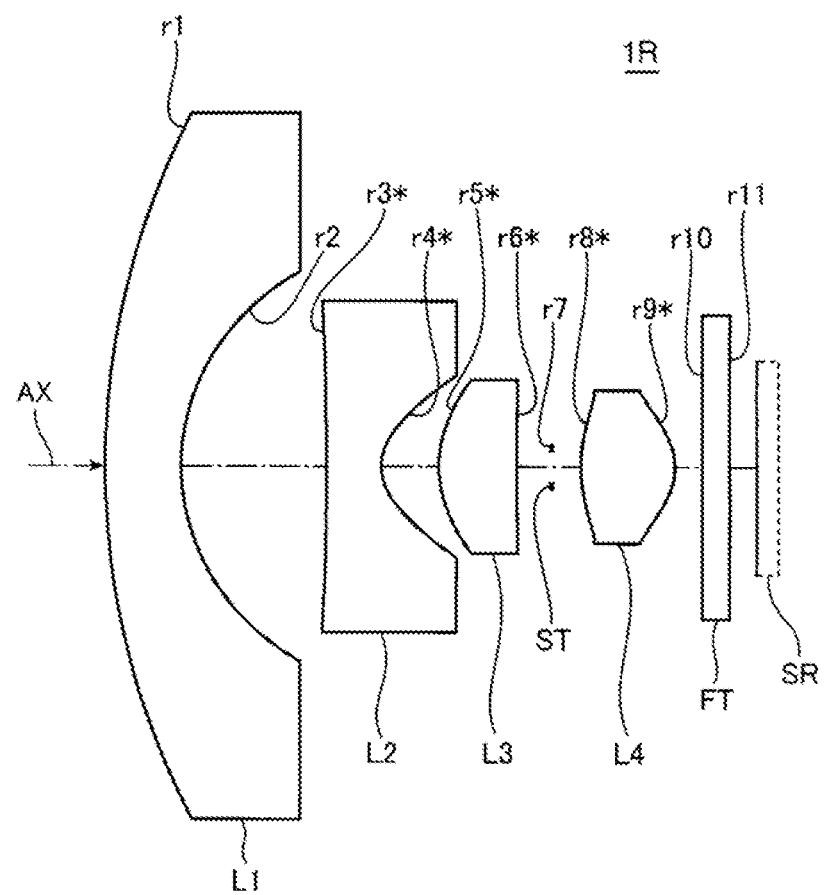
FIG. 23 is diagram showing a cross sectional view of an arrangement of a lens group in a wide angle optical system according to a 18th embodiment.
Figure 24A:
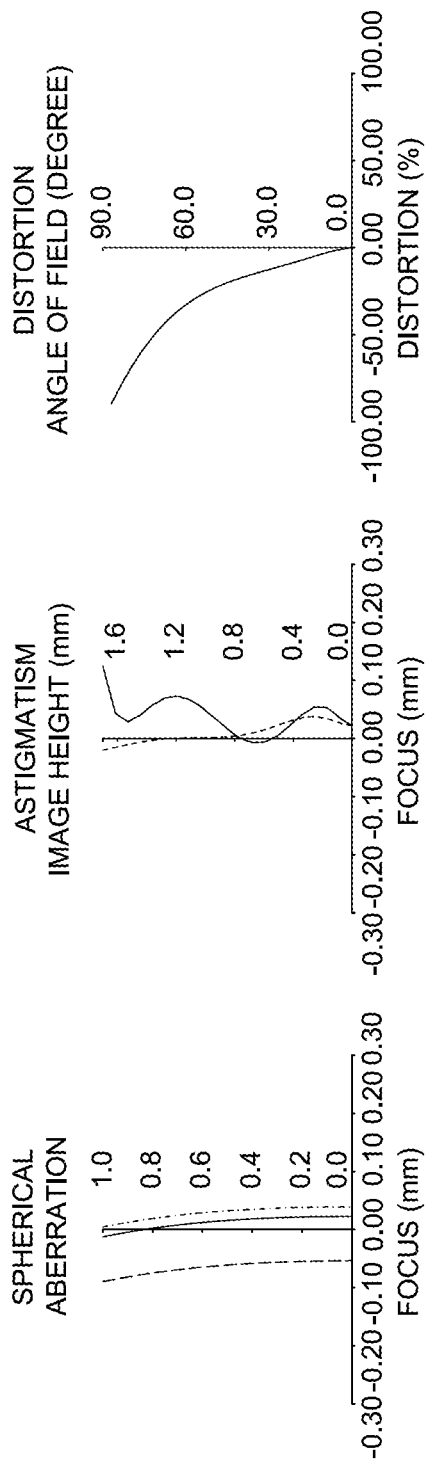
FIGS. 24A, 24B, 24C are aberration diagrams-1 of a lens group in a wide angle optical system of the first embodiment.
Figure 24B:
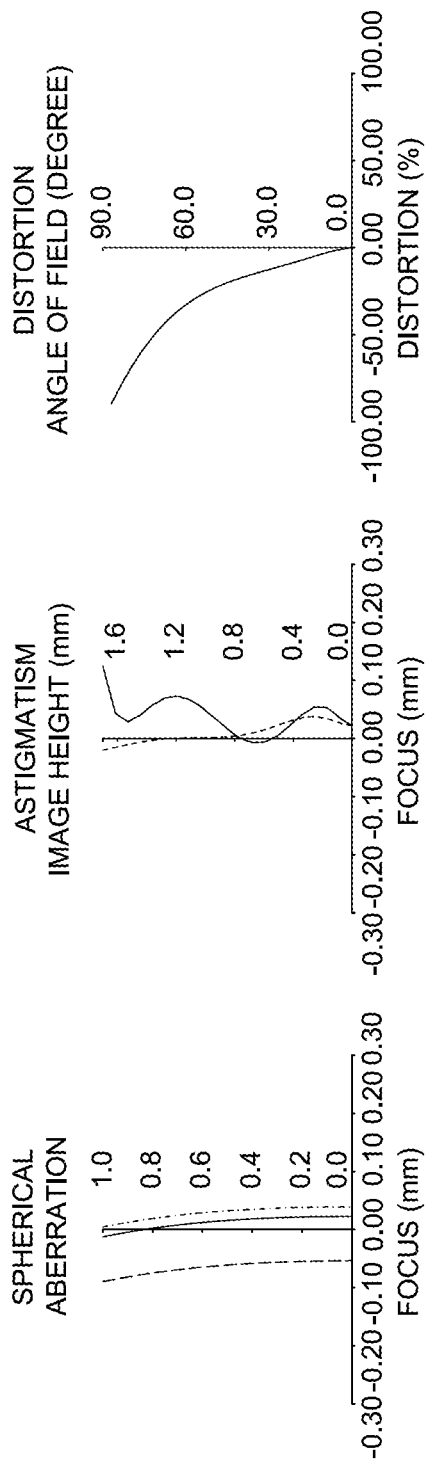
Figure 24C:
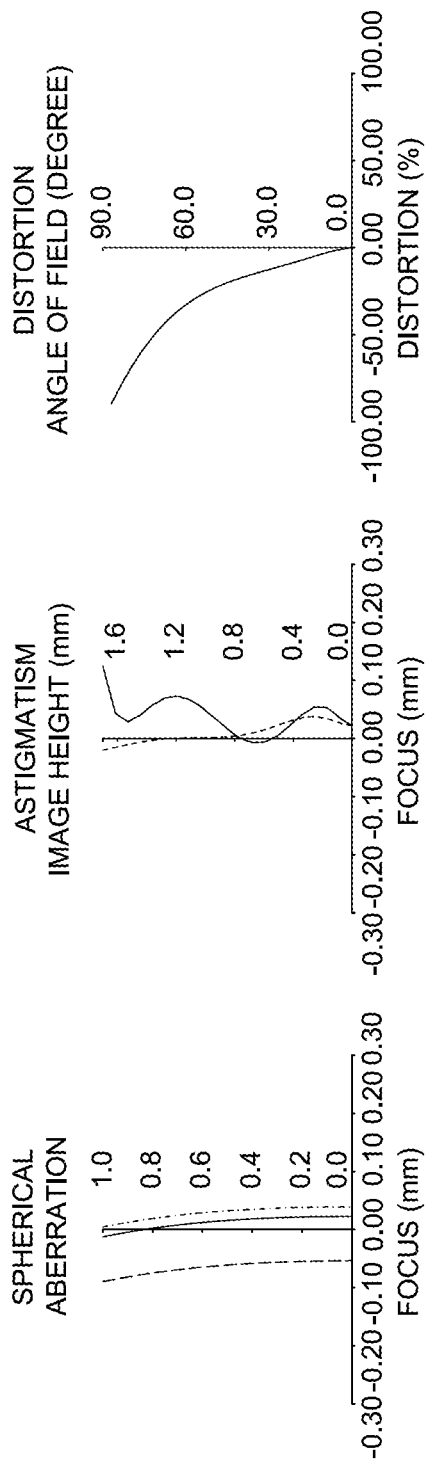

FIG. 23 is a cross-sectional view diagram showing an example of the arrangement of a lens group in a wide angle optical system according to Example 18. FIGS. 58A, 58B, 58C and FIG. 59 are the aberration diagrams of the wide angle optical system of Example 18.

A wide angle optical system 1R of Example 18, as shown in FIG. 23, is a negative-negative-positive-positive four component optical system configured, in order from the object side towards the image side, with a negative meniscus lens (the first lens L1) that is convex on the object side, a negative meniscus lens (the second lens L2) that is convex on the object side, a double-convex positive lens (the third lens L3), an aperture diaphragm ST, and a double-convex positive lens (the fourth lens L4). The second lens L2 through the fourth lens L4 respectively have aspherical surfaces on both sides, and the second lens L2 and the fourth lens L4 are made of, for example, resin material such as plastic.

Further, the light receiving surface of an image sensor SR is disposed on the image side of the fourth lens L4 with a parallel plate FT therebetween as a filter. The parallel plate FT includes a variety of optical filters and a cover glass for the image sensor and the like.

The construction data of the lenses in the wide angle optical system 1R of this Example 18 is given below.

Numerical Value Example 18

| Unit mm | | | | |
|---|---|---|---|---|
| Surface data | | | | |
| Surface number | r | d | nd | vd |
| Object surface | ∞ | ∞ | | |
| 1 | 15.904 | 1.400 | 1.88300 | 40.81 |
| 2 | 4.450 | 2.690 | | |
| 3* | −93.715 | 1.000 | 1.53048 | 55.72 |
| 4* | 1.037 | 1.060 | | |
| 5* | 2.407 | 1.433 | 2.00170 | 20.64 |
| 6* | 150.420 | 0.643 | | |
| 7(Aperture) | ∞ | 0.539 | | |
| 8* | 2.865 | 1.747 | 1.53048 | 55.72 |
| 9* | −1.239 | 0.500 | | |
| 10 | ∞ | 0.500 | 1.51680 | 64.20 |
| 11 | ∞ | 0.500 | | |
| Image surface | ∞ | | | |

Aspherical surface data

Third surface

K = −5.0000e+000, A4 = 7.2028e−005, A6 = −4.7541e−005,
A8 = −4.9807e−006, A10 = 1.0917e−006, A12 = −4.1925e−008

Fourth surface

K = −2.6295e+000, A4 = 1.6884e−001, A6 = −9.2907e−002,
A8 = 2.4144e−002, A10 = −1.4670e−003, A12 = −2.3485e−004

Fifth surface

K = 0.0000e+000, A4 = −6.6165e−003, A6 = −8.9634e−003,
A8 = 1.1261e−003, A10 = 1.8961e−003, A12 = −5.1884e−004

Sixth surface

K = 0.0000e+000, A4 = −6.0750e−003, A6 = −4.9882e−004,
A8 = 1.9403e−002, A10 = −1.4315e−002, A12 = 2.7769e−003

Eighth surface

K = 0.0000e+000, A4 = −9.7847e−002, A6 = 1.3276e−001,
A8 = −1.0979e−001, A10 = 4.5566e−002, A12 = −7.8168e−003

Ninth surface

K = −2.0000e+000, A4 = −9.8150e−003, A6 = −9.7246e−003,
A8 = 2.4119e−002, A10 = −9.2684e−003, A12 = 1.0023e−003

| Various data | |
|---|---|
| Focal length | 0.855 |
| F-number | 2.785 |
| Half angle of field | 103.981 |
| Image height | 2.068 |
| Overall lens length | 11.873 |
| BF | 1.362 |

Figure 59:
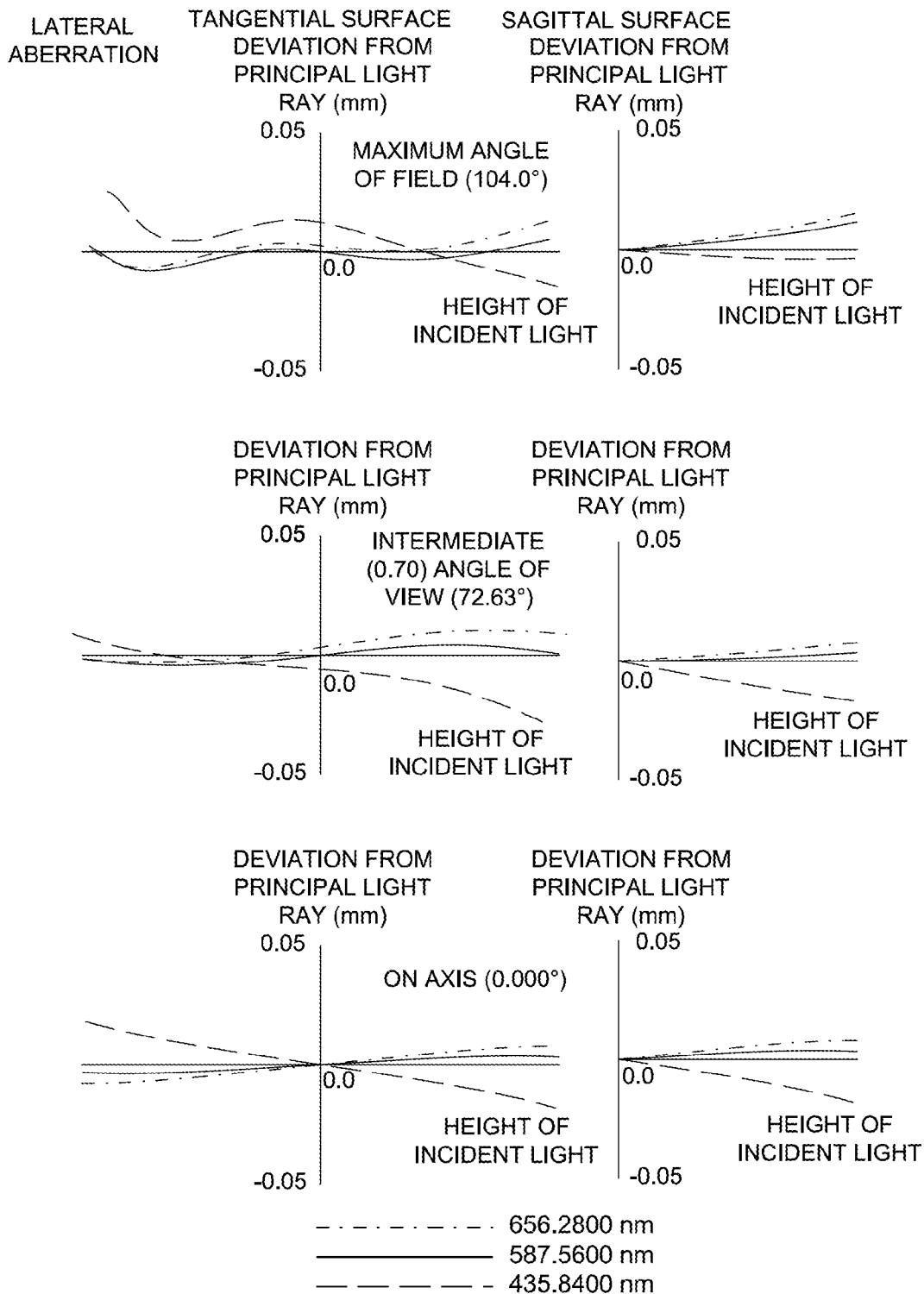
FIG. 59 is an aberration diagram-2 of the lens group in the wide angle optical system of the 18th embodiment.

With the above lens arrangement and construction, the spherical aberration (sine condition), the astigmatism, and the distortion, in the wide angle optical system 1R of the Example 18 are shown in FIGS. 58A, 58B, 58C, and the lateral aberration is shown in FIG. 59.

The respective values when the conditional relationships (1) to (19) are applied to the variable power optical systems 1A to 1R of the Examples 1 to 18 described above are given in Table 1 and Table 2.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Conditional expression (1) | f34/f | 4.21 | 4.12 | 4.50 | 4.02 | 3.45 | 3.22 | 3.71 | 6.40 | 4.46 | 4.76 |
| Conditional expression (2) | f3/f | 3.29 | 3.39 | 2.97 | 3.28 | 2.88 | 2.51 | 2.58 | 4.22 | 3.51 | 4.01 |
| Conditional expression (3) | D12/f | 3.36 | 3.38 | 3.29 | 3.57 | 3.15 | 2.52 | 5.28 | 4.42 | 3.36 | 4.64 |
| Conditional expression (4) | |f2/f| | 2.71 | 2.83 | 2.67 | 2.66 | 2.37 | 2.03 | 1.86 | 2.72 | 2.56 | 2.43 |
| Conditional expression (5) | |f1/f| | 8.85 | 8.95 | 8.32 | 8.37 | 8.05 | 6.71 | 10.59 | 11.53 | 9.24 | 11.84 |
| Conditional expression (6) | f1/f2 | 3.27 | 3.16 | 3.11 | 3.14 | 3.39 | 3.30 | 5.68 | 4.24 | 3.62 | 4.88 |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Conditional expression (7) | \|f12/f\| | 1.51 | 1.56 | 1.45 | 1.47 | 1.36 | 1.17 | 1.11 | 1.60 | 1.47 | 1.46 |
| Conditional expression (8) | f3/f4 | 1.45 | 1.54 | 1.40 | 1.37 | 1.14 | 1.08 | 1.12 | 1.67 | 1.27 | 1.49 |
| Conditional expression (9) | f4/f | 2.27 | 2.21 | 2.13 | 2.39 | 2.54 | 2.32 | 2.30 | 2.53 | 2.75 | 2.69 |
| Conditional expression (10) | f123/f | 21.50 | 49.93 | 16.08 | 12.39 | 4.99 | 10.06 | −62.21 | −16.29 | 5.80 | −34.68 |
| Conditional expression (11) | Da2/R2 | 0.901 | 0.901 | 0.905 | 0.902 | 0.902 | 0.901 | 0.932 | 0.901 | 0.901 | 0.901 |
| Conditional expression (12) | Dp4/R4 | 2.19 | 2.19 | 2.13 | 1.35 | 1.42 | 1.45 | 1.06 | 2.34 | 2.53 | 2.73 |
| Conditional expression (13) | dZ4/R4 | −0.516 | −0.516 | −0.524 | −0.467 | −0.482 | −0.498 | −0.425 | −0.555 | −0.541 | −0.546 |
| Conditional expression (14) | Yr/2f−1 | −0.001 | 0.000 | −0.001 | −0.003 | −0.002 | 0.057 | −0.108 | 0.482 | 0.207 | 0.290 |
| Conditional expression (15) | Y'/TL | 0.15 | 0.15 | 0.15 | 0.15 | 0.16 | 0.20 | 0.13 | 0.17 | 0.16 | 0.16 |
| Conditional expression (16) | \|Ep\|/Lb | 3.68 | 3.77 | 3.59 | 3.47 | 4.33 | 4.18 | 2.64 | 4.11 | 3.77 | 3.41 |
| Conditional expression (17) | DA1 | 0.45 | 0.45 | 0.45 | 0.14 | 0.14 | 0.14 | 0.14 | <0.20 | 0.14 | 0.14 |
| Conditional expression (18) | Hk1 | 685 | 685 | 685 | 730 | 730 | 730 | 730 | 751 | 730 | 730 |
| Conditional expression (19) | DS1 | <0.01 | <0.01 | <0.01 | <0.01 | <0.01 | <0.01 | <0.01 | — | <0.01 | <0.01 |

TABLE 2

|  |  | Example 11 | Example 12 | Example 13 | Example 14 | Example 15 | Example 16 | Example 17 | Example 18 |
|---|---|---|---|---|---|---|---|---|---|
| Conditional expression (1) | f34/f | 3.21 | 3.21 | 3.12 | 3.71 | 3.37 | 3.44 | 4.38 | 3.62 |
| Conditional expression (2) | f3/f | 3.06 | 2.49 | 2.51 | 2.91 | 2.75 | 2.80 | 3.20 | 2.84 |
| Conditional expression (3) | D12/f | 4.42 | 2.97 | 2.79 | 3.50 | 3.09 | 3.54 | 3.33 | 3.15 |
| Conditional expression (4) | \|f2/f\| | 2.46 | 1.99 | 2.03 | 2.36 | 2.26 | 2.34 | 2.87 | 2.25 |
| Conditional expression (5) | \|f1/f\| | 10.78 | 7.65 | 7.83 | 8.34 | 8.12 | 8.24 | 8.61 | 8.68 |
| Conditional expression (6) | f1/f2 | 4.37 | 3.84 | 3.85 | 3.53 | 3.60 | 3.53 | 3.00 | 3.85 |
| Conditional expression (7) | \|f12/f\| | 1.46 | 1.17 | 1.21 | 1.34 | 1.32 | 1.32 | 1.56 | 1.35 |
| Conditional expression (8) | f3/f4 | 1.06 | 0.90 | 0.86 | 1.12 | 1.04 | 1.01 | 1.43 | 1.27 |
| Conditional expression (9) | f4/f | 2.89 | 2.78 | 2.92 | 2.59 | 2.65 | 2.76 | 2.24 | 2.24 |
| Conditional expression (10) | f123/f | 3.49 | 3.32 | 2.76 | 4.78 | 3.80 | 3.50 | 8.37 | 13.03 |
| Conditional expression (11) | Da2/R2 | 0.901 | 0.901 | 0.901 | 0.925 | 0.901 | 0.935 | 0.900 | 0.863 |
| Conditional expression (12) | Dp4/R4 | 1.67 | 1.39 | 1.59 | 1.47 | 1.35 | 1.45 | 1.97 | 1.34 |
| Conditional expression (13) | dZ4/R4 | −0.524 | −0.503 | −0.489 | −0.492 | −0.484 | −0.489 | −0.510 | −0.513 |
| Conditional expression (14) | Yr/2f−1 | 0.101 | −0.070 | −0.120 | 0.036 | −0.015 | 0.012 | −0.002 | 0.041 |
| Conditional expression (15) | Y'/TL | 0.16 | 0.16 | 0.16 | 0.16 | 0.16 | 0.16 | 0.15 | 0.17 |
| Conditional expression (16) | \|Ep\|/Lb | 2.67 | 3.11 | 3.17 | 4.18 | 4.04 | 3.87 | 3.56 | 4.23 |
| Conditional expression (17) | DA1 | 0.45 | 0.37 | 0.46 | 0.58 | 0.46 | 0.46 | 0.46 | 0.14 |
| Conditional expression (18) | Hk1 | 685 | 755 | 760 | 695 | 760 | 760 | 760 | 730 |
| Conditional expression (19) | DS1 | <0.01 | 0.02–0.20 | 0.02–0.20 | 0.03 | 0.02–0.20 | 0.02–0.20 | 0.02–0.20 | <0.01 |

As explained above, the wide angle optical systems 1A to 1R of the Examples 1 to 18 satisfy the requirements of the present invention, with the result that they have better optical characteristics, compactness is sufficiently realized, and cost reduction can be realized when installed in a digital device, particularly installed in a monitor camera for in-car use or in portable terminals, etc. Further, in the wide angle optical systems 1A to 1R of the Examples 1 to 18, it is possible to achieve, particularly, ultra wide angles of a total angle of field of 180 degrees or more, and more concretely, of 200 degrees or more.

In order to describe the present invention, the present invention was described appropriately and sufficiently in the above description, by way of the preferred embodiments and with reference to the drawings, however, it should be understood that a person skilled in the art can easily modify or improve the preferred embodiments described above. Therefore, any modified forms or improved forms made by a person skilled in the art are thought to be included in the scope of right of the appended claims without departing from the scope of right of the claims described in the "Claims".

The invention claimed is:

1. A wide angle optical system, comprising from an object side toward an image side:
   a first lens having a negative optical power;
   a second lens having a negative optical power;
   a third lens having a positive optical power;
   an aperture diaphragm; and
   a fourth lens having a positive optical power,
   wherein the following conditional relationships (1) and (2) are satisfied:

$$3 < f34/f < 10 \tag{1}$$

$$2.8 < f1/f2 < 4 \tag{2}$$

where:
f34 is a combined focal length of the third lens and the fourth lens;
f is an overall focal length of the wide angle optical system;
f1 is a focal length of the first lens; and
f2 is a focal length of the second lens.

2. The wide angle optical system of claim 1, wherein the following conditional relationship (3) is satisfied:

$$2.9 < f3/f < 3.6 \tag{3}$$

where:
f3 is a focal length of the third lens; and
f is the overall focal length of the wide angle optical system.

3. The wide angle optical system of claim 1, wherein the following conditional relationship (4) is satisfied:

$$2.1 < D12/f < 5 \tag{4}$$

where:
D12 is a distance on an optical axis between the first lens and the second lens; and
f is the overall focal length of the wide angle optical system.

4. The wide angle optical system of claim 1, wherein the following conditional relationship (5) is satisfied:

$$2.2 < |f2/f| < 3 \tag{5}$$

where:
f2 is a focal length of the second lens; and
f is the overall focal length of the wide angle optical system.

5. The wide angle optical system of claim 1, wherein the following conditional relationship (6) is satisfied:

$$7.5 < |f1/f| < 103 \tag{6}$$

where:
f1 is a focal length of the first lens; and
f is the overall focal length of the wide angle optical system.

6. The wide angle optical system of claim 1, wherein the following conditional relationship (7) is satisfied:

$$1.2 < |f12/f| < 1.6 \tag{7}$$

where:
f12 is a combined focal length of the first lens and the second lens; and
f is the overall focal length of the wide angle optical system.

7. The wide angle optical system of claim 1, wherein the following conditional relationship (8) is satisfied:

$$0.88 < f3/f4 < 1.55 \tag{8}$$

where:
f3 is a focal length of the third lens; and
f4 is a focal length of the fourth lens.

8. The wide angle optical system of claim 1, wherein the following conditional relationship (9) is satisfied:

$$2 < f4/f < 3 \tag{9}$$

where:
f4 is a focal length of the fourth lens; and
f is the overall focal length of the wide angle optical system.

9. The wide angle optical system of claim 1, wherein the following conditional relationship (10) is satisfied:

$$9.5 < f123/f < 23 \tag{10}$$

where:
f123 is a combined focal length of the first lens, the second lens, and the third lens; and
f is the overall focal length of the wide angle optical system.

10. The wide angle optical system of claim 1, wherein the first lens is a glass lens.

11. The wide angle optical system of claim 1, wherein the following conditional relationship (11) is satisfied:

$$0.85 < Da2/R2 < 0.95 \tag{11}$$

where:
Da2 is a maximum effective radius of an image side surface of the first lens; and
R2 is a paraxial curvature of radius of an image side surface of the first lens.

12. The wide angle optical system of claim 1, wherein the second lens is a resin lens which has at least one aspherical surface.

13. The wide angle optical system of claim 1, wherein the following conditional relationships (12) and (13) are satisfied:

$$Dp4/R4 > 1 \tag{12}$$

$$dZ4/R4 < -0.4 \tag{13}$$

where:
Dp4 is a deviation, which is a distance in an optical axis direction, of an image side surface of the second lens at a position of the maximum effective radius;
R4 is a paraxial curvature of radius of an image side surface of the second lens; and
dz4 is a aspherical sag amount, which is a difference from a spherical amount, of an image side surface of the second lens at a position where a height from an optical axis is equal to a paraxial curvature of radius of the image side surface of the second lens.

14. The wide angle optical system of claim 1, wherein a principal light ray at a half angle of view satisfies the following conditional relationship (14):

$$-0.13 < Yr/2f - 1 < 0.7 \tag{14}$$

where:
Yr is a distance on an image plane between the principal light ray and an optical axis; and
f is an overall focal length of the wide angle optical system.

15. The wide angle optical system of claim 1, wherein the following conditional relationship (15) is satisfied:

$$Y'/TL > 0.1 \tag{15}$$

where:
Y' is a maximum image height; and
TL is a distance on an optical axis from an apex of an object side surface of the first lens to an image plane, where a back focus is an air-equivalent length.

16. The wide angle optical system of claim 1, wherein the following conditional relationship (16) is satisfied:

$$|Ep|/Lb > 2.2 \tag{16}$$

where:
Ep is a distance between an imaging plane and an exit pupil position with respect to a principle light ray of a maximum image height; and
Lb is an air-equivalent back focus.

17. The wide angle optical system of claim 1, wherein the first lens and the second lens are negative meniscus lenses which are convex toward the object side, the third lens is a double-convex positive lens, the aperture diaphragm is an aperture stop, and the fourth lens is a double-convex positive lens.

18. The wide angle optical system of claim 1, wherein the third lens is a resin lens which has at least one aspherical surface.

19. The wide angle optical system of claim 1, wherein the fourth lens is a resin lens which has at least one aspherical surface.

20. A monitor camera which is mounted on a predetermined position to pick up an image of a photographic subject in a vicinity of the mounted position comprising:
- a wide angle optical system of claim 1; and
- an image sensor for converting the optical image of the photographic subject guided by the wide angle optical system, into an electric signal.

21. A digital apparatus, comprising:
- a wide angle optical system of claim 1;
- an image sensor for converting the optical image of the photographic subject guided by the wide angle optical system into an electric signal; and
- a controller configured to cause the wide angle optical system and the image sensor to conduct at least one of picking up a still image and picking up a moving image.

22. The digital apparatus of claim 21, further comprising:
- an image processing section configured to correct distortion of the optical image of the photographic subject formed on the imaging surface of the image sensor.

* * * * *